US009487611B2

(12) United States Patent
Farrand et al.

(10) Patent No.: US 9,487,611 B2
(45) Date of Patent: Nov. 8, 2016

(54) PARTICLES FOR ELECTROPHORETIC DISPLAYS

(75) Inventors: Louise Diane Farrand, Dorset (GB); Mark James, Romsey (GB); Emily Jane Thomas, Bournemouth (GB); Claire Topping, Southampton (GB); Jonathan Henry Wilson, Southampton (GB)

(73) Assignee: Merck Patent GmbH (DE)

( * ) Notice: Subject to any disclaimer, the term of this patent is extended or adjusted under 35 U.S.C. 154(b) by 552 days.

(21) Appl. No.: 13/813,178

(22) PCT Filed: Jul. 26, 2011

(86) PCT No.: PCT/EP2011/003745
§ 371 (c)(1),
(2), (4) Date: Apr. 8, 2013

(87) PCT Pub. No.: WO2012/019704
PCT Pub. Date: Feb. 16, 2012

(65) Prior Publication Data
US 2013/0208344 A1 Aug. 15, 2013

(30) Foreign Application Priority Data

Aug. 7, 2010 (EP) ..................................... 10008264

(51) Int. Cl.
| | | |
|---|---|---|
| *C08F 228/06* | (2006.01) | |
| *G02F 1/167* | (2006.01) | |
| *C09B 62/465* | (2006.01) | |
| *C09B 62/473* | (2006.01) | |
| *C09B 62/475* | (2006.01) | |
| *C09B 69/10* | (2006.01) | |
| *C09B 62/467* | (2006.01) | |
| *C09B 62/483* | (2006.01) | |
| *C09B 62/835* | (2006.01) | |

(52) U.S. Cl.
CPC ........... *C08F 228/06* (2013.01); *C09B 62/465* (2013.01); *C09B 62/467* (2013.01); *C09B 62/473* (2013.01); *C09B 62/475* (2013.01); *C09B 62/483* (2013.01); *C09B 62/835* (2013.01); *C09B 69/10* (2013.01); *C09B 69/106* (2013.01); *C09B 69/108* (2013.01); *G02F 1/167* (2013.01); *Y10T 428/2982* (2015.01)

(58) Field of Classification Search
CPC . C09B 62/465; C09B 62/467; C09B 62/473; C09B 62/475; C09B 62/483; C09B 69/10; C09B 69/106; C09B 69/108; C09B 62/835; C08F 228/06; G02F 1/167
See application file for complete search history.

(56) References Cited

U.S. PATENT DOCUMENTS

| | | | |
|---|---|---|---|
| 4,136,250 A * | 1/1979 | Mueller | A01N 25/04 504/361 |
| 4,604,459 A | 8/1986 | Jager | |
| 4,795,794 A | 1/1989 | Winnik et al. | |
| 5,200,481 A | 4/1993 | Sounik et al. | |
| 5,380,362 A | 1/1995 | Schubert | |
| 5,403,518 A | 4/1995 | Schubert | |
| 5,783,614 A | 7/1998 | Chen et al. | |
| 6,194,488 B1 | 2/2001 | Chen et al. | |
| 6,956,690 B2 | 10/2005 | Yu et al. | |
| 7,038,655 B2 | 5/2006 | Herb et al. | |
| 7,052,766 B2 | 5/2006 | Zang et al. | |
| 7,110,162 B2 | 9/2006 | Wu et al. | |
| 7,170,670 B2 | 1/2007 | Webber | |
| 7,226,550 B2 | 6/2007 | Hou et al. | |
| 7,236,290 B1 | 6/2007 | Zhang et al. | |
| 7,247,379 B2 | 7/2007 | Pullen et al. | |
| 7,277,218 B2 | 10/2007 | Hwang et al. | |
| 7,304,634 B2 | 12/2007 | Albert et al. | |
| 2007/0128352 A1 | 6/2007 | Honeyman et al. | |
| 2007/0153360 A1* | 7/2007 | Ho et al. | 359/296 |
| 2007/0268244 A1 | 11/2007 | Chopra et al. | |
| 2008/0100906 A1* | 5/2008 | Iftime et al. | 359/296 |

FOREIGN PATENT DOCUMENTS

| | | | | |
|---|---|---|---|---|
| CN | 101544850 A | * | 9/2009 | |
| DE | 3423581 A1 | | 1/1986 | |
| DE | WO 2010089060 A2 | * | 8/2010 | ............ C08F 220/14 |
| EP | 0205291 A2 | * | 12/1986 | ............ C09B 69/10 |
| EP | 0396376 A1 | * | 11/1990 | ............ C09B 1/26 |
| GB | 2438436 A | | 11/2007 | |
| JP | 48063077 A | * | 9/1973 | |
| JP | 02102268 A | * | 4/1990 | |
| JP | 2102268 A | | 10/1996 | |
| JP | 2102268 C | | 10/1996 | |
| WO | WO-94/00797 A1 | | 1/1994 | |
| WO | WO-99/10767 A1 | | 3/1999 | |
| WO | WO 9950326 A1 | * | 10/1999 | |
| WO | WO 0212402 A2 | * | 2/2002 | ............ C08F 246/00 |
| WO | WO-2005017046 A2 | | 2/2005 | |

(Continued)

OTHER PUBLICATIONS

Derwent Abstract of JP 02-102268 A, 1990.*
Kim et al. "Synthesis and characterization of novel blue azo-dye derivatives containing acrylate group for dye-based color filters", Journal of the SID, 2010, 18, 994-1009.*
ProQuest Machine translation of CN101544850A, Feb. 2016.*
"Disperse Violet 8", dye/World dye variety, http://www.worlddyevariety.com/disperse-dyes/disperse-violet-8.html, 2016.*
Landfester, Katharina, et al., "Polyreactions in Miniemulsions", Macromol. Rapid Commun., vol. 22, (2001), pp. 896-936.
iNi.m.E3,,Cb Tse, Albert S., et al., "Synthesis of Dyed Monodisperse Poly(Methyl Methacrylate) Colloids for the Preparation of Submicron Periodic Light-Absorbing Arrays", Macromolecules, vol. 28, (1995), pp. 6533-6538.
Guthrie, J.T., et al., "Polymeric Colorants", Rev. Prog. Coloration, vol. 20, (1990), pp. 40-52.

(Continued)

*Primary Examiner* — Nicole M Buie-Hatcher
(74) *Attorney, Agent, or Firm* — Drinker Biddle & Reath LLP

(57) ABSTRACT

This invention relates to colored polymer particles preferably with surface functionality for charge retention, a process for their preparation, the use of these particles for the preparation of an electrophoretic device, color electrophoretic displays comprising such particle, and new polymerisable dyes.

23 Claims, No Drawings

(56) References Cited

FOREIGN PATENT DOCUMENTS

| WO | WO-2008003604 A2 | | 1/2008 |
|---|---|---|---|
| WO | WO 2008003604 A2 | * | 1/2008 |
| WO | PCT/EP2010/000550 | | 8/2010 |
| WO | PCT/EP2010/000551 | | 8/2010 |
| WO | WO-2010089057 A2 | | 8/2010 |
| WO | WO-2010089058 A1 | | 8/2010 |
| WO | WO-2010089059 A1 | | 8/2010 |

OTHER PUBLICATIONS

B , /in vi.u., Cd Sastre, Angela, et al., "A Mesomorphic Amphiphilic Phthalocyanine Derivative use for Functionalization of the Grid Surface of a Field Effect Transistor", New J. Chem., (1998), pp. 569-578.

International Search Report for PCT/EP2011/003745 mailed Nov. 24, 2011.

* cited by examiner

PARTICLES FOR ELECTROPHORETIC DISPLAYS

CROSS-REFERENCE TO RELATED APPLICATIONS

This application is a national stage application (under 35 U.S.C. §371) of PCT/EP2011/003745, filed Jul. 26, 2011, which claims benefit of European application 10008264.3, filed Aug. 7, 2010 which are both incorporated by reference.

This invention relates to coloured polymer particles, preferably with surface functionality for charge retention, a process for their preparation, the use of these particles for the preparation of an electrophoretic device, colour electrophoretic displays comprising such particles, and new polymerisable dyes.

In recent years a need has developed for low power, low cost and light weight display devices. EPDs (Electrophoretic Displays) can fulfil this requirement. One use of EPDs is for electronic paper. It is imperative that once an image is displayed, the image can be retained for a long period of time without further voltage being applied. Hence, this fulfils the requirements of low power use, and means an image can be visible until another image is required.

An EPD generally comprises charged electrophoretic particles dispersed between two substrates, each comprising one or more electrodes. The space between the electrodes is filled with a dispersion medium which is a different colour from the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

Available technologies of EPDs include electronic paper, commercially used in electronic books. This application uses black and white colour. The use of different coloured particles in a single pixel has been exemplified in recent patent literature (U.S. Pat. No. 7,304,634, GB 2 438 436, US 2007/0268244).

There is a need for a simple preparation of charged coloured particles which can be easily dispersed in non-polar media, show electrophoretic mobility and which do not leach colour in a dispersant.

Therefore, the object of this invention is to provide electro-optically active media for colour electrophoretic displays and specifically engineered coloured particles for use in such media.

This object is solved by coloured polymer particles for use in electrophoretic devices comprising monomer units of a) at least one polymerisable dye comprising a chromophore, at least two polymerisable groups, optionally fixed by at least one linker group, and optional groups to modify physical properties and optionally charged group(s), b) at least one monomer, c) optionally at least one charged co-monomer, and d) optionally at least one crosslinking co-monomer, by a process for the preparation of such coloured polymer particles, by the use of these particles for the preparation of an electrophoretic device, by electrophoretic fluids and devices comprising such particles, and by polymerisable dyes.

Compounds $CuPc(SO_3^-)_n(SO_2NHCH_2CH_2COOCMe=CH_2)_m$ where CuPc is copper phthalocyanine and m>1, n>1, m+n>2 and <16 and the dyes of Formulas (1) and (2) are described in WO 2010/089057 and are not comprised by the present invention:

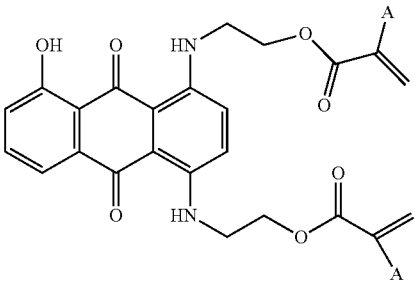

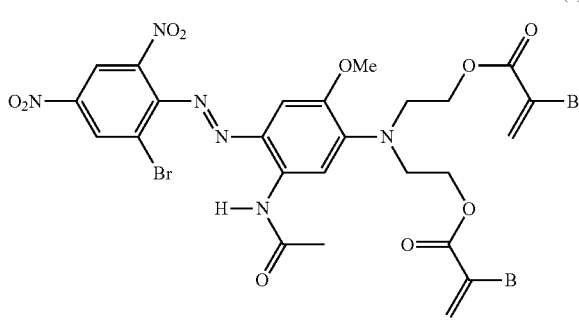

with both A and both B, respectively being simultaneously H or methyl.

The subject matter of this invention relates more specifically to the synthesis of polymer particles, their surface modification with covalently bonded substituents to promote dispersability and the holding of a charge and to the physical, chemical and irreversible entrapment of a polymerisable dye to give colour to the particles. It also relates specifically to dispersions of the afore-mentioned polymer particles in dielectric organic media, which enable electrophoretic switching of the particles in an applied electric field, preferably as the electrically switchable component of a full colour e-paper or electrophoretic display.

The present invention advantageously provides a simple method to colour the particles without additional steps, a dye which does not leach into the EPD fluid, the ability to achieve and easily adjust required shade of colour, the reduction of the amount of unreacted dye and therefore reduction of the amount of cleaning and washing time, and an increase of the loading of dye in a particle to achieve the desired depth of colour. A further advantage is that the properties of the dye can be tailored to the particles so that the dye does not adversely affect the formation or properties of the particles.

Advantages of the polymer particles according to the invention may be, in particular:
 excellent control of particle size, monodisperse size distribution with a diameter range of 50-1200 nm, preferably 150-900 nm, or even with a small diameter range of 50-500 nm, preferably 150-400 nm, for image quality, and/or
 a glassy polymer nature for optical clarity and colour compatibility, and/or
 a homogeneous crosslinked network structure for solvent resistance, and/or
 a non-swelling nature when dispersed in EPD solvent media, impact strength, hardness, and/or
 dispersible in a non polar continuous phase that is the most used media for EPD, and/or high electrophoretic mobility in dielectric media, and/or
technique is universally applicable for dye incorporation across all colours, and/or
accurate zeta potential is possible, and/or
all colours have same density (good for sedimentation/agglomeration performance), and/or
excellent switching behaviour, faster response times at comparable voltages, and/or
consistent surface properties, and/or
good reproducibility, and/or
densities close to that of the carrier fluid.

The main advantages of the present invention are that it is possible to prepare particles of appropriate colours e.g. red, green and blue or a combination of cyan, magenta and yellow and black and to be able to prepare coloured particles of a desired size and which have a high mono-dispersity, and which preferably incorporate a charge, to enable electrophoretic movement.

It is especially advantageous that the present process is a one-step reaction to provide coloured particles suitable for EPD enabling a cost effective production process. Use of a polymerisable dye in the formative stage of the particle, enables the dye to become irreversibly bound with the co-monomers and become an intrinsic part of the particle. Since the dye is covalently bound to the monomers in the particle by two or more polymerisable groups, it is highly unlikely to leach into any solvent suitable for EPD. In addition, the dye can be specifically designed to give a desired suitable colour, e.g. cyan or red. The polymerisable groups on the dye can be easily modified (e.g. methacrylate, acrylate, etc.) so that an appropriate dye monomer can react with other monomers to form the particle.

In design and synthesis of particles for EPD, the present invention provides the opportunity to manipulate colour, charge, size, mono-dispersity etc. independently in order to produce particles with all the desired features for coloured EPD. It is especially advantageous that the inventive particles do not leach any colour into a non-polar solvent used as a carrier fluid in EPD even over a long time period.

An essential component of the present invention is a polymerisable dye comprising at least two polymerisable groups. In general the polymerisable dyes may be solvent soluble or water soluble and they may be anionic, cationic, zwitterionic or neutral.

Cationic polymerisable dyes contain a covalently attached group or groups which have a positive charge in the application or contain a positive charge in the chromophore group. They can be derived from protonation or quaternation of nitrogen, phosphorous, oxygen or sulphur atoms or groups containing them, for example heteroaromatic (thiazole, imidazole) delocalised nitrogen bases (guanidine etc). Associated anions preferably have a single charge and can preferably be halogen, preferably $F^-$, $Cl^-$, $Br^-$, monobasic acid (oxo) anions, preferably acetate, propionate, lactate, methane sulphonate, p-toluenesulphonate, hydroxide, and nitrate.

Preferred examples of water soluble cationic polymerisable dyes comprise as counter ion $MeOSO_3^-$. Also preferably suitable are $Cl^-$, $Br^-$, and acetate.

Anionic polymerisable dyes contain a covalently attached group or groups which have a negative charge in the application and can be derived from deprotonation of an acidic group for example sulphonic, carboxylic, phosphonic acids. Associated cations preferably have a single charge and can be metallic ($L^+$, $Na^+$, $K^+$ etc), charged nitrogen ($NH_4^+$, $NEt_3H^+$, $NEt_4^+$, $NMe_4^+$, imidazolium cation etc), positively charged phosphorous, sulphur etc. Preferred examples of water soluble anionic dyes are the $Na^+$, $NH_4^+$, $NEt_4^+$ salts of the acids.

The function of the polymerisable dye is to colour the particle. The polymerisable dye consists of a chromophore, at least two polymerisable groups, optional linker groups (spacers), and optional groups to modify physical properties (like solubility, light fastness, etc.) and optionally charged group(s).

The polymerisable dye preferably comprises a chromophoric group and two polymerisable groups selected from e.g. methacrylates, acrylates, methacrylamides, acrylamides, acrylonitriles, α-substituted acrylates, styrenes and vinyl ethers, vinyl esters, propenyl ethers, oxetanes and epoxys etc., in particular methacrylates and acrylates.

A polymerisable dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc. Extended conjugated chromophores can also be used to obtain some shades. For example, bis- and trisazo compounds can be used to obtain blacks and other duller shades (navy blue, brown, olive green, etc).

Mixtures of polymerisable dyes can also be used to obtain the correct particle shade; for example a black from single component mixtures of brown and blue or yellow, magenta and cyan pre-polymerised dyes. Similarly shades can be tuned for example by adding small quantities of separate polymerisable dyes to modify the colour of the particles (e.g. 95% yellow and 5% cyan to get a greener yellow shade).

Modified polymerisable dyes (with reactive group(s)) from the application groups of reactive (anionic), direct (anionic), acidic (anionic) and basic (cationic) dyes as designated by the Colour Index (published by The Society of Dyers and Colourists with the American Association of Textile Chemists and Colorists e.g. $3^{rd}$ edition 1982) are preferred.

The polymerisable groups may be attached directly to the chromophoric group or may be attached through a linker group L.

The chromophoric group preferably comprises of conjugated aromatic (including heteroaromatic) and/or multiple bonds including: azo (including monoazo, bisazo, trisazo, linked azos etc), metallised azo, anthraquinone, pyrroline, phthalocyanine, polymethine, aryl-carbonium, triphendioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups.

Preferred polymerisable dyes are azo dyes, metallised dyes, anthraquinone dyes, phthalocyanine dyes, benzodifuranones dyes, Brilliant Blue derivatives, pyrroline dyes, squarilium dyes, triphendioxazine dyes or mixtures of these dyes, especially azo dyes, metallised dyes, anthraquinone dyes, phthalocyanine dyes, benzodifuranones dyes, pyrroline dyes, squarilium dyes or mixtures of these dyes.

Especially preferred are monoazo dyes, disazo dyes, and/or metallised azo dyes. Preferably polymerisable azo dyes of Formulas (I) to (X) are used:

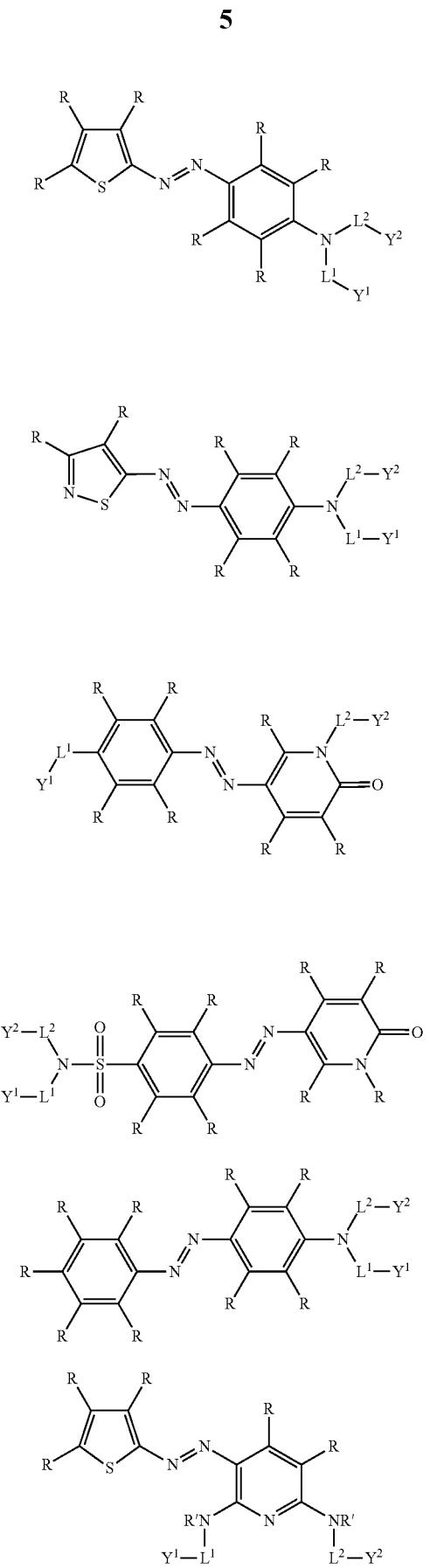
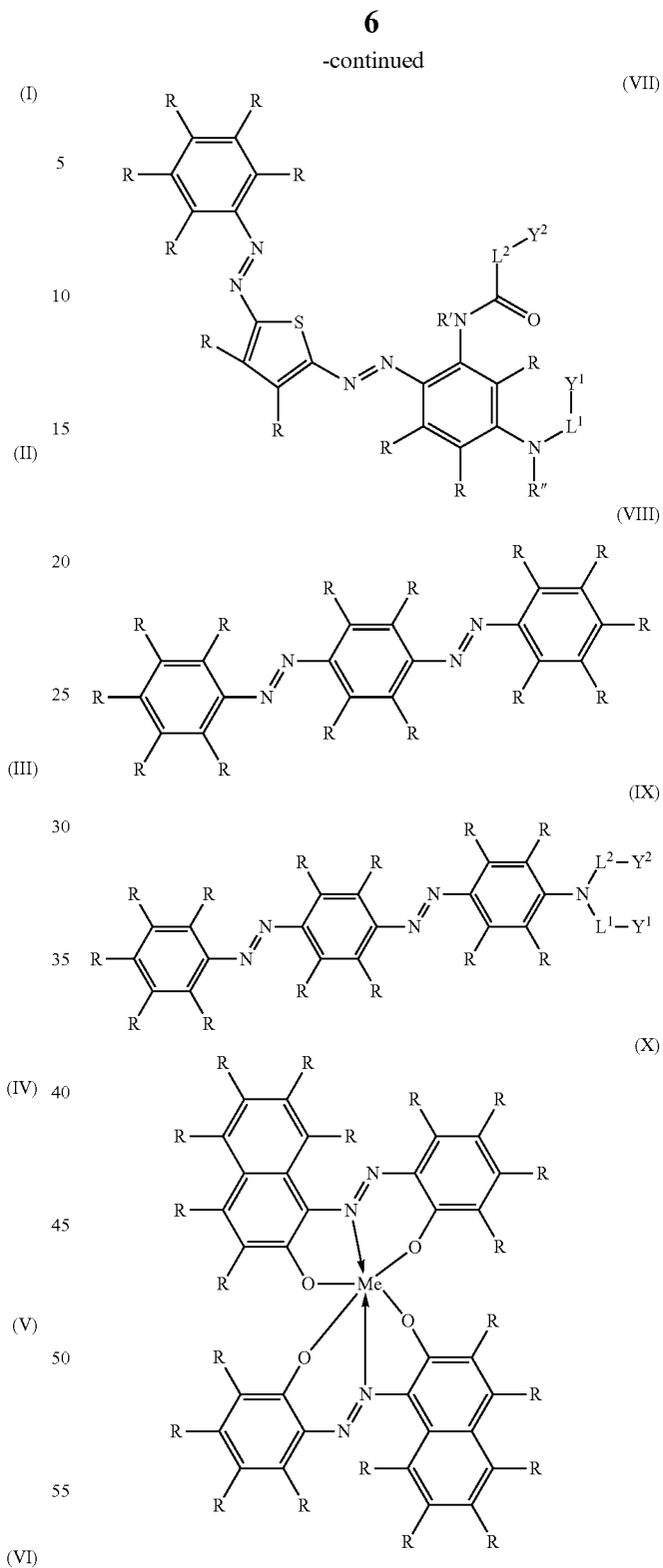

wherein the aromatic or heteroaromatic cycles are substituted by one or more different or identical groups R selected from the group consisting of H, alkyl, preferably C1-C6 alkyl, substituted or non-substituted aryl, —F, —Cl, —Br, —I, —OR', —SR', —C(O)R', —C(O)OR', —NHCOR', —NO$_2$, —CN, —SO$_3$H, —NR'R", preferably —CH$_3$, —NO$_2$, —CN, —COCH$_3$, —CO$_2$CH$_2$CH$_3$, —NHCOCH$_3$, with R' and R" independently of one another equal to H or alkyl, preferably C1-C6 alkyl, and two groups R in Formulas (VIII), and (X) are equal to groups -L¹-Y¹ and -L²-Y², and L¹ and L² are independently of one another a single bond, optionally substituted cycloalkyl or aromatic ring, linear or branched, optionally substituted, alkylene, where one or more non-adjacent C atoms may be replaced by O, S and/or N, and/or one or more double and/or triple bonds may be present in the chain and/or side chain or a combination thereof, preferably phenylene or C1-C6 alkyl, preferably identical, and Y¹ and Y² are independently of one another, polymerisable group, preferably acrylate or methacrylate, preferably identical, and Me stands for metals or metal oxides capable of being introduced, e.g. V, VO, Cd, TiO, Ti, Mn, Cr, Fe, Co, Ni, Cu, Zn, Pd, Cd, Mg, Hg Zr, Al, MoO2, Pt, Ru, Rh, Pd and the like. Out of these Cr, and Cu are preferred, and Cr is further more preferred.

Preferably groups R are selected from H, C1-C6 alkyl, preferably CH₃, —C(O)R', —C(O)OR', —NO₂, —CN, —NHCOR', with R' independently of one another equal to C1-C6 alkyl, preferably C1 or C2 alkyl.

Preferably groups L¹ and L² are selected from phenylene or C1-C6 alkyl, a polyether alkyl chain, or a combination thereof, preferably C2-C4 alkyl, especially C2 and C4 alkyl. Especially identical groups L¹ and L² are preferred.

Preferably groups Y¹ and Y² are selected from methyl acrylate or methyl methacrylate. Especially identical groups Y¹ and Y² are preferred.

Polymerisable dyes of Formulas (I)-(VI) are preferred, especially those comprising the preferred groups R, R', R", L¹, L², Y¹ and Y². Preferably dyes of Formulas (I')-(VI') are used:

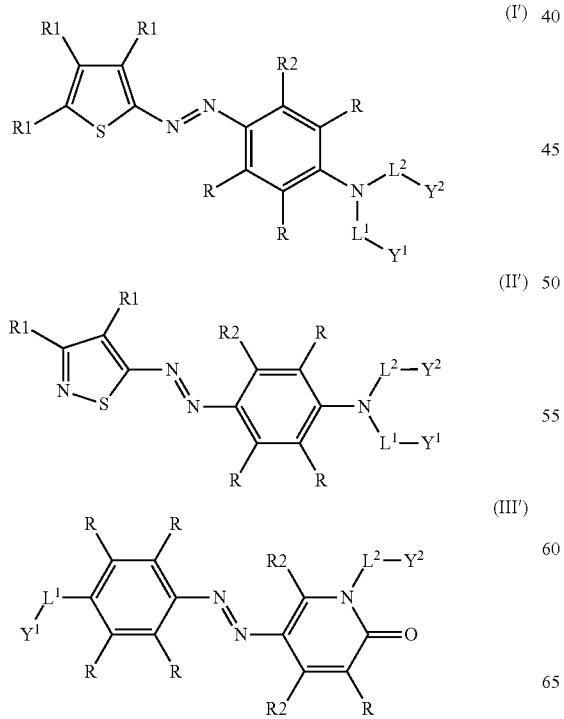

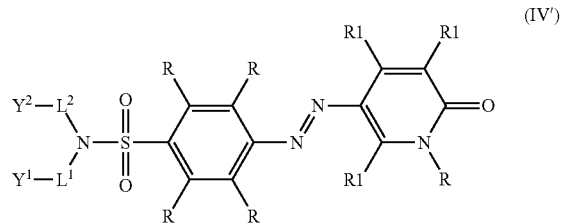

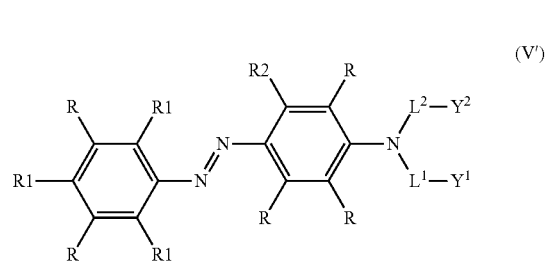

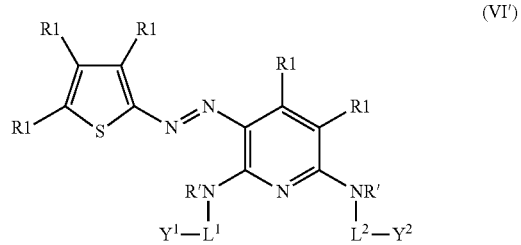

wherein R is H; R1 and R2 are independently of one another alkyl, preferably C1-C6 alkyl, —OR', —SR', —C(O)R', —C(O)OR', —NHCOR', —NO₂, —CN, with R' equal to H or alkyl, preferably C1-C6 alkyl, especially C1-C3 alkyl; L¹ and L² are independently of one another a single bond, C1-C6 alkyl, a polyether alkyl chain, or a combination thereof, preferably C2-C4 alkyl, especially C2 and C4 alkyl, especially identical groups L¹ and L² are preferred; and Y¹ and Y² are methyl acrylate or methyl methacrylate, especially identical groups Y¹ and Y² are preferred.

Especially preferred are polymerisable dyes of Formulas (I')-(VI') wherein R is H; R1 and R2 are independently of one another —CH₃, —NO₂, —OH, —CN, —COCH₃, —CO₂CH₂CH₃, —NHCOR'; L¹ and L² are, preferably identical, C2-C4 alkyl, and Y¹ and Y² are, preferably identical, methyl acrylate or methyl methacrylate, wherein R2 is preferably —CH₃, —OH or —NHCOR'.

The preparation of polymerisable dyes of Formula (I) by a 2 step procedure under convenient conditions as known in the art is exemplified in the following scheme for 2-Methacrylic acid 2-{[4-(3,5-dicyano-4-methylthien-2-ylazo)-phenyl]-[2-(2-methacryloyloxy)-ethyl]-amino}ethyl ester (MM6):

Scheme A: Dyes of Formula (I):

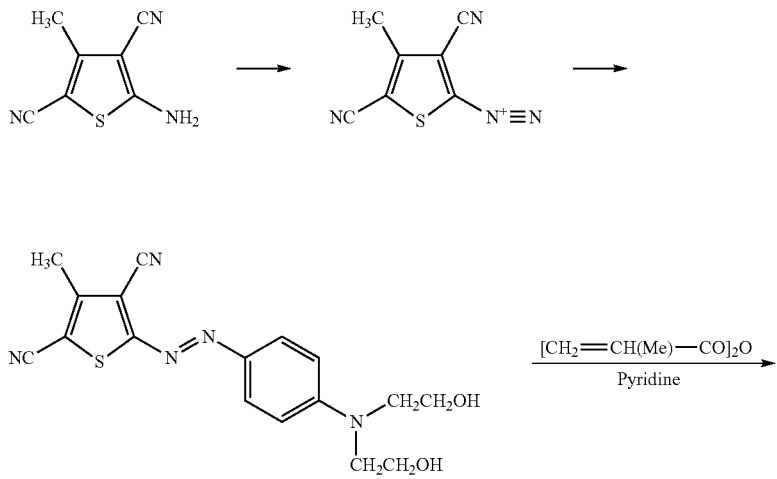

The preparation of polymerisable dyes of Formula (II) by a 2 step procedure under convenient conditions as known in the art is exemplified in the following scheme for 2-Methacrylic acid 2-{[3-acetylamino-4-(4-cyano-3-methylisothiazol-5-ylazo)-phenyl]-[2-(2-methacryloyloxy)-ethyl]amino}-ethyl ester (MM7):

Scheme B: Dyes of Formula (II):

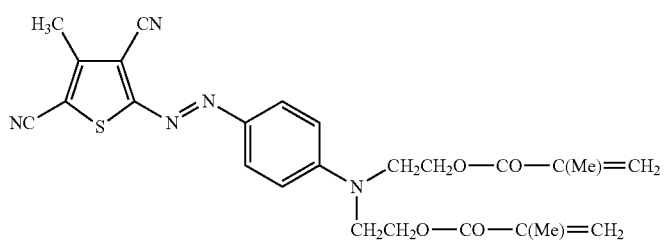

-continued

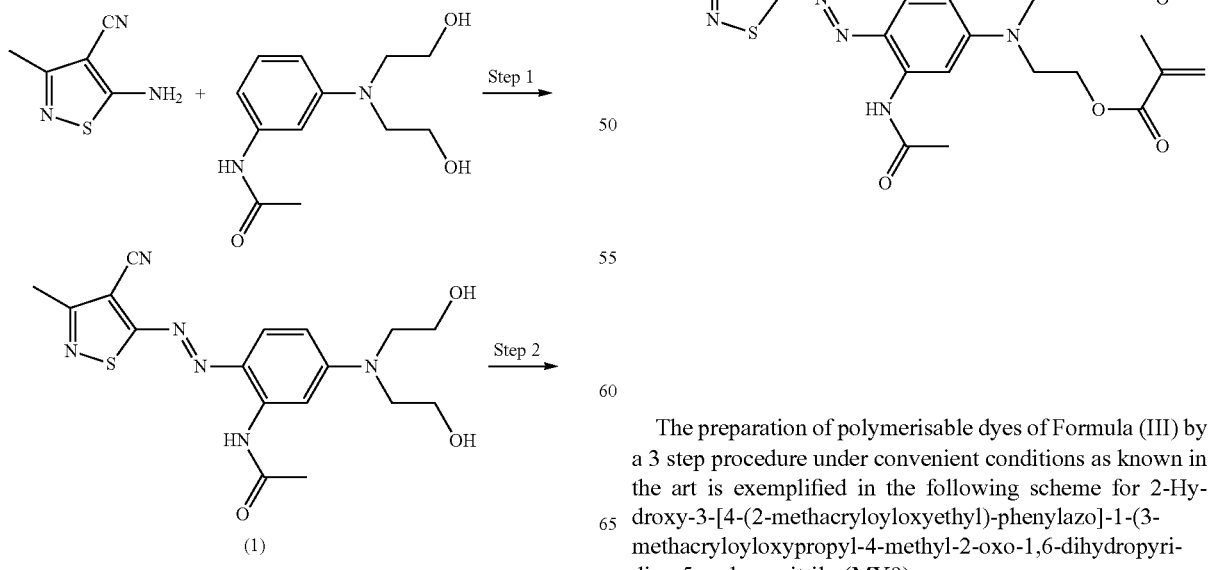

The preparation of polymerisable dyes of Formula (III) by a 3 step procedure under convenient conditions as known in the art is exemplified in the following scheme for 2-Hydroxy-3-[4-(2-methacryloyloxyethyl)-phenylazo]-1-(3-methacryloyloxypropyl-4-methyl-2-oxo-1,6-dihydropyridine-5-carbononitrile (MY9):

Scheme C: Dyes of Formula (III):
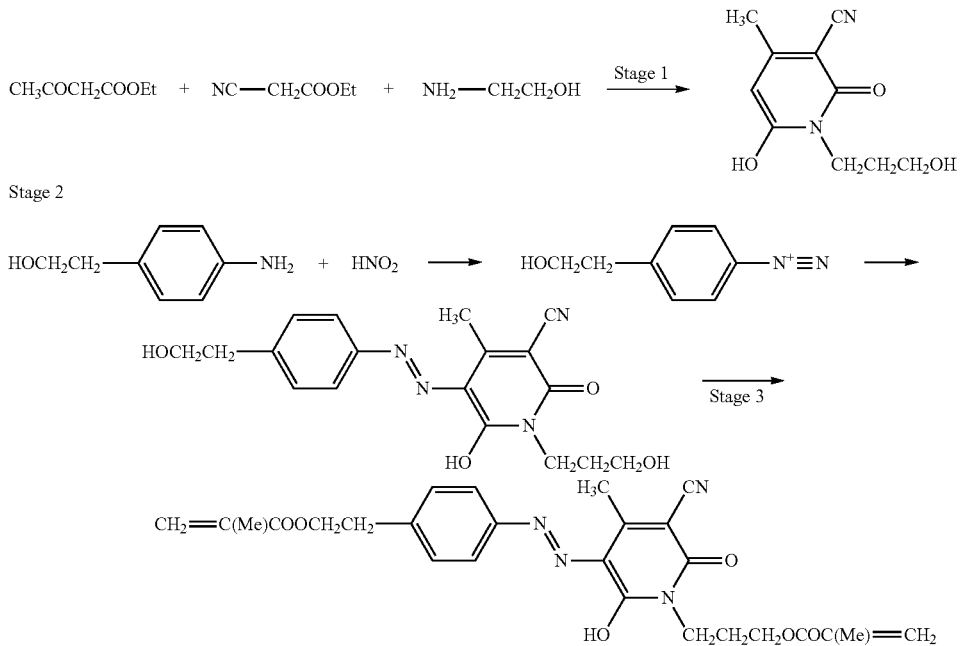
The preparation of polymerisable dyes of Formula (IV) by a 4 step procedure under convenient conditions as known in the art is exemplified in the following scheme for 2-Methacrylic acid 2-{[4-(1-butyl-5-cyano-2-hydroxy-4-methyl-6-oxo-1,6-dihydro-pyridin-3-ylazo)-benzenesulphonyl]-[2-(2-methacryloyloxy)-ethyl]-amino}ethyl ester (MY10):
Scheme D: Dyes of Formula (IV):
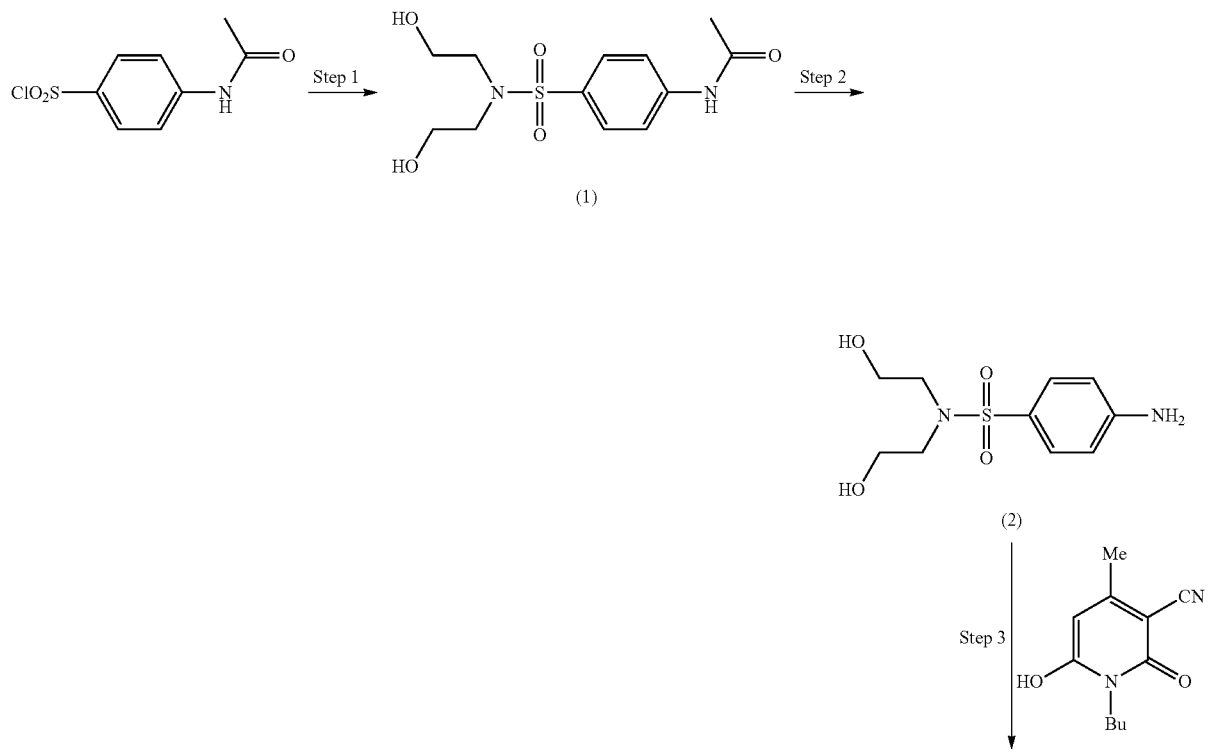

-continued

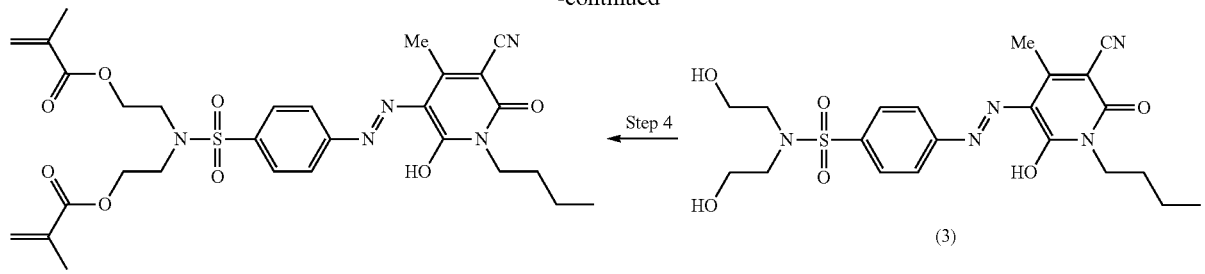

(3)

The preparation of polymerisable dyes of Formula (V) by a 3 step procedure under convenient conditions as known in the art is exemplified in the following scheme for 2,2'-(3-acetamido-4-((2,6-dicyano-4-nitrophenyl)diazenyl)phenylazanediyl)bis(ethane-2,1-diyl) bis(2-methylacrylate) (MB2):

Scheme E: Dyes of Formula (V):

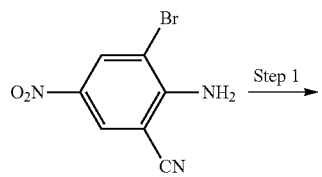 Step 1

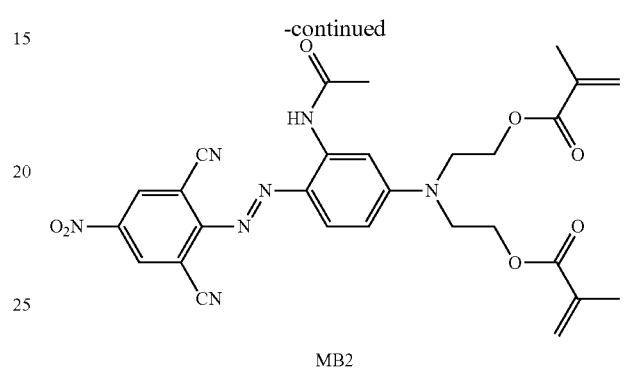

MB2

The preparation of polymerisable dyes of Formula (VI) by a 3 step procedure under convenient conditions as known in the art is exemplified in the following scheme for 2-Methacrylic acid-2-{3-cyano-5-(3,5-dicyano-4-methylthiopen-2-ylazo)-4-methyl-6-[2-(2-methacryloyloxy)-ethylamino]-pyridin-2-ylamino}-ethyl ester (MM8):

Scheme F: Dyes of Formula (VI):

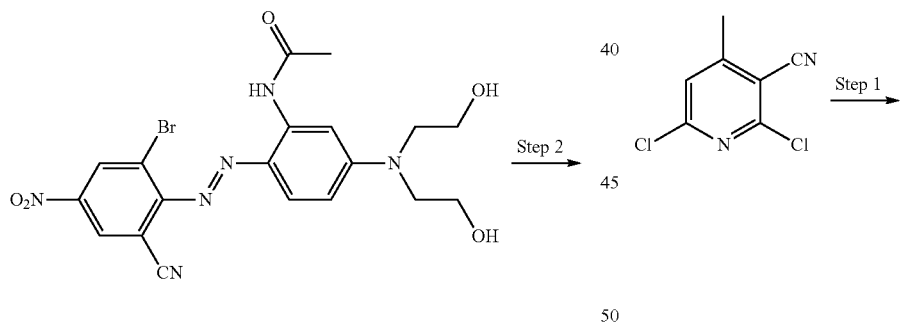

Step 2

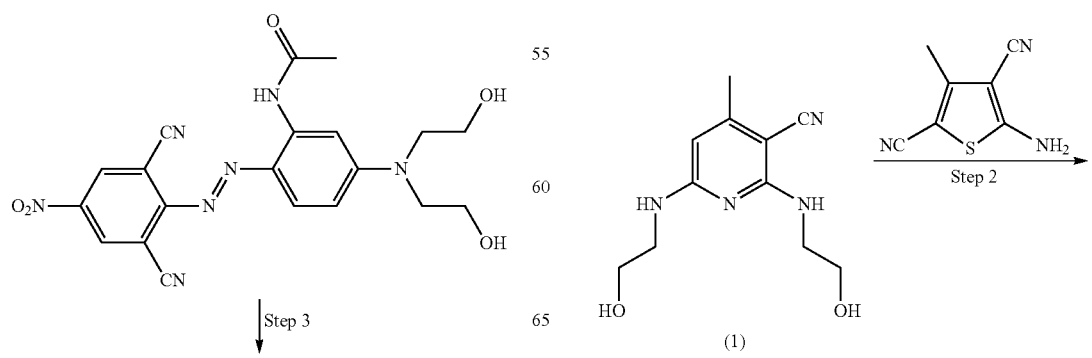

(1)

Step 3

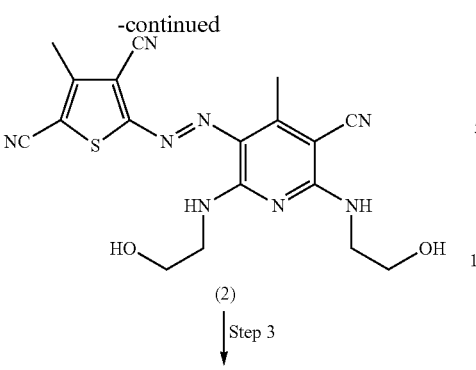

(2)

↓ Step 3

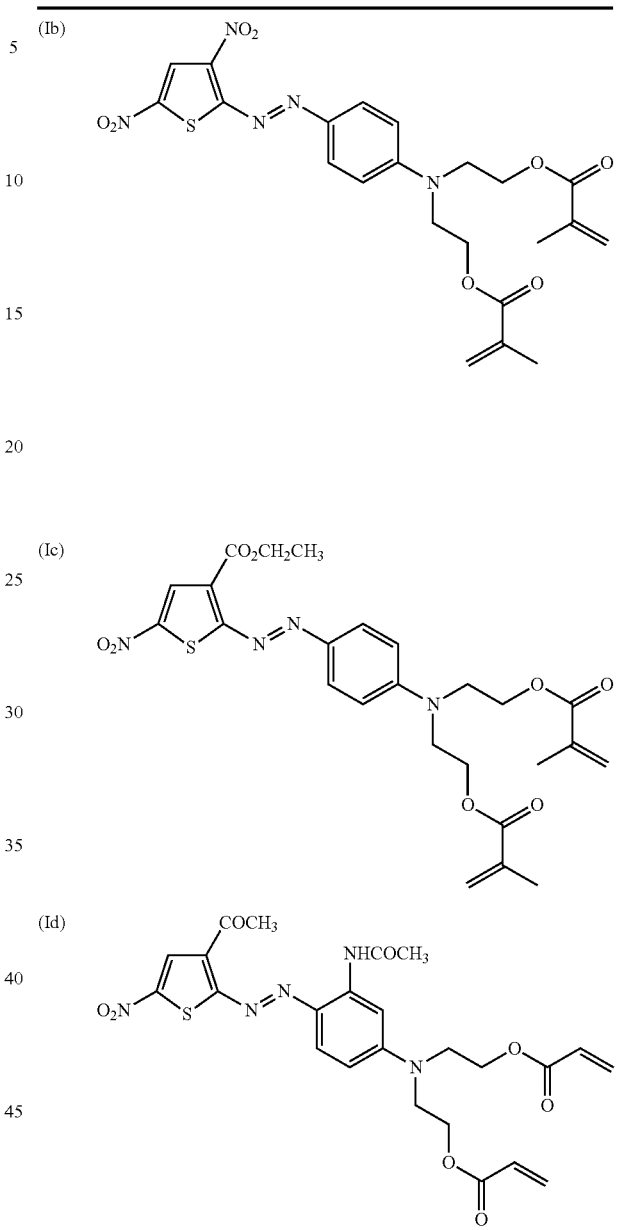

Suitable examples of mono azo dyes according to Formula (I) are summarised in Table 1, where the corresponding methyl methacrylate or acrylate derivatives are also suitable.

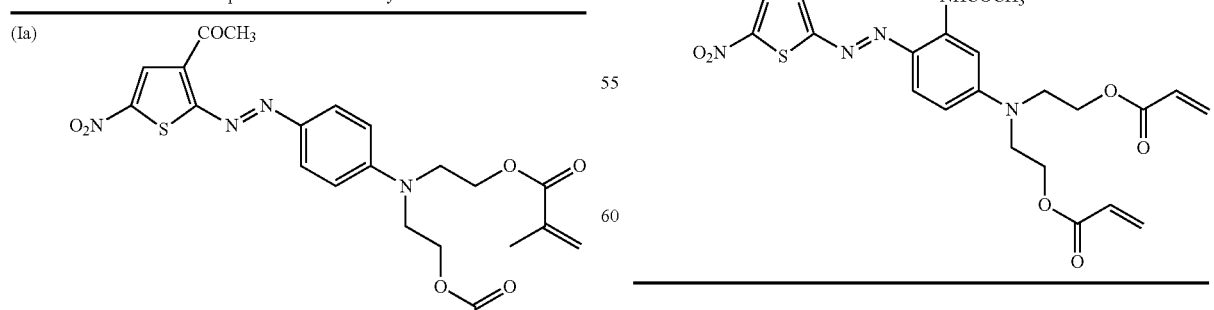

Suitable examples of disazo dyes according to Formulas (VII) and (VIII) are summarised in Table 2, where the corresponding methyl methacrylate or acrylate derivatives are also suitable:

TABLE 2
Examples of Disazo Dyes
(VIIa)
Disazo
Cyan 1
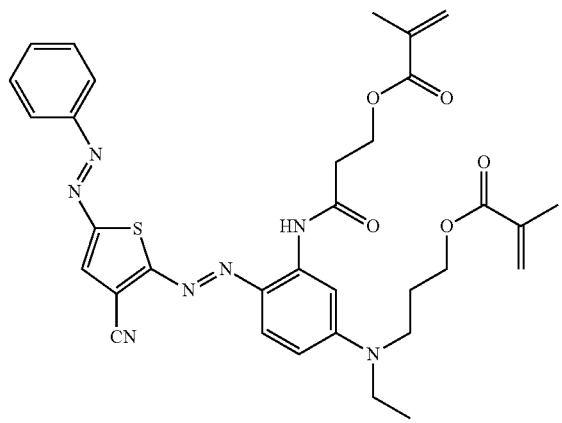 [SMILES: C=C(C)C(=O)OCCCN(CC)c1ccc(/N=N/c2sc(/N=N/c3ccccc3)cc2C#N)c(NC(=O)CCOC(=O)C(=C)C)c1]
(VIIb)
Disazo
Cyan 2
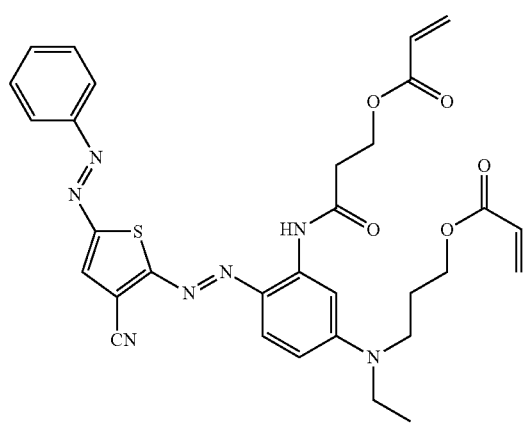 [SMILES: C=CC(=O)OCCCN(CC)c1ccc(/N=N/c2sc(/N=N/c3ccccc3)cc2C#N)c(NC(=O)CCOC(=O)C=C)c1]
(VIIIa)
Disazo
Yellow 1
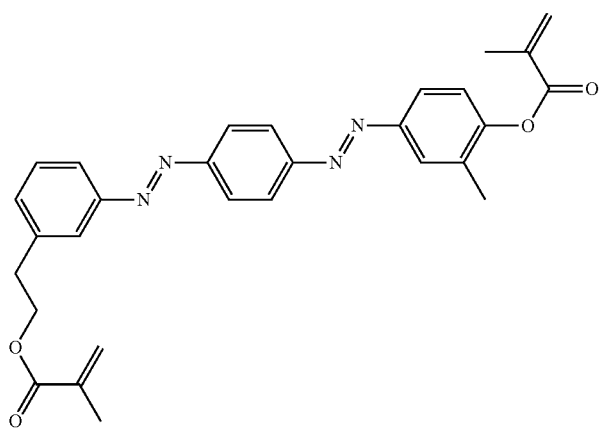 [SMILES: C=C(C)C(=O)OCCc1cccc(/N=N/c2ccc(/N=N/c3ccc(OC(=O)C(=C)C)c(C)c3)cc2)c1]

TABLE 2-continued
Examples of Disazo Dyes
(VIIIb) Disazo Yellow 2
(VIIIc) Disazo Red 1
The preparation of such polymerisable dyes is exemplified in the following schemes 1-3 for acrylate derivatives:
Scheme 1 Disazo Cyan 2-Dye of Formula (VIIb):
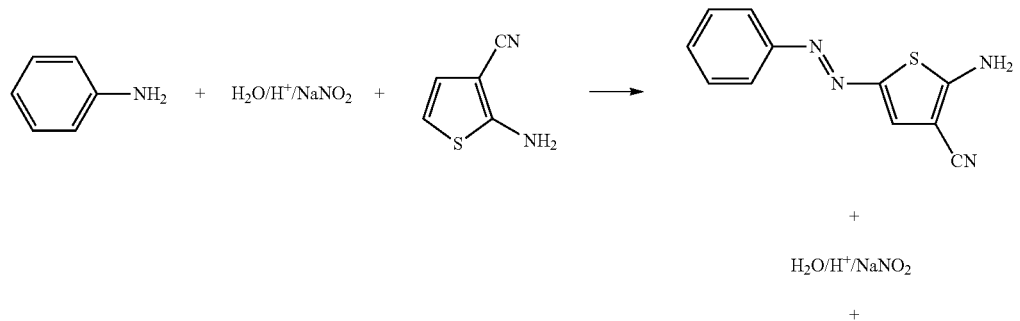
+
$H_2O/H^+/NaNO_2$
+

-continued
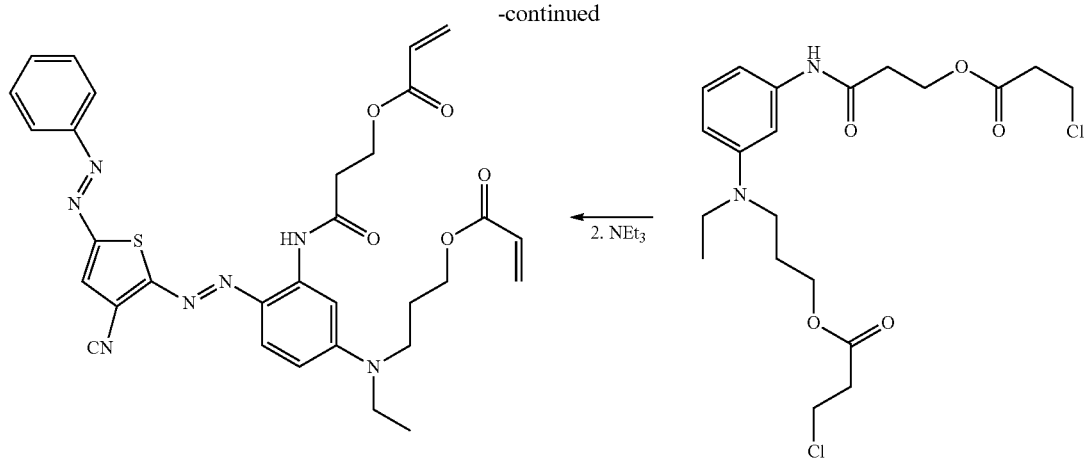
Scheme 2: Disazo Yellow 1-Dye of Formula (VIIIa):
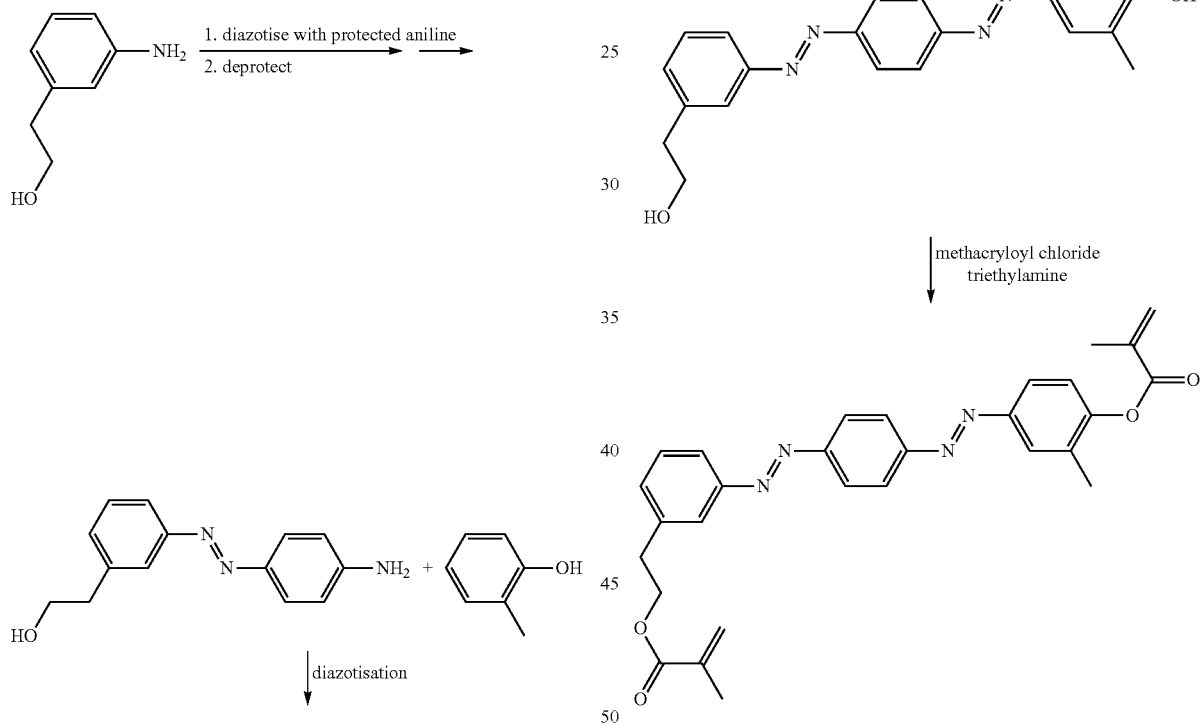
Scheme 3: Disazo Red 1- Dye of Formula (VIIIc):
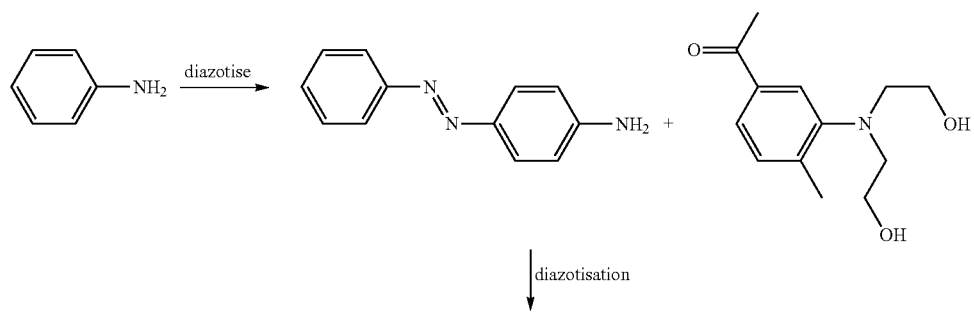

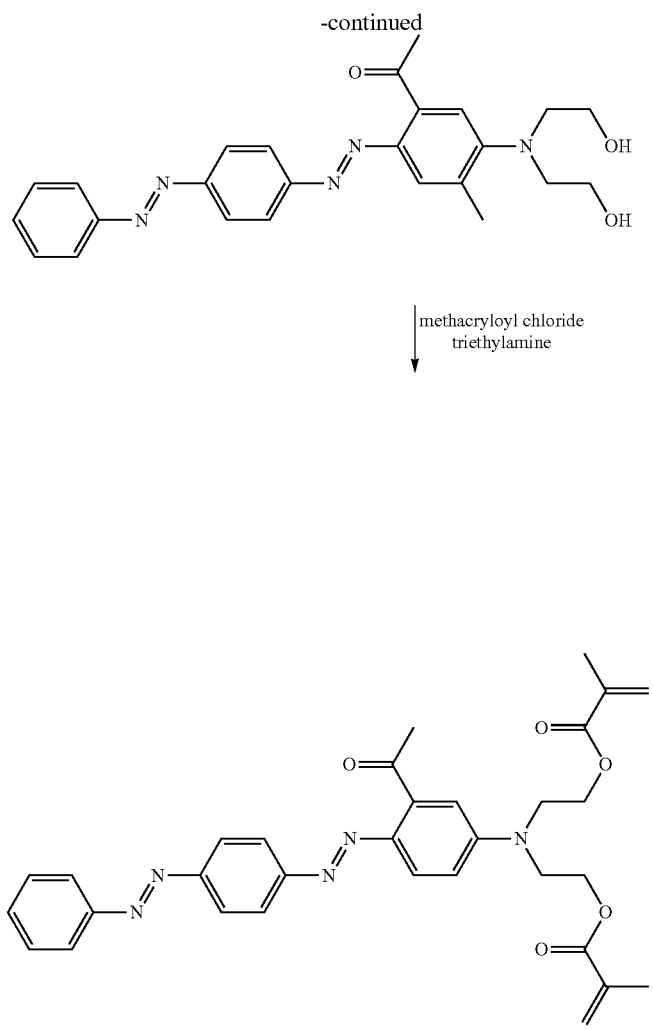
Suitable examples of metallised azo dyes according to Formula (X) are summarised in Table 3, where the corresponding methyl methacrylate or acrylate derivatives are also suitable.
TABLE 3
Examples of Metallised Azo Dyes
(Xa) Metallised Azo Black 1
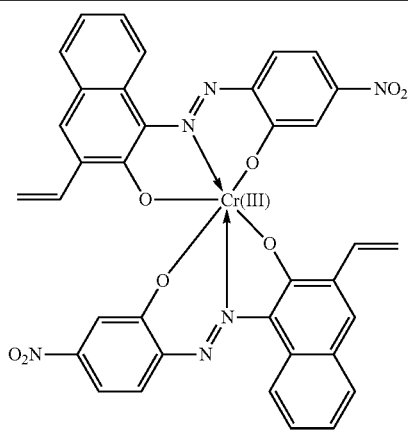

TABLE 3-continued
Examples of Metallised Azo Dyes
(Xb) Metallised Azo Black 2
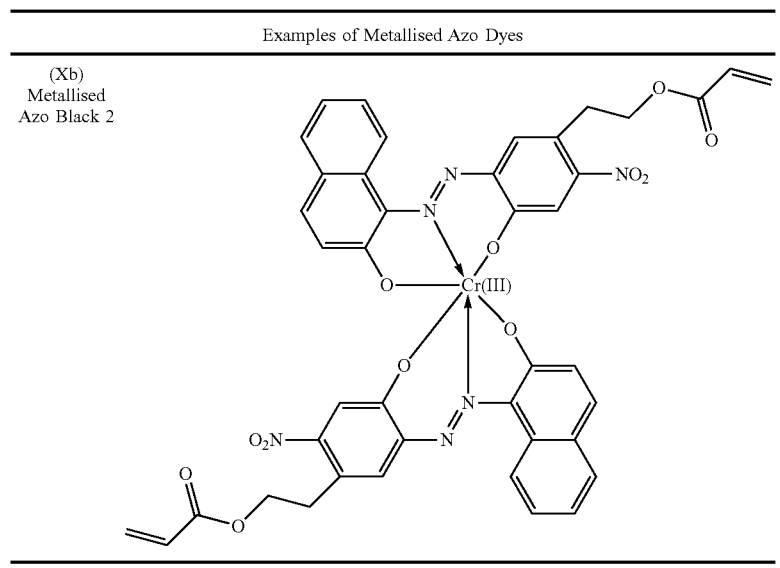
The preparation of such polymerisable dyes is exemplified in schemes 4 and 5 for acrylate derivatives:
Scheme 4: Metallised Azo Black 1-Dye of Formula (Xa):
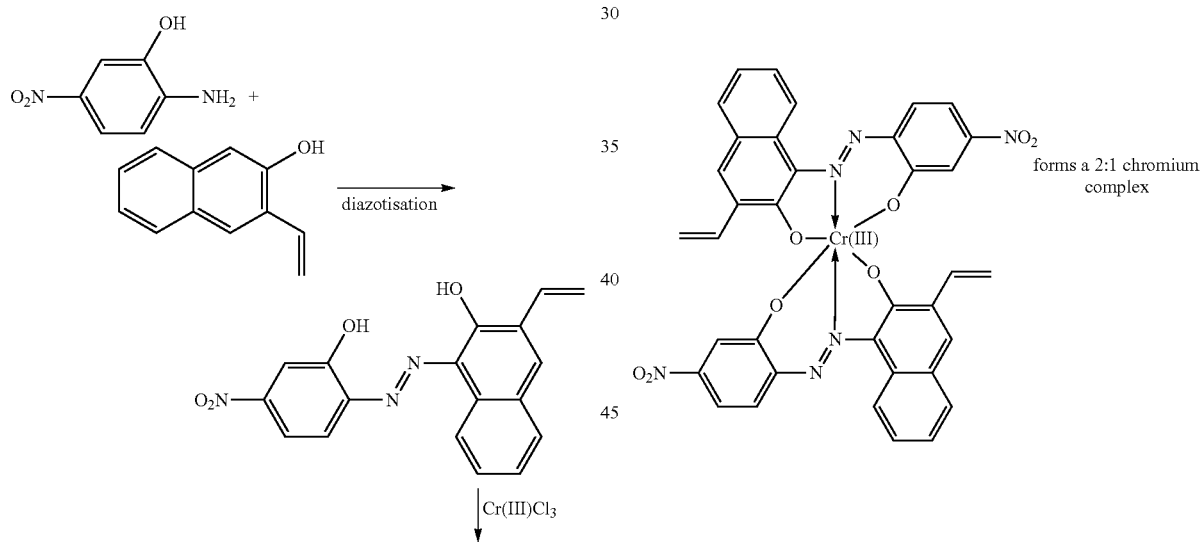
forms a 2:1 chromium complex
-continued
Scheme 5: Metallised Azo Black 2-Dye of Formula (Xb):
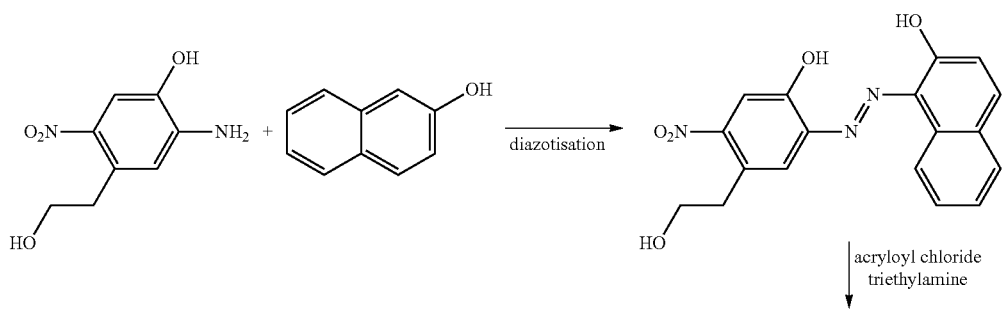

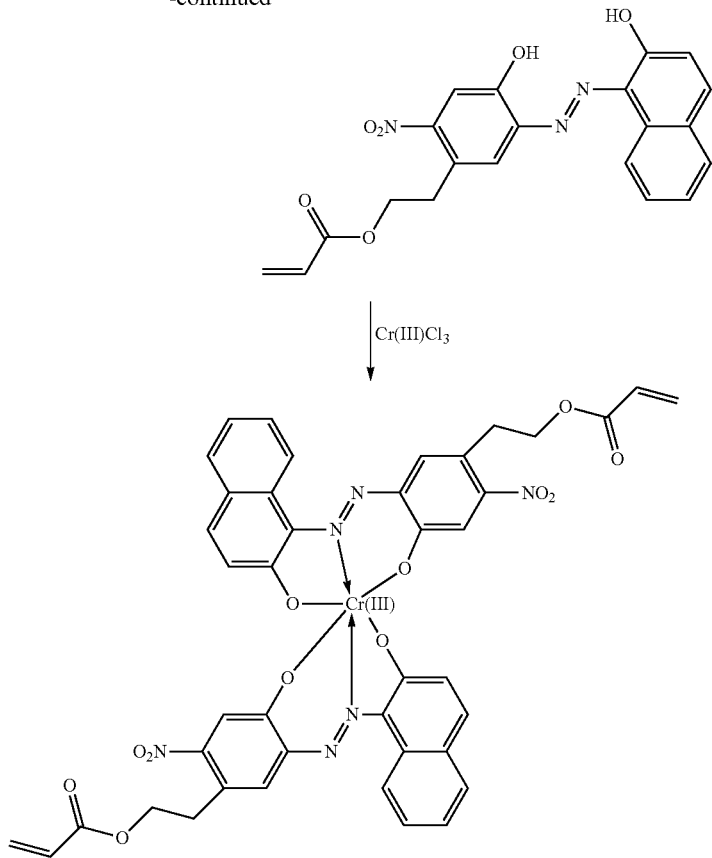

Also polymerisable phthalocyanine dyes of Formula (XI) are preferably used:

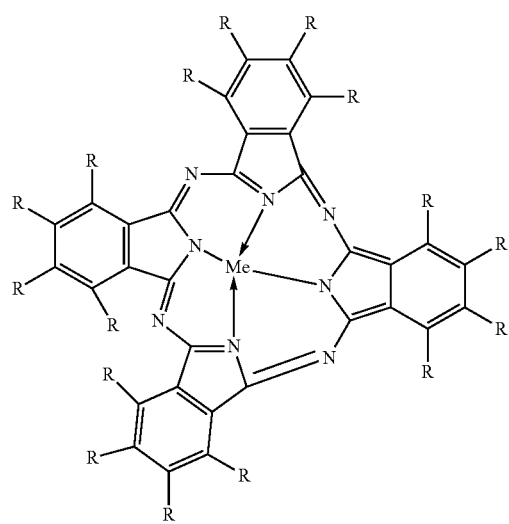

(XI)

wherein the aromatic or heteroaromatic cycles are substituted by one or more different or identical groups R selected from the group consisting of H, alkyl, preferably C1-C6 alkyl, substituted or non-substituted aryl, —F, —Cl, —Br, —I, —OR', —SR', —C(O)R', —C(O)OR', —NHCOR', —NO$_2$, —CN, —SO$_3$H, —NR'R", preferably —CH$_3$, —NO$_2$, —CN, —COCH$_3$, —CO$_2$CH$_2$CH$_3$, —NHCOCH$_3$, —SO$_2$—NR'R", with R' and R" independently of one another equal to H or alkyl, preferably C1-C6 alkyl, and two groups R are equal to groups -L$^1$-Y$^1$ and -L$^2$-Y$^2$, and L$^1$ and L$^2$ are independently of one another a single bond, optionally substituted cycloalkyl or aromatic ring, linear or branched, optionally substituted, alkylene, where one or more non-adjacent C atoms may be replaced by O, S and/or N, especially —SO$_2$—N—, and/or one or more double and/or triple bonds may be present in the chain and/or side chain or a combination thereof, preferably phenylene or C1-C6 alkyl, preferably identical, and Y$^1$ and Y$^2$ are independently of one another, polymerisable group, preferably an acrylate or methacrylate, preferably identical, and Me stands for metals or metal oxides capable of being introduced, e.g. V, VO, Cd, TiO, Ti, Mn, Cr, Fe, Co, Ni, Cu, Zn, Pd, Cd, Mg, Hg Zr, Al, MoO$_2$, Pt, Ru, Rh, Hf, Sb, Sn, Pb, Pd and the like. Out of these Ni and Cu are preferred, and Cu is most preferred.

Preferably groups R are selected from H, C1-C6 alkyl, preferably CH$_3$, —C(O)R', —C(O)OR', —NO$_2$, —CN, —NHCOR', —SO$_2$—NR'R", with R' independently of one another equal to C1-C6 alkyl, preferably C1 or C2 alkyl. Preferably groups L$^1$ and L$^2$ are selected from phenylene, —SO$_2$—N—C2-C10 alkyl, or C1-C6 alkyl, a polyether alkyl chain, or a combination thereof, preferably C2-C4 alkyl, especially C2 and C4 alkyl. Especially identical groups L$^1$ and L$^2$ are preferred.

Preferably groups Y$^1$ and Y$^2$ are selected from methyl acrylate or methyl methacrylate. Especially identical groups $Y^1$ and $Y^2$ are preferred. Especially dyes comprising all variables in their preferred form are used, especially dyes of Formula (XI'):

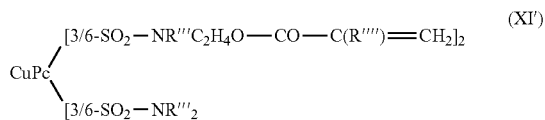

Wherein R''' is C1-C10 alkyl, preferably C1-C6 alkyl, and R'''' is H or methyl, and "3/6" means mixtures of compounds substituted in the 3 position and compounds substituted in the 6 position.

Suitable examples of phthalocyanine dyes according to Formula (XI) are summarised in Table 4, where the corresponding methyl methacrylate or acrylate derivatives are also suitable.

TABLE 4

Examples of Phthalocyanine Dyes (XIa) Metallised Cyan 1

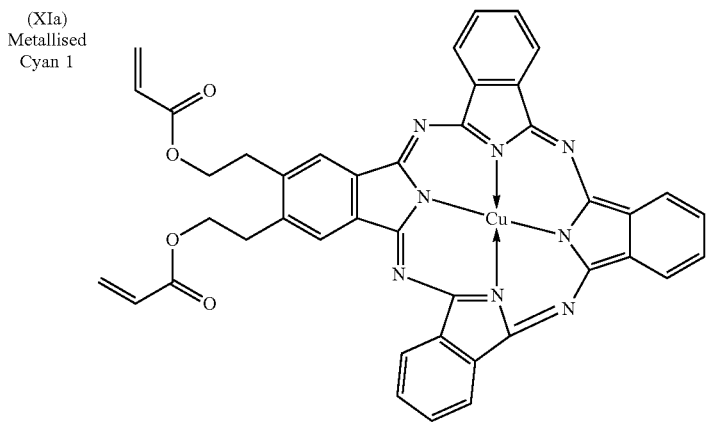

(XIb) Metallised Cyan 5 MC5

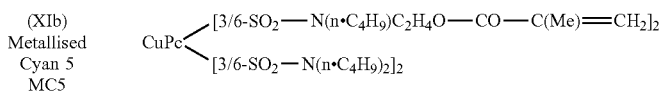

(XIc) Metallised Cyan 6 MC6

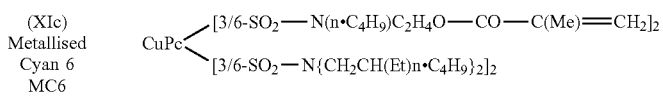

(XIb) Metallised Cyan 7 MC7

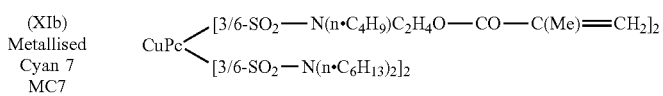

(XIb) Metallised Cyan 8 MC8

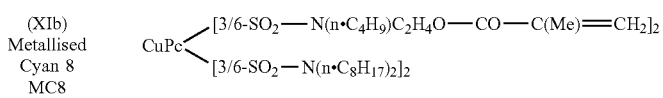

The preparation of such polymerisable dyes of Formula (XI) by a 2 or 3 step procedure under convenient conditions as known in the art is exemplified in scheme 6a for acrylate derivatives of Formula (XIa) and for dyes of Formula (XI') in scheme 6b (MC5):

Scheme 6a: Metallised Azo Cyan 1-Dye of Formula (XIa):

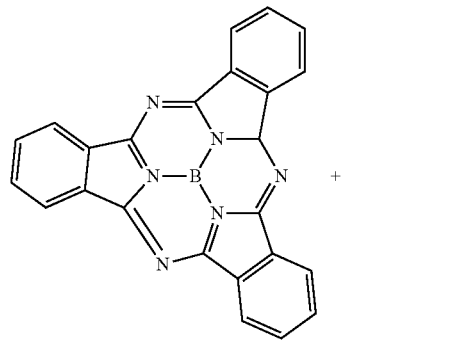

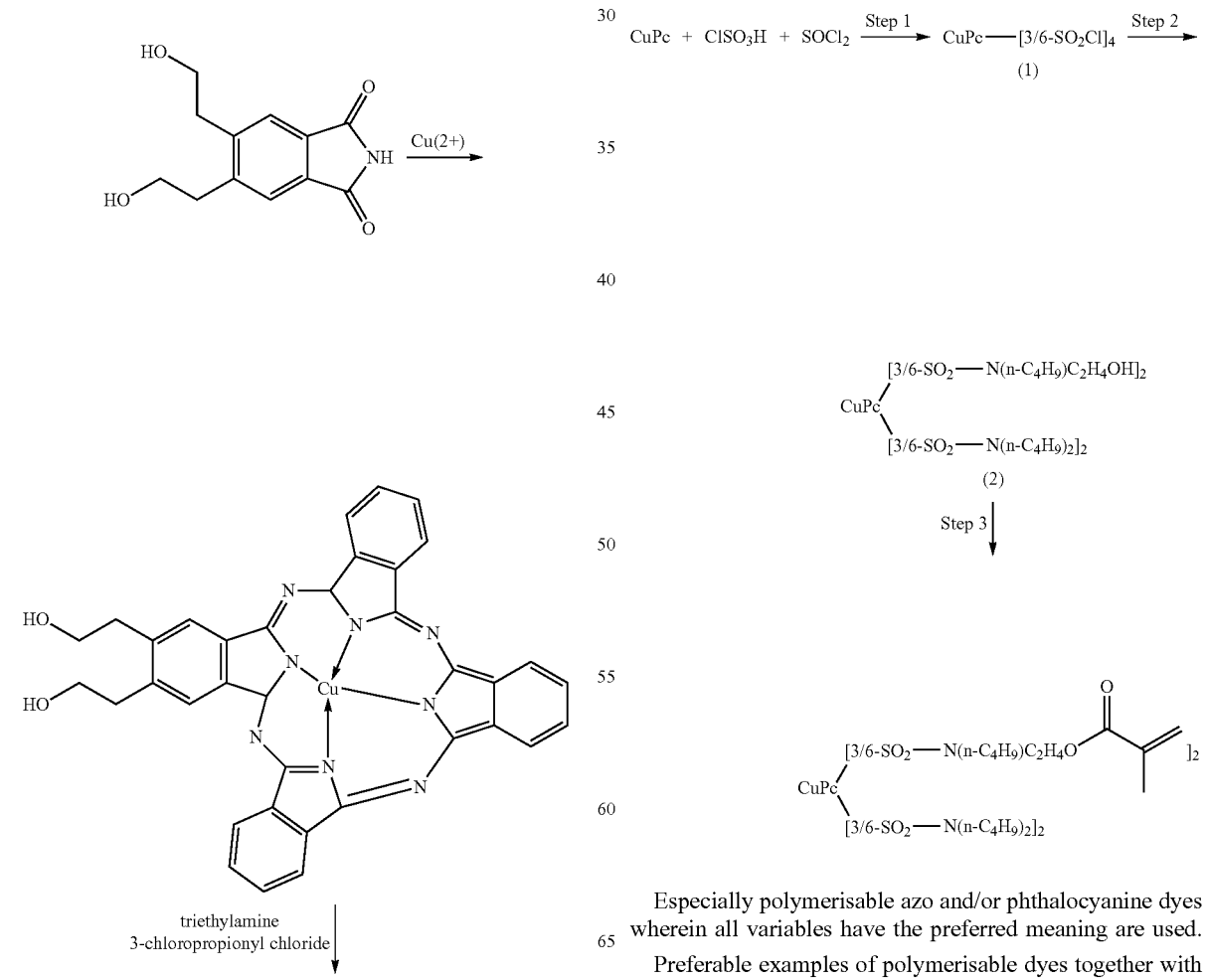

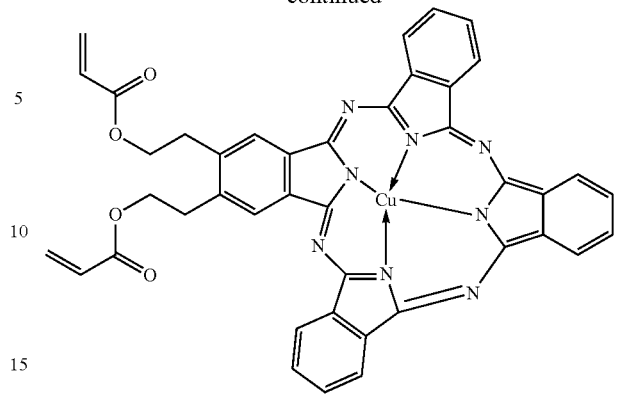

Scheme 6b: Dyes of Formula (XI'):

$$CuPc + ClSO_3H + SOCl_2 \xrightarrow{Step\ 1} CuPc\text{---}[3/6\text{-}SO_2Cl]_4 \xrightarrow{Step\ 2}$$
(1)

$$CuPc\begin{matrix}[3/6\text{-}SO_2\text{---}N(n\text{-}C_4H_9)C_2H_4OH]_2 \\ [3/6\text{-}SO_2\text{---}N(n\text{-}C_4H_9)_2]_2\end{matrix}$$
(2)

Step 3 ↓

$$CuPc\begin{matrix}[3/6\text{-}SO_2\text{---}N(n\text{-}C_4H_9)C_2H_4O\overset{O}{\overset{\|}{C}}\phantom{X}]_2 \\ [3/6\text{-}SO_2\text{---}N(n\text{-}C_4H_9)_2]_2\end{matrix}$$

Especially polymerisable azo and/or phthalocyanine dyes wherein all variables have the preferred meaning are used.

Preferable examples of polymerisable dyes together with comparison dyes are summarised in the following Tables.

TABLE 5
Examples of Yellow Dyes
| Ref. | Category/Description | Structure |
|---|---|---|
| MY9 (comparison) | Disperse bis-(methacrylate) | 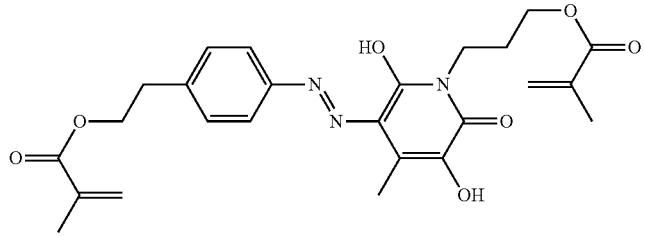 [SMILES: C=C(C)C(=O)OCCCn1c(O)c(/N=N/c2ccc(CCOC(=O)C(=C)C)cc2)c(C)c(O)c1=O] |
| MY10 | Disperse bis-(methacrylate) | 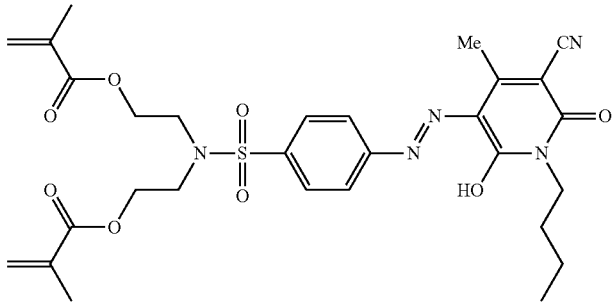 [SMILES: C=C(C)C(=O)OCCN(CCOC(=O)C(=C)C)S(=O)(=O)c1ccc(/N=N/c2c(C)c(C#N)c(=O)n(CCCC)c2O)cc1] |
| MY11 | Disperse bis-(methacrylate) | 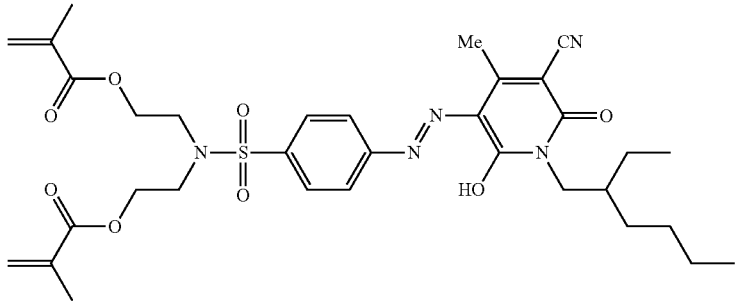 [SMILES: C=C(C)C(=O)OCCN(CCOC(=O)C(=C)C)S(=O)(=O)c1ccc(/N=N/c2c(C)c(C#N)c(=O)n(CC(CC)CCCC)c2O)cc1] |
| MY12 | Disperse bis-(methacrylate) | 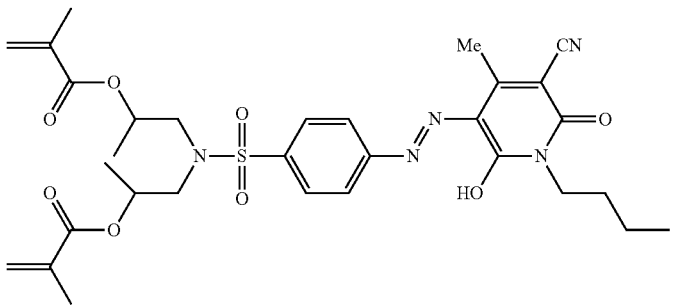 [SMILES: C=C(C)C(=O)OC(C)CN(CC(C)OC(=O)C(=C)C)S(=O)(=O)c1ccc(/N=N/c2c(C)c(C#N)c(=O)n(CCCC)c2O)cc1] |
| MY13 | Disperse bis-(acrylate) | 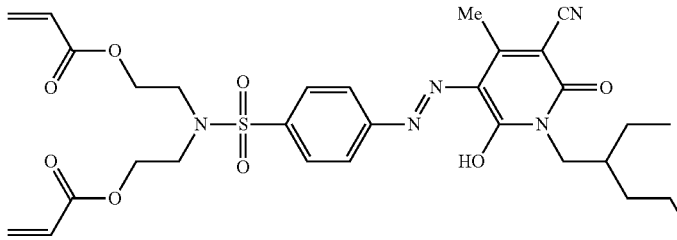 |

TABLE 6
Examples of Red Dyes
| Ref. | | Structure |
|---|---|---|
| MR1 (comparison) | Methacrylated Disperse Red 1 | 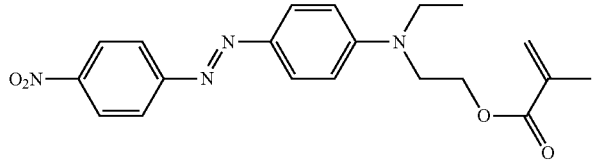 [SMILES: C=C(C)C(=O)OCCN(CC)c1ccc(/N=N/c2ccc([N+](=O)[O-])cc2)cc1] |
| MR2 | Bis-acrylate of Disperse Red 19 | 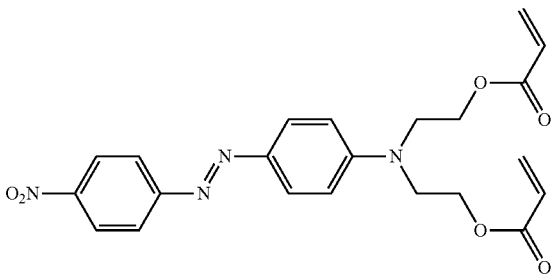 [SMILES: C=CC(=O)OCCN(CCOC(=O)C=C)c1ccc(/N=N/c2ccc([N+](=O)[O-])cc2)cc1] |
| MR3 | Bis-methacrylate of Disperse Red 19 | 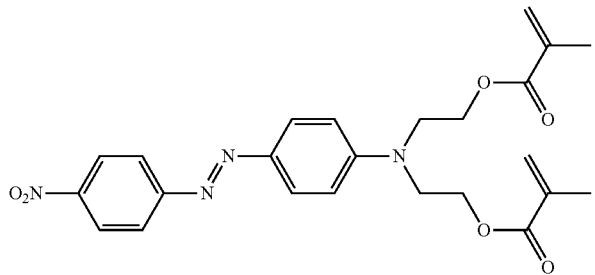 [SMILES: C=C(C)C(=O)OCCN(CCOC(=O)C(=C)C)c1ccc(/N=N/c2ccc([N+](=O)[O-])cc2)cc1] |
| MR4 | Disperse bis-(methacrylate) | 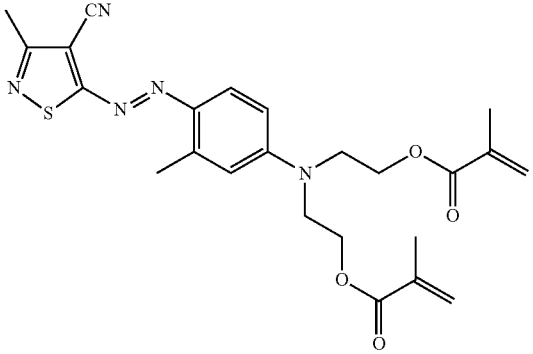 [SMILES: C=C(C)C(=O)OCCN(CCOC(=O)C(=C)C)c1ccc(/N=N/c2snc(C)c2C#N)c(C)c1] |
| MR5 | Disperse bis-(methacrylate) | 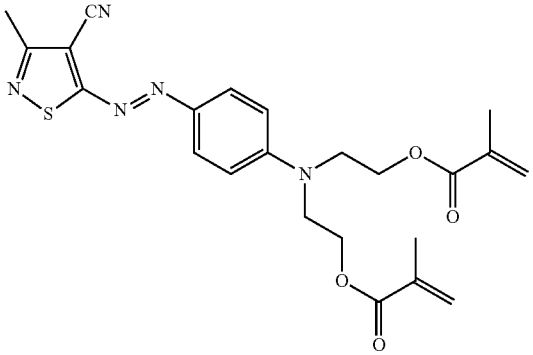 [SMILES: C=C(C)C(=O)OCCN(CCOC(=O)C(=C)C)c1ccc(/N=N/c2snc(C)c2C#N)cc1] |

TABLE 6-continued

Examples of Red Dyes

| Ref. | | Structure |
|---|---|---|
| MR6 | Disperse bis-(methacrylate) | *(chemical structure)* |

TABLE 7

Examples of Magenta Dyes

| Ref. | Category/Description | Structure |
|---|---|---|
| MM6 | Disperse bis-(methacrylate) | *(chemical structure)* |
| MM7 | Disperse bis-(methacrylate) | *(chemical structure)* |
| MM8 | Disperse bis-(methacrylate) | *(chemical structure)* |

TABLE 7-continued
Examples of Magenta Dyes
| Ref. | Category/Description | Structure |
|---|---|---|
| MM9 | Disperse bis-(methacrylate) | 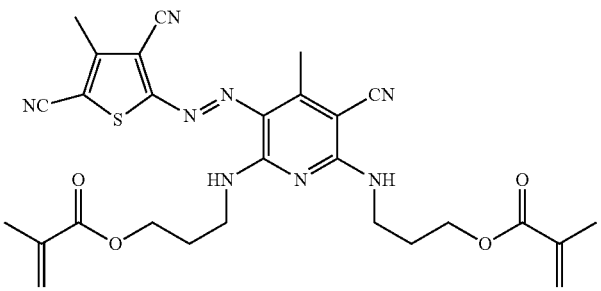 [SMILES: C=C(C)C(=O)OCCCNc1nc(NCCCOC(=O)C(=C)C)c(/N=N/c2sc(C#N)c(C)c2C#N)c(C)c1C#N] |
| MM10 | Disperse bis-acrylate | 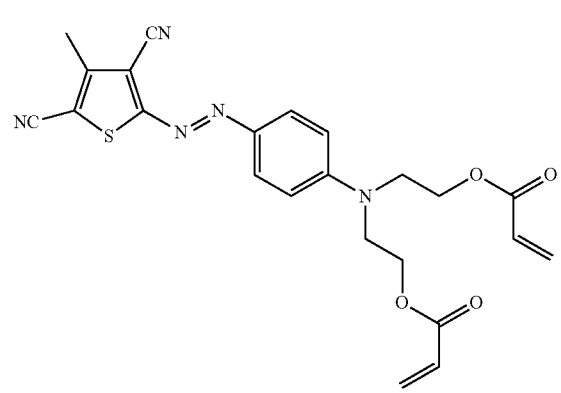 [SMILES: C=CC(=O)OCCN(CCOC(=O)C=C)c1ccc(/N=N/c2sc(C#N)c(C)c2C#N)cc1] |
| MM11 | Disperse bis-acrylate | 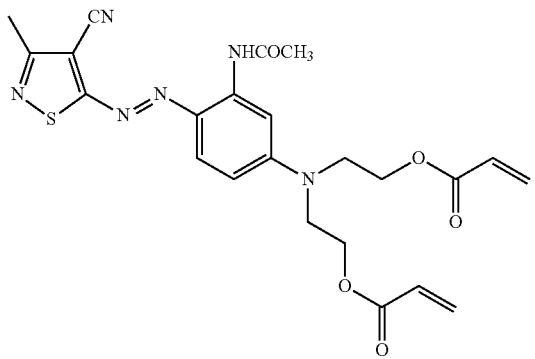 |
| MM12 | Disperse bis-acrylate | 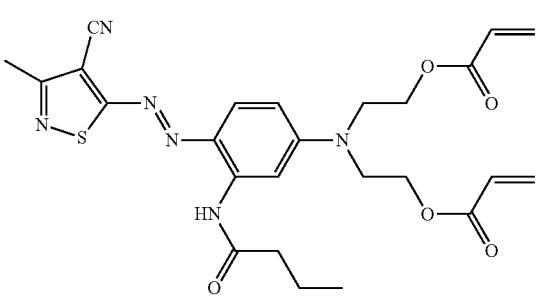 [SMILES: C=CC(=O)OCCN(CCOC(=O)C=C)c1ccc(/N=N/c2snc(C)c2C#N)c(NC(=O)CCC)c1] |

TABLE 7-continued

Examples of Magenta Dyes

| Ref. | Category/Description | Structure |
|---|---|---|
| MM13 | Disperse bis-methacrylate | 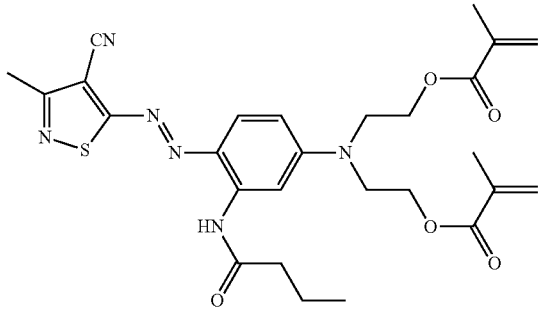 [SMILES: C=C(C)C(=O)OCCN(CCOC(=O)C(=C)C)c1ccc(/N=N/c2snc(C)c2C#N)c(NC(=O)CCC)c1] |
| MM16 | Disperse bis-acrylate | 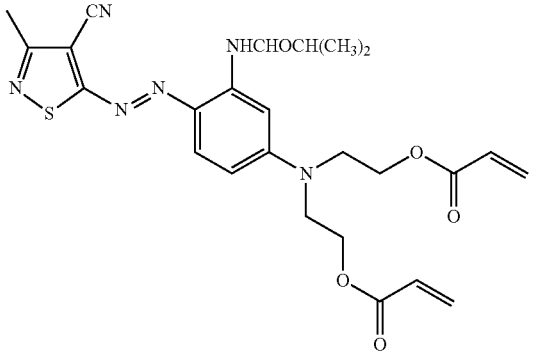 |

TABLE 8

Examples of Cyan Dyes

| Ref. | Category/Description | Structure |
|---|---|---|
| MC5 | copper phthalocyanine methacrylate | CuPc$\big\langle$ [3/6-SO$_2$—N(n•C$_4$H$_9$)C$_2$H$_4$O—CO—C(Me)=CH$_2$]$_2$ <br> [3/6-SO$_2$—N(n•C$_4$H$_9$)$_2$]$_2$ |
| MC6 | copper phthalocyanine methacrylate | CuPc$\big\langle$ [3/6-SO$_2$—N(n•C$_4$H$_9$)C$_2$H$_4$O—CO—C(Me)=CH$_2$]$_2$ <br> [3/6-SO$_2$—N{CH$_2$CH(Et)n•C$_4$H$_9$}$_2$]$_2$ |
| MC7 | copper phthalocyanine methacrylate | CuPc$\big\langle$ [3/6-SO$_2$—N(n•C$_4$H$_9$)C$_2$H$_4$O—CO—C(Me)=CH$_2$]$_2$ <br> [3/6-SO$_2$—N(n•C$_6$H$_{13}$)$_2$]$_2$ |
| MC8 | copper phthalocyanine methacrylate | CuPc$\big\langle$ [3/6-SO$_2$—N(n•C$_4$H$_9$)C$_2$H$_4$O—CO—C(Me)=CH$_2$]$_2$ <br> [3/6-SO$_2$—N(n•C$_8$H$_{17}$)$_2$]$_2$ |

A preferred blue dye is MB2:

| Ref. | Category/Description | Structure |
|---|---|---|
| MB2 | Disperse Azo dimethacrylate | 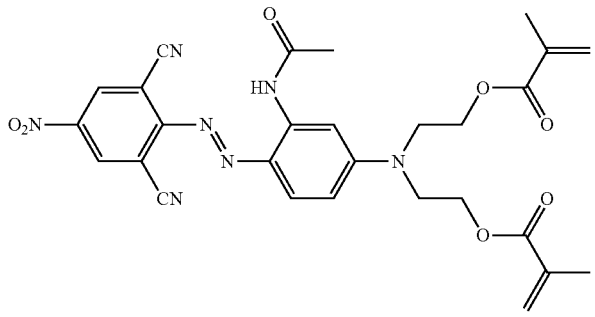 MB2 |

Another group of polymerisable dyes preferably used in the invention are polymerisable anthraquinone dyes of Formulas (XII) to (XIV):

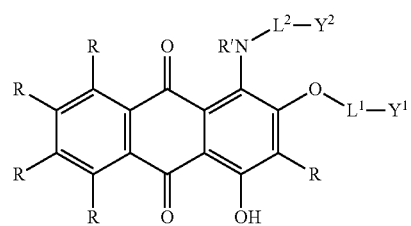 (XII)

(XIII)

(XIV)

wherein the aromatic or heteroaromatic cycles are substituted by one or more different or identical groups R selected from the group consisting of H, alkyl, preferably C1-C6 alkyl, substituted or non-substituted aryl, —F, —Cl, —Br, —I, —OR', —SR', —C(O)R', —C(O)OR', —NHCOR', —NO$_2$, —CN, —SO$_3$H, —NR'R", preferably —CH$_3$, —NO$_2$, —CN, —COCH$_3$, —CO$_2$CH$_2$CH$_3$, —NHCOCH$_3$, with R' and R" independently of one another equal to H or alkyl, preferably C1-C6 alkyl, and L$^1$ and L$^2$ are independently of one another a single bond, optionally substituted cycloalkyl or aromatic ring, linear or branched, optionally substituted, alkylene, where one or more non-adjacent C atoms may be replaced by O, S and/or N, and/or one or more double and/or triple bonds may be present in the chain and/or side chain or a combination thereof, preferably phenylene or C1-C6 alkyl, preferably identical, and Y$^1$ and Y$^2$ are independently of one another, polymerisable group, preferably an acrylate or methacrylate, preferably identical.

Preferably groups R are selected from H, C1-C6 alkyl, preferably CH$_3$, —C(O)R', —C(O)OR', —NO$_2$, —CN, —NHCOR', with R' independently of one another equal to C1-C6 alkyl, preferably C1 or C2 alkyl. Preferably groups L$^1$ and L$^2$ are selected from phenylene or C1-C6 alkyl, a polyether alkyl chain, or a combination thereof, preferably C2-C4 alkyl, especially C2 and C4 alkyl. Especially identical groups L$^1$ and L$^2$ are preferred.

Preferably groups Y$^1$ and Y$^2$ are selected from methyl acrylate or methyl methacrylate. Especially identical groups Y$^1$ and Y$^2$ are preferred.

Suitable examples of anthraquinone dyes according to Formulas (XII) to (XIV) are summarised in Table 2, where the corresponding methyl methacrylate or acrylate derivatives are also suitable.

TABLE 9

Examples of Anthraquinone Dyes (XIIa) 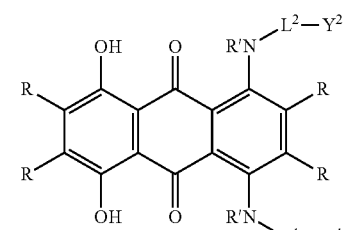

(XIIb)

TABLE 9-continued
Examples of Anthraquinone Dyes
(XIIc)
(XIIe)
(XIIb)
(XIIIa)
(XIIIb)
(XIIIc)
(XIVa)
(XIVb)
Such anthraquinone dyes can be prepared similar to the process described in U.S. Pat. No. 4,795,794.
A fourth group of polymerisable dyes preferably used in the invention are polymerisable benzodifuranone dyes of Formulas (XV) to (XVII)
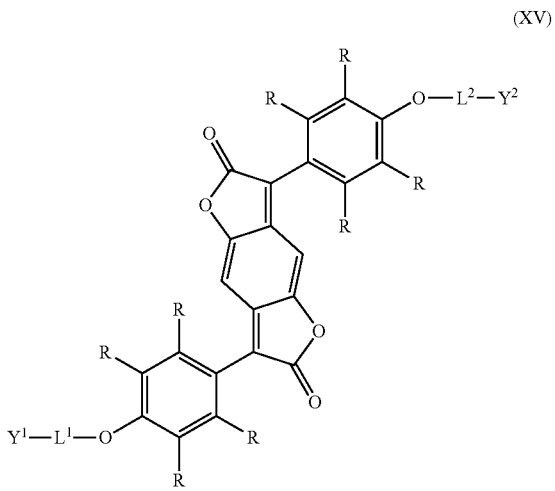
(XV)

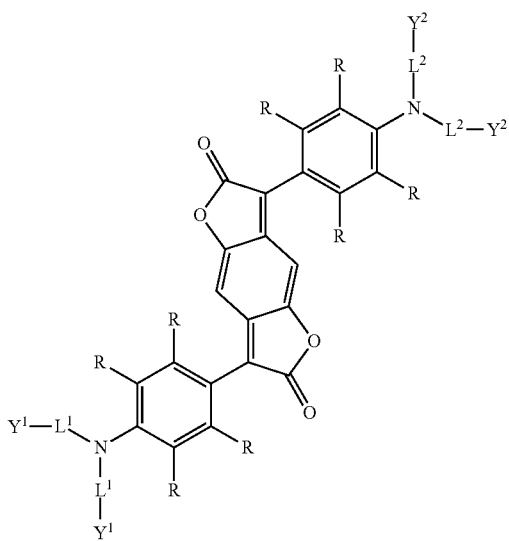

(XVI)

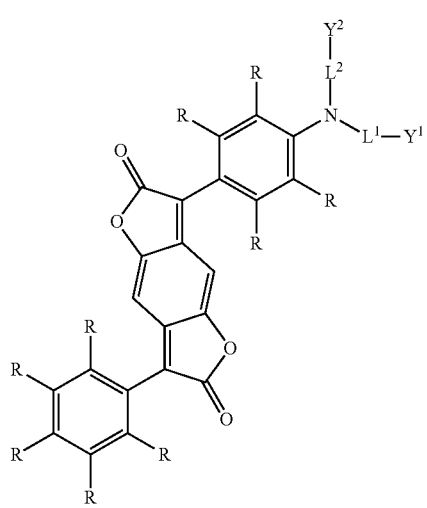

(XVII)

wherein the aromatic or heteroaromatic cycles are substituted by one or more different or identical groups R selected from the group consisting of H, alkyl, preferably C1-C6 alkyl, substituted or non-substituted aryl, F, —Cl, —Br, —I, —OR', —SR', —C(O)R', —C(O)OR', —NHCOR', —NO$_2$, —CN, —SO$_3$H, —NR'R", preferably —CH$_3$, —NO$_2$, —CN, —COCH$_3$, —CO$_2$CH$_2$CH$_3$, —NHCOCH$_3$, with R' and R" independently of one another equal to H or alkyl, preferably C1-C6 alkyl, and $L^1$ and $L^2$ are independently of one another a single bond, optionally substituted cycloalkyl or aromatic ring, linear or branched, optionally substituted, alkylene, where one or more non-adjacent C atoms may be replaced by O, S and/or N, and/or one or more double and/or triple bonds may be present in the chain and/or side chain or a combination thereof, preferably phenylene or C1-C6 alkyl, preferably identical, and $Y^1$ and $Y^2$ are independently of one another, polymerisable group, preferably an acrylate or methacrylate, preferably identical.

Preferably groups R are selected from H, C1-C6 alkyl, preferably CH$_3$, —C(O)R', —C(O)OR', —NO$_2$, —CN, —NHCOR'R, with R' independently of one another equal to C1-C6 alkyl, preferably C1 or C2 alkyl.

Preferably groups $L^1$ and $L^2$ are selected from phenylene or C1-C6 alkyl, a polyether alkyl chain, or a combination thereof, preferably C2-C4 alkyl, especially C2 and C4 alkyl. Especially identical groups $L^1$ and $L^2$ are preferred.

Preferably groups $Y^1$ and $Y^2$ are selected from methyl acrylate or methyl methacrylate. Especially identical groups $Y^1$ and $Y^2$ are preferred.

Suitable examples of benzodifuranone dyes according to Formulas (XV) to (XVII) are summarised in Table 10, where the corresponding methyl methacrylate or acrylate derivatives are also suitable:

TABLE 10

Examples of Benzodifuranone Dyes (XVa) Red1

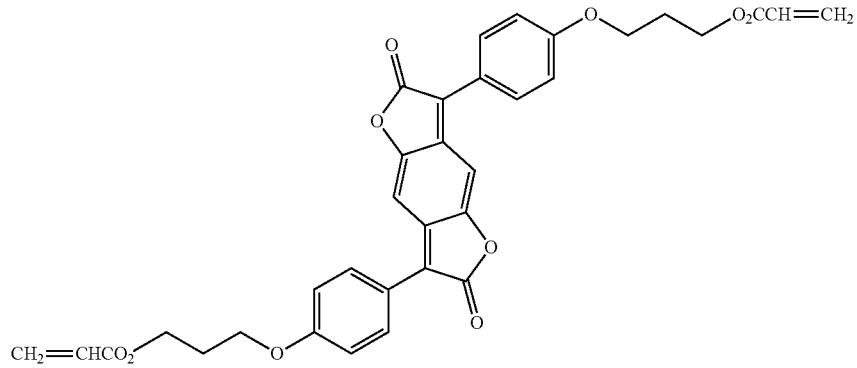

TABLE 10-continued
Examples of Benzodifuranone Dyes
(XVb) Red2
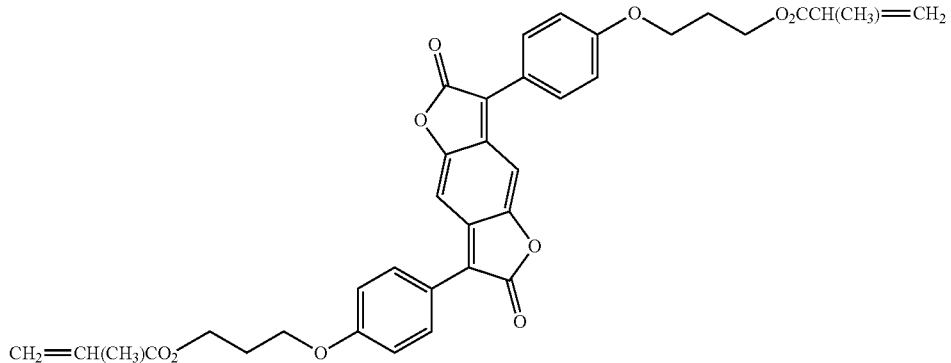
(XVIa) Cyan1
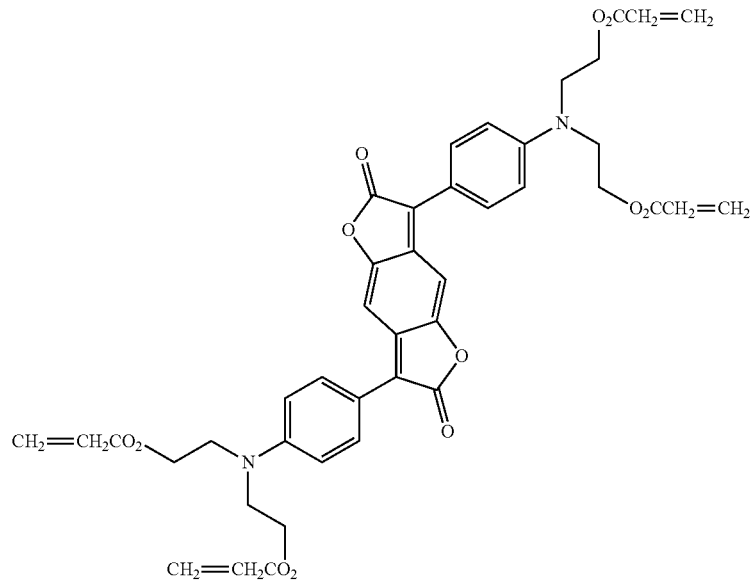
(XVIIa) Cyan2
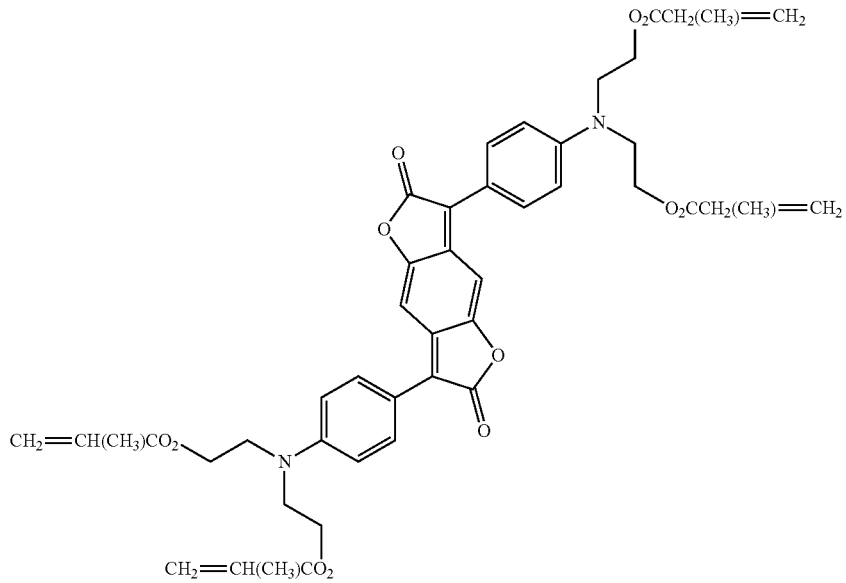

TABLE 10-continued
Examples of Benzodifuranone Dyes
(XVIIa) Yellow1
(XVIIa) Yellow2
The preparation of such polymerisable dyes is exemplified in scheme 7 for acrylate derivatives:
Scheme 7: Benzodifuranone Red1-Dye of Formula (XVa)
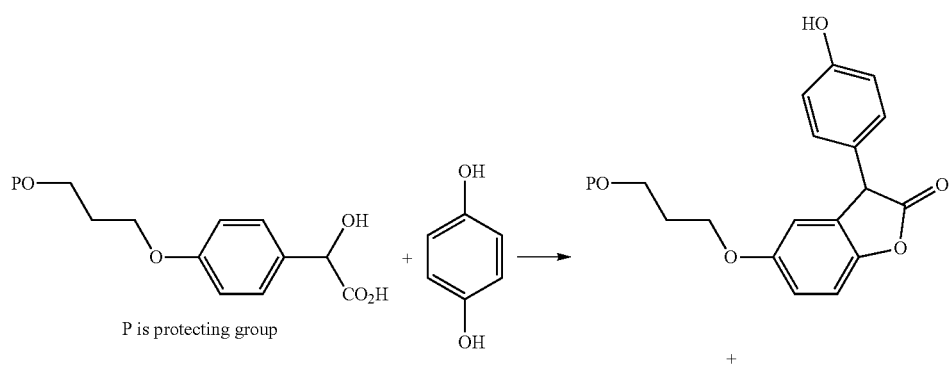

-continued

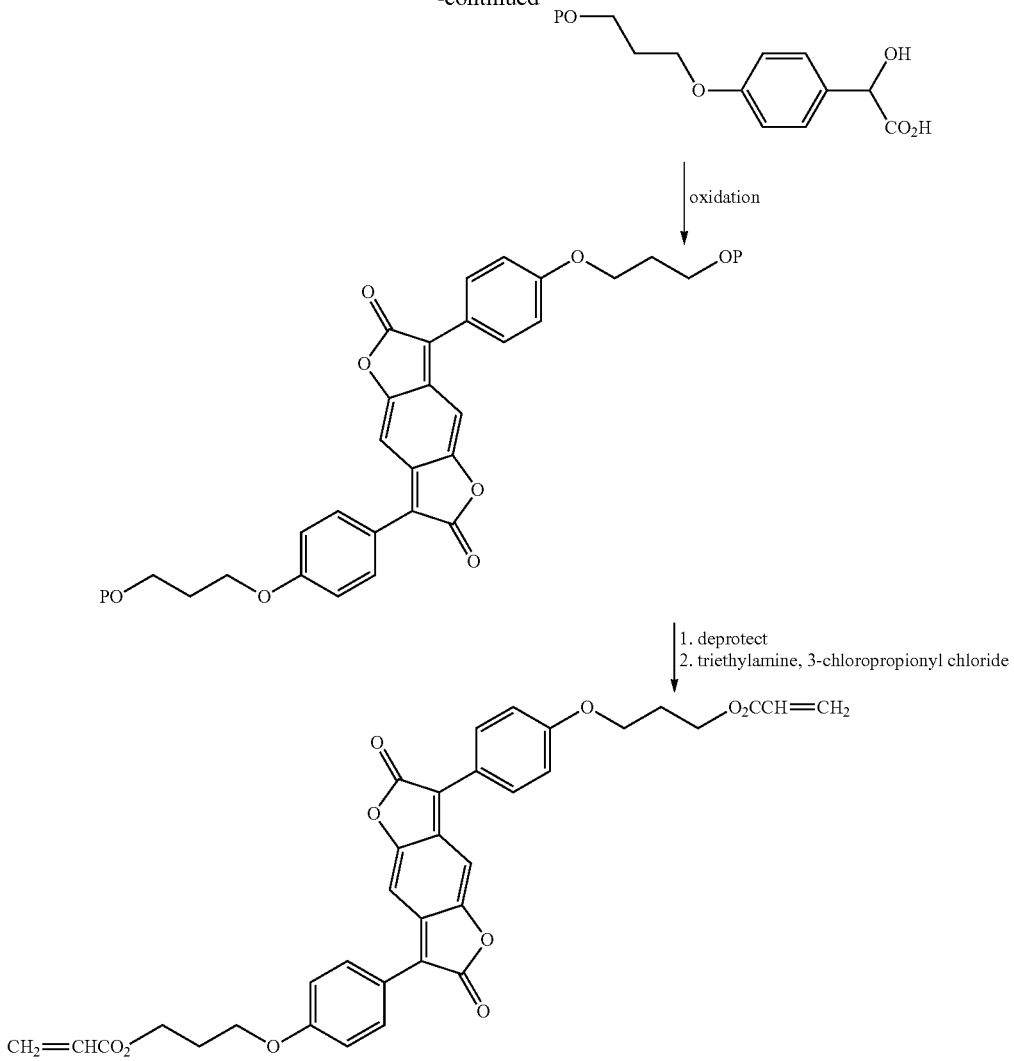

A fifth group of polymerisable dyes preferably used in the invention are polymerisable Brilliant Blue derivatives of Formula (XVIII) are used:

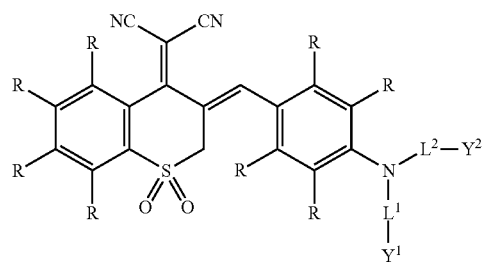

(XVIII)

wherein the aromatic or heteroaromatic cycles are substituted by one or more different or identical groups R selected from the group consisting of H, alkyl, preferably C1-C6 alkyl, substituted or non-substituted aryl, —F, —Cl, —Br, —I, —OR', —SR', —C(O)R', —C(O)OR', —NHCOR', —NO$_2$, —CN, —SO$_3$H, —NR'R'', preferably —CH$_3$, —NO$_2$, —CN, —COCH$_3$, —CO$_2$CH$_2$CH$_3$, —NHCOCH$_3$, with R' and R'' independently of one another equal to H or alkyl, preferably C1-C6 alkyl, and L$^1$ and L$^2$ are independently of one another a single bond, optionally substituted cycloalkyl or aromatic ring, linear or branched, optionally substituted, alkylene, where one or more non-adjacent C atoms may be replaced by O, S and/or N, and/or one or more double and/or triple bonds may be present in the chain and/or side chain or a combination thereof, preferably phenylene or C1-C6 alkyl, preferably identical, and Y$^1$ and Y$^2$ are independently of one another, polymerisable group, preferably an acrylate or methacrylate, preferably identical.

Preferably groups R are selected from H, C1-C6 alkyl, preferably CH$_3$, —C(O)R', —C(O)OR', —NO$_2$, —CN, —NHCOR', with R' independently of one another equal to C1-C6 alkyl, preferably C1 or C2 alkyl. Preferably groups L$^1$ and L$^2$ are selected from phenylene or C1-C6 alkyl, a polyether alkyl chain, or a combination thereof, preferably C2-C4 alkyl. Especially identical groups L$^1$ and L$^2$ are preferred.

Preferably groups Y$^1$ and Y$^2$ are selected from methyl acrylate or methyl methacrylate. Especially identical groups Y$^1$ and Y$^2$ are preferred.

Suitable examples of Brilliant Blue derivatives of Formula (XVIII) are summarised in Table 11, where the corresponding methyl methacrylate or acrylate derivatives are also suitable:

TABLE 11

Examples of Brilliant Blue derivatives of Formula (XVIII)

(XVIIIa) Blue1

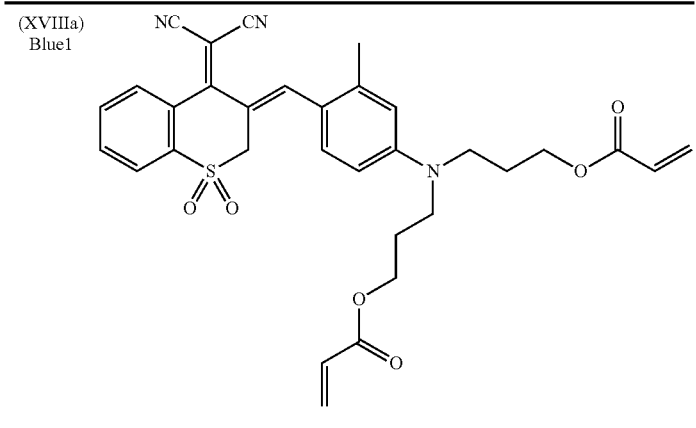

(XVIIIb) Blue2

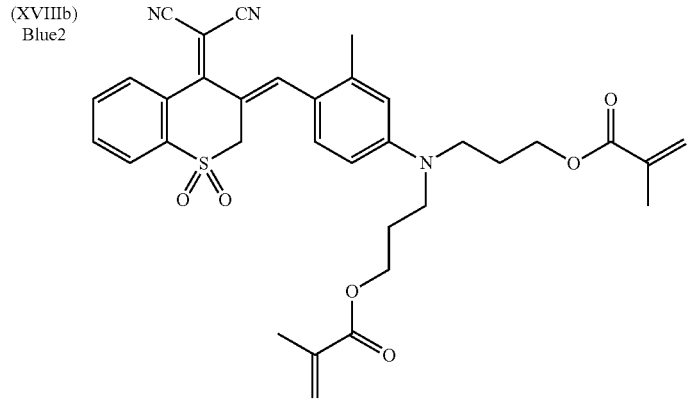

The preparation of such polymerisable dyes is exemplified in scheme 8 for acrylate derivatives:

Scheme 8: Brilliant Blue Dye of Formula (XVIIIa)

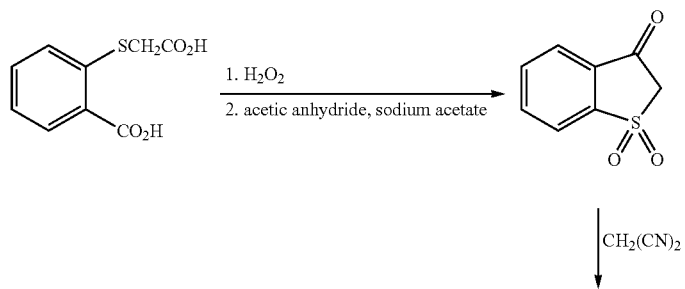

-continued

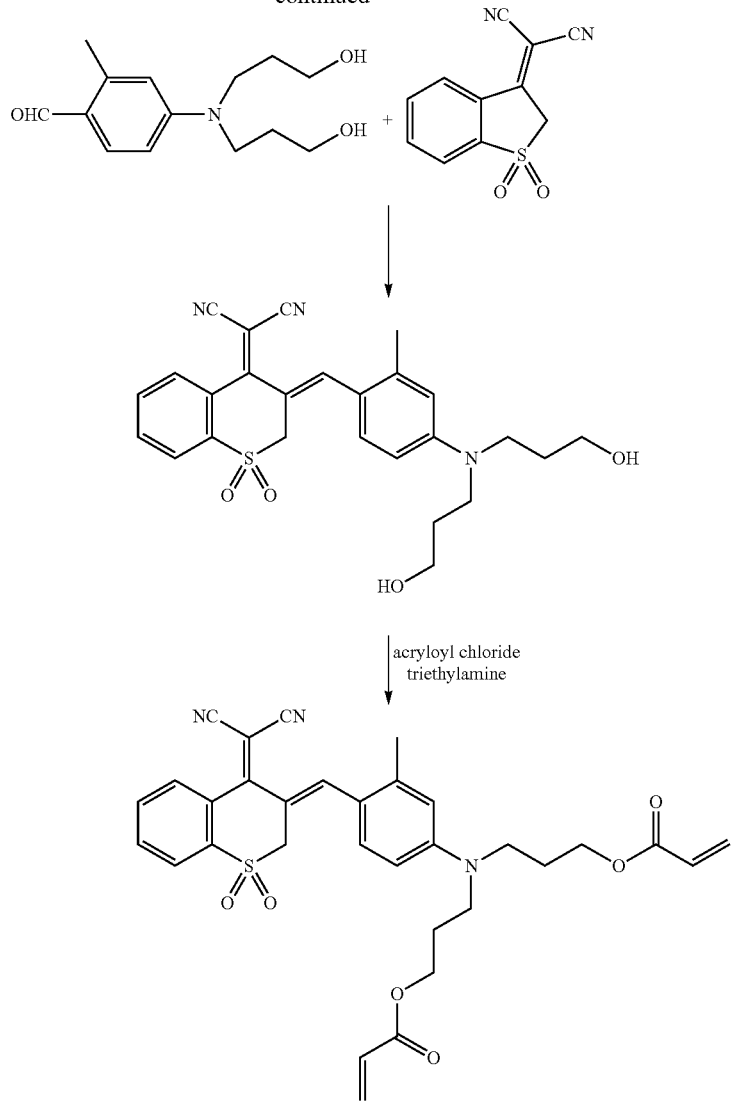

Another group of polymerisable dyes preferably used in the invention are polymerisable pyrroline dyes of Formulas (XIX) and (XX):

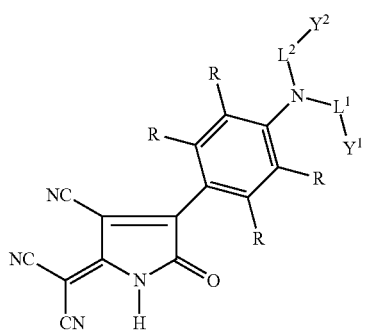

(XIX)

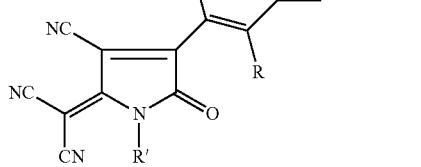

(XX)

wherein the aromatic or heteroaromatic cycles are substituted by one or more different or identical groups R selected from the group consisting of H, alkyl, preferably C1-C6 alkyl, substituted or non-substituted aryl, —F, —Cl, —Br, —I, —OR', —SR', —C(O)R', —C(O)OR', —NHCOR', —NO$_2$, —CN, —SO$_3$H, —NR'R", preferably —CH$_3$, —NO$_2$, —CN, —COCH$_3$, —CO$_2$CH$_2$CH$_3$, —NHCOCH$_3$, with R' and R" independently of one another equal to H or alkyl, preferably C1-C6 alkyl, and L¹ and L² are independently of one another a single bond, optionally substituted cycloalkyl or aromatic ring, linear or branched, optionally substituted, alkylene, where one or more non-adjacent C atoms may be replaced by O, S and/or N, and/or one or more double and/or triple bonds may be present in the chain and/or side chain or a combination thereof, preferably phenylene or C1-C6 alkyl, preferably identical, and
Y¹ and Y² are independently of one another, polymerisable group, preferably an acrylate or methacrylate, preferably identical.

Preferably groups R are selected from H, C1-C6 alkyl, preferably CH₃, —C(O)R', —C(O)OR', —NO₂, —CN, —NHCOR', with R' independently of one another equal to C1-C6 alkyl, preferably C1 or C2 alkyl. Preferably groups L¹ and L² are selected from phenylene or C1-C6 alkyl, a polyether alkyl chain, or a combination thereof, preferably C2-C4 alkyl, especially C2 and C4 alkyl. Especially identical groups L¹ and L² are preferred.

Preferably groups Y¹ and Y² are selected from methyl acrylate or methyl methacrylate. Especially identical groups Y¹ and Y² are preferred.

Suitable examples of pyrroline dyes of Formulas (XIX) and (XX) are summarised in Table 12, where the corresponding methyl methacrylate or acrylate derivatives are also suitable:

TABLE 12

Examples of Pyrroline Dyes of Formulas (XIX) and (XX)

(XIXa)
Blue/
Cyan

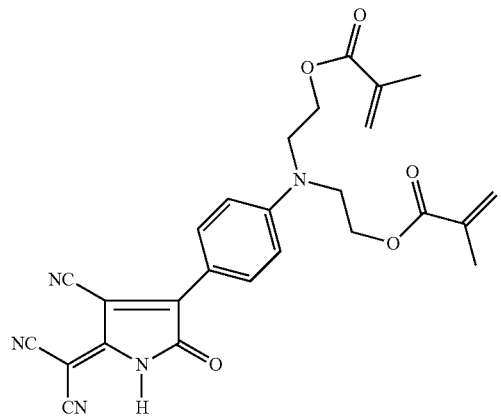 [SMILES: C=C(C)C(=O)OCCN(CCOC(=O)C(=C)C)c1ccc(C2=C(C#N)C(=C(C#N)C#N)NC2=O)cc1]

TABLE 12-continued

Examples of Pyrroline Dyes of Formulas (XIX) and (XX)

(XIXb)

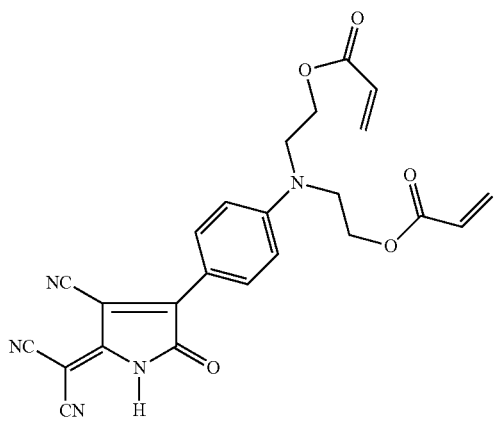 [SMILES: C=CC(=O)OCCN(CCOC(=O)C=C)c1ccc(C2=C(C#N)C(=C(C#N)C#N)NC2=O)cc1]

(XXa)

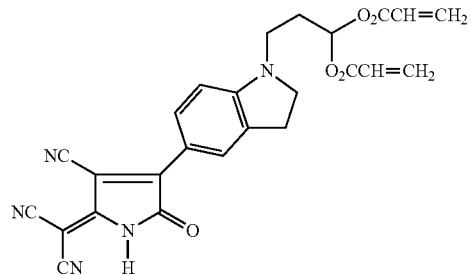

The preparation of such polymerisable dyes is exemplified in scheme 9 for methacrylate derivatives:

Scheme 9: Pyrroline Dye of Formula (XIXa)

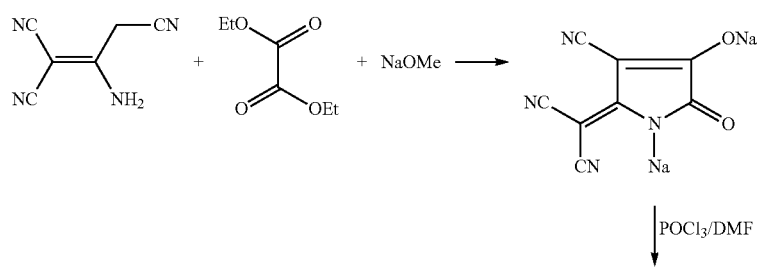

-continued

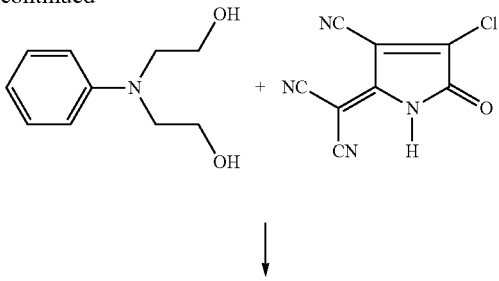

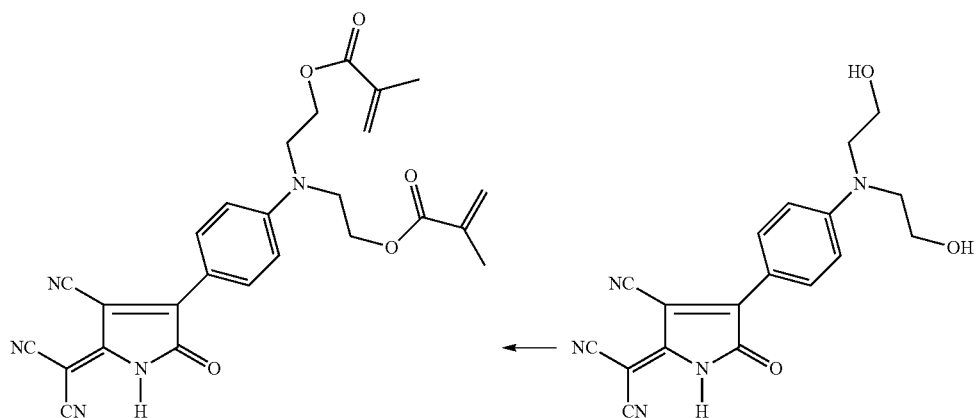

Another group of polymerisable dyes preferably used in the invention are polymerisable squarilium dyes of Formulas (XXI) and (XXII):

(XXI)

(XXII)

wherein the aromatic or heteroaromatic cycles are substituted by one or more different or identical groups R selected from the group consisting of H, alkyl, preferably C1-C6 alkyl, substituted or non-substituted aryl, —F, —Cl, —Br, —I, —OR', —SR', —C(O)R', —C(O)OR', —NHCOR', —NO$_2$, —CN, —SO$_3$H, —NR'R", preferably —CH$_3$, —NO$_2$, —CN, —COCH$_3$, —CO$_2$CH$_2$CH$_3$, —NHCOCH$_3$, with R' and R" independently of one another equal to H or alkyl, preferably C1-C6 alkyl, and L$^1$ and L$^2$ are independently of one another a single bond, optionally substituted cycloalkyl or aromatic ring, linear or branched, optionally substituted, alkylene, where one or more non-adjacent C atoms may be replaced by O, S and/or N, and/or one or more double and/or triple bonds may be present in the chain and/or side chain or a combination thereof, preferably phenylene or C1-C6 alkyl, preferably identical, and Y$^1$ and Y$^2$ are independently of one another, polymerisable group, preferably an acrylate or methacrylate, preferably identical.

Preferably groups R are selected from H, C1-C6 alkyl, preferably CH$_3$, —C(O)R', —C(O)OR', —NO$_2$, —CN, —NHCOR', with R' independently of one another equal to C1-C6 alkyl, preferably C1 or C2 alkyl.

Preferably groups L$^1$ and L$^2$ are selected from phenylene or C1-C6 alkyl, a polyether alkyl chain, or a combination thereof, preferably C2-C4 alkyl, especially C2 and C4 alkyl. Especially identical groups L$^1$ and L$^2$ are preferred.

Preferably groups Y$^1$ and Y$^2$ are selected from methyl acrylate or methyl methacrylate. Especially identical groups Y$^1$ and Y$^2$ are preferred.

Suitable examples of squarilium dyes of Formulas (XXI) and (XXII) are summarised in Table 13, where the corresponding methyl methacrylate or acrylate derivatives are also suitable:

TABLE 13
Examples of Squarilium Dyes of Formulas (XXI) and (XXII))
(XXIa)
Cyan
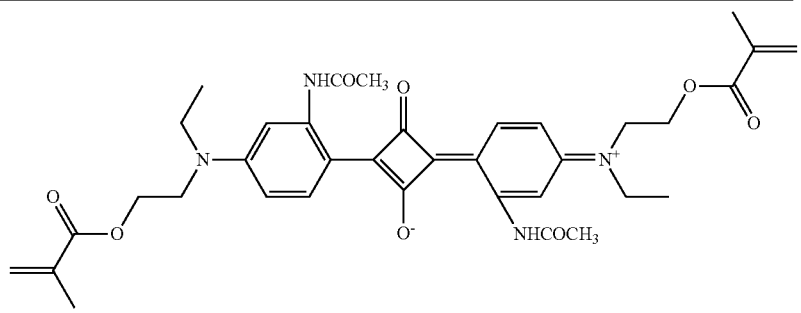
(XXIIa)
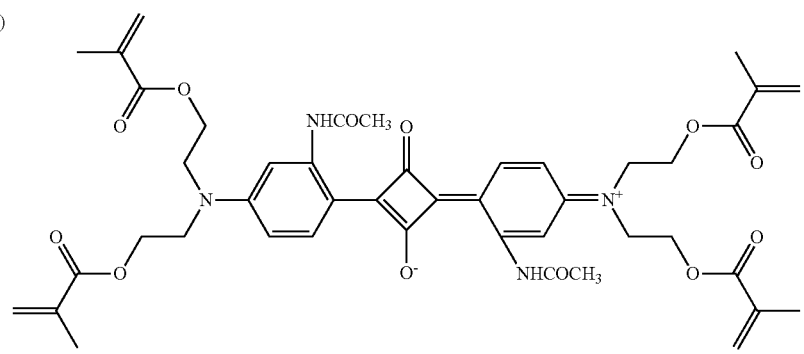
(XXIb)
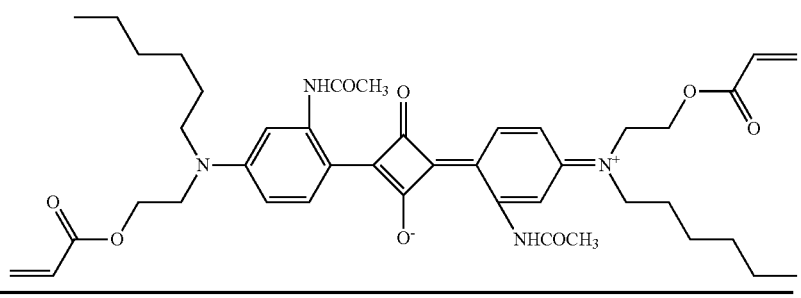
The preparation of such polymerisable dyes is exemplified in scheme 10 for methacrylate derivatives:
Scheme 10: Squarilium Dimethacrylate—Dye of Formula (XXIa)
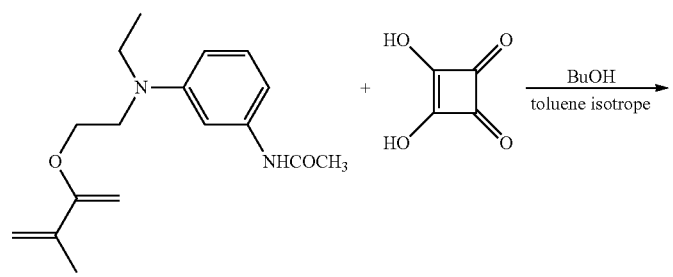

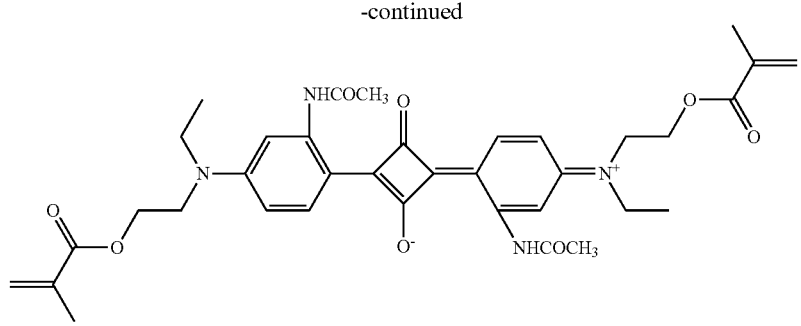

Another group of polymerisable dyes preferably used in the invention are polymerisable triphendioxazine dyes of Formulas (XXIII) and (XXIV):

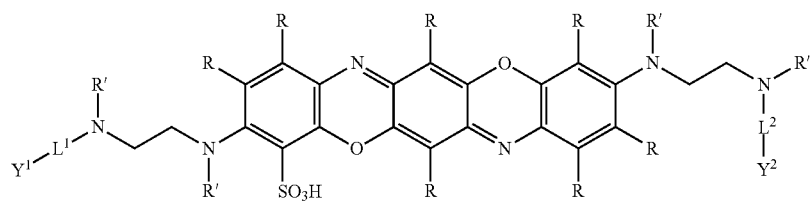
(XXIII)

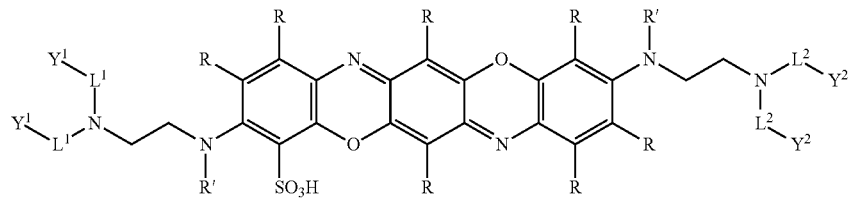
(XXIV)

wherein the aromatic or heteroaromatic cycles are substituted by one or more different or identical groups R selected from the group consisting of H, alkyl, preferably C1-C6 alkyl, substituted or non-substituted aryl, —F, —Cl, —Br, —I, —OR', —SR', —C(O)R', —C(O)OR', —NHCOR', —NO$_2$, —CN, —SO$_3$H, —NR'R'', preferably —CH$_3$, —NO$_2$, —CN, —COCH$_3$, —CO$_2$CH$_2$CH$_3$, —NHCOCH$_3$, with R' and R'' independently of one another equal to H or alkyl, preferably C1-C6 alkyl,
and L$^1$ and L$^2$ are independently of one another a single bond, optionally substituted cycloalkyl or aromatic ring, linear or branched, optionally substituted, alkylene, where one or more non-adjacent C atoms may be replaced by O, S and/or N, and/or one or more double and/or triple bonds may be present in the chain and/or side chain or a combination thereof, preferably phenylene or C1-C6 alkyl, preferably identical, and Y$^1$ and Y$^2$ are independently of one another, polymerisable group, preferably an acrylate or methacrylate, preferably identical.

Preferably groups R are selected from H, C1-C6 alkyl, preferably CH$_3$, —C(O)R', —C(O)OR', —NO$_2$, —CN, —NHCOR', with R' independently of one another equal to C1-C6 alkyl, preferably C1 or C2 alkyl.

It is especially preferred to have central ring R groups equal to H, Cl Br, C1-C4 alkyl, C1-C4 alkoxy, phenyl and phenoxy. Additionally, outside benzene rings preferably have —SO$_3$H groups.

Preferably groups L$^1$ and L$^2$ are selected from phenylene or C1-C6 alkyl, a polyether alkyl chain, or a combination thereof, preferably C2-C4 alkyl, especially C2 and C4 alkyl. Especially identical groups L$^1$ and L$^2$ are preferred.

Preferably groups Y$^1$ and Y$^2$ are selected from methyl acrylate or methyl methacrylate. Especially identical groups Y$^1$ and Y$^2$ are preferred.

Suitable examples of triphendioxazine dyes of Formulas (XXIII) and (XXIV) are summarised in Table 14, where the corresponding methyl methacrylate or acrylate derivatives are also suitable:

TABLE 14
Examples of Triphendioxazine Dyes of Formulas (XXIII)/(XXIV)
(XXIIIa) Cyan
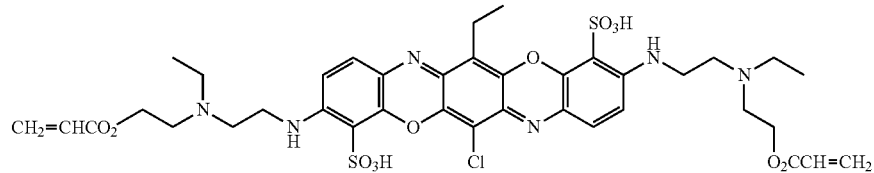
(XXIVa)
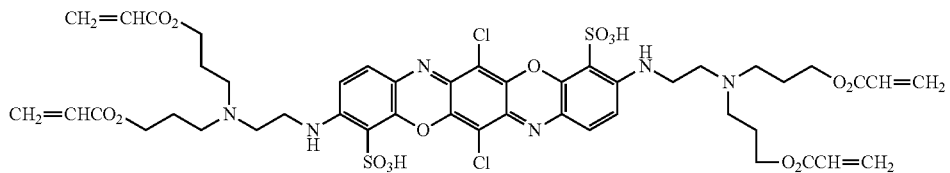
The preparation of such polymerisable dyes is exemplified in schemes 11 and 12 for acrylate derivatives, wherein the intermediates are prepared by a similar process as described in DE 3423581.
Scheme 11: Triphendioxazine Diacrylate-Dye of Formula (XXIIIa)
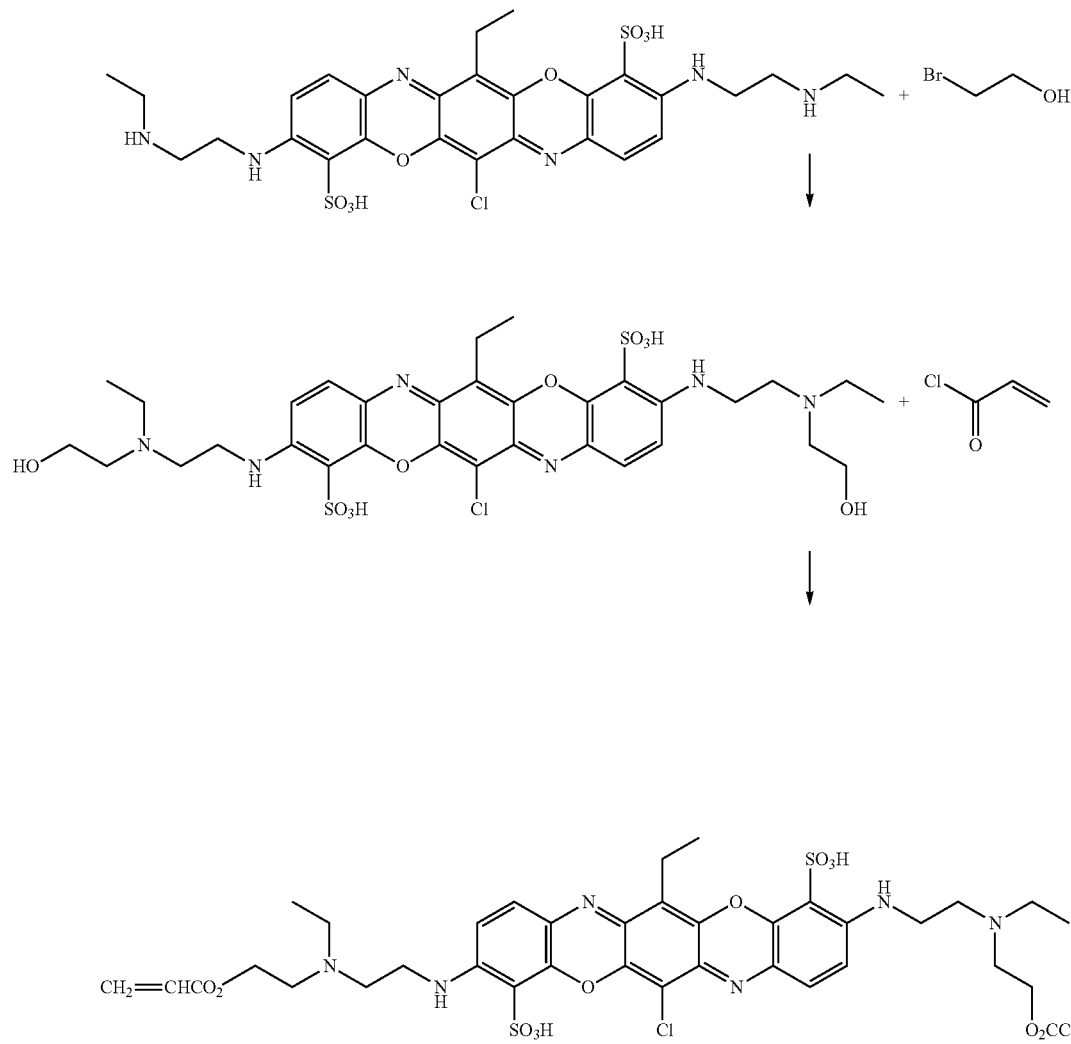

Scheme 12: Triphendioxazine Diacrylate-Dye of Formula (XXIVa)

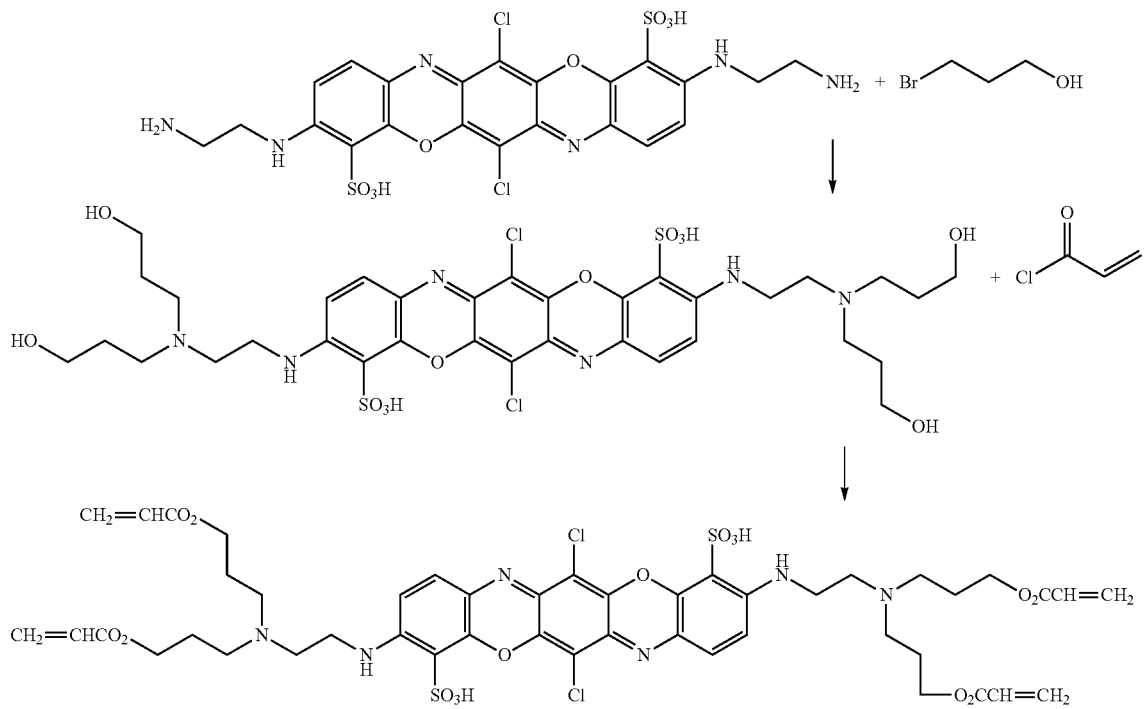

A further subject of the invention are dyes of Formulas (I) to (XXIV) and the processes of their preparation as disclosed in Schemes 1 to 10.

All process steps described above and below can be carried out using known techniques and standard equipment which are described in prior art and are well-known to the skilled person.

The coloured polymer particles of the invention can be prepared by copolymerisation in a non-aqueous, non-polar solvent, especially by copolymerisation of a polymerisable dye, methyl methacrylate (MMA), methacrylic acid, stabiliser, and initiator, or by emulsion polymerisation, especially by an emulsifier-free batch emulsion polymerisation process.

Preferably, the coloured polymer particles of the invention can be prepared in a simple 1-step reaction in a non-aqueous, preferably non-polar medium. The preferred solvents are non-polar hydrocarbon solvents, especially such used in EPD fluids, i.e. the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane. Especially preferred is dodecane. Preferably the coloured polymer particles are simply separated from the reaction suspension by filtration, preferably by pouring the suspension through a pore size filter, i.e. a 0.1 μm pore size filter, or the particles can be cleaned by centrifuging.

The selection of the polymerisation conditions depends on the required size and size distribution of the particles. Adjustment of polymerisation conditions is well known to someone skilled in the art.

Preferably, a batch polymerisation process is used wherein all reactants are completely added at the outset of the polymerisation process. In such process only relatively few variables have to be adjusted for a given formulation. Preferred changes which can be made in such cases are to the reaction temperature, reactor design and the type and speed of stirring. Thus, a batch polymerisation process is used for manufacture versus a semi-continuous batch process because of limited versatility and simple evaluations of reaction formulation.

This route avoids the use of aqueous medium as previously reported for the syntheses of coloured polymer particles for EPD. Whereas preparation in aqueous medium has obvious advantages in terms of health, safety and environmental terms, ultimately the coloured polymer particles have to be redispersed in a non-aqueous, non-polar medium for use in EPD. If the particles are prepared in water, then usually a long and power consuming process such as freeze drying or spray drying is required to remove the water. This route avoids such time consuming steps and the coloured polymer particles do not have to be redispersed in to a suitable non-polar solvent for EPD. This route also avoids introducing unwanted traces of water into the EPD dispersion. Therefore, this process provides a one-step reaction to prepare coloured particles suitable for EPD, without the requirement of freeze or spray drying enabling a cost effective production process. No transfer of solvents is required.

Preferably the polymerisation is a free radical polymerisation.

Usually, a monomer composition according to the invention comprises at least one polymerisable dye, at least one monomer, at least one initiator, preferably at least one steric stabiliser, and optionally at least one charged co-monomer in a non-aqueous solvent Preferably, a monomer composition according to the invention comprises polymerizable dye, at least one monomer, a steric stabiliser, an initiator, and a non-aqueous, non-polar solvent.

The monomers described in the following for preparation of the polymeric particles can be combined with the polymerisable dyes to produce a polymerisable dye/monomer mixture and/or the monomers can be incorporated stepwise into the polymerisable mixture to produce special effects, for example a core-shell effect so that there is more dye on the shell of the particles. Particularly preferable are monomers which are similar to the polymerisable dye.

The particles can be prepared from most monomer types, in particular methacrylates, acrylates, acrylamides, methacrylamides, acrylonitriles, α-substituted acrylates, styrenes and vinyl ethers, vinyl esters, propenyl ethers, oxetanes and epoxys but would typically be prepared from largest percentage to be monomer, then cross-linker, and include a charged monomer (e.g. quaternised monomer).

The following are all examples which could be used and which are commercially available from the Sigma-Aldrich chemical company. Mixtures of monomers may also be used.

Methacrylates:

Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol) methyl ether methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxyisopropyl methacrylates, 2-Hydroxypropyl 2-(methacryloyloxy) ethyl phthalate, Isobornyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl)propyl methacrylate, 3,3,5-Trimethylcyclohexyl methacrylate, Trimethylsilyl methacrylate, Vinyl methacrylate. Preferably Methyl methacrylate (MMA), Methacrylic acid, Ethyl methacrylate (EMA), and/or n-Butyl methacrylate (BMA) are used.

Acrylates:

Acrylic acid, 4-Acryloylmorpholine, [2-(Acryloyloxy) ethyl]trimethylammonium chloride, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, i(ethylene glycol) ethyl ether acrylate technical grade, Di(ethylene glycol) 2-ethylhexyl ether acrylate, 2-(Dimethylamino)ethyl acrylate, 3-(Dimethylamino)propyl acrylate, Dipentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly(propylene glycol) acrylate, Poly(propylene glycol) methyl ether acrylate Soybean oil, epoxidized acrylate, 3-Sulfopropyl acrylate potassium salt, Tetrahydrofurfuryl acrylate, 3-(Trimethoxysilyl)propyl acrylate, 3,5,5-Trimethylhexyl acrylate. Preferably Methyl acrylate, acrylic acid, Ethyl acrylate (EMA), and/or n-Butyl acrylate (BMA) are used.

Acrylamides:

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl) trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl) acrylamide, N-(Isobutoxymethyl)acrylamide, N-Isopropylacrylamide, N-Isopropylmethacrylamide, Methacrylamide, N-Phenylacrylamide, N-[Tris(hydroxymethyl) methyl]acrylamide, Styrenes Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene, N,N-Dimethylvinylbenzylamine, 2,4-Diphenyl-4-methyl-1-pentene, 4-Ethoxystyrene, 2-Fluorostyrene, 3-Fluorostyrene, 4-Fluorostyrene, 2-Isopropenylaniline, 3-Isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl) styrene, 4-(Trifluoromethyl)styrene, 2,4,6-Trimethylstyrene. Preferably Styrene and/or Divinyl benzene are used.

Vinyl Groups

3-Vinylaniline, 4-Vinylaniline, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl) trimethylammonium chloride, 4-Vinylbiphenyl, 2-Vinylnaphthalene, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate, Other monomers which may be used are those which have groups to help stabilisation of the particles, e.g. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, Lauryl acrylate and fluorinated monomers of above.

Some of the monomers have groups for further reaction if so desired, e.g. Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis[4-(vinyloxy)butyl]adipate, Bis[4-(vinyloxy)butyl]1,6-hexanediylbiscarbamate, Bis[4-(vinyloxy)butyl]isophthalate, Bis[4-(vinyloxy)butyl](methylenedi-4,1-phenylene) biscarbamate, Bis[4-(vinyloxy)butyl]succinate, Bis[4-(vinyloxy)butyl]terephthalate, Bis[4-(vinyloxymethyl) cyclohexylmethyl]glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol) divinyl ether, Di(ethylene glycol) vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl]phosphate, Bisphenol A propoxylate diacrylate, 1,3-Butanediol diacrylate, 1,4-Butanediol diacrylate, 1,3-Butanediol dimethacrylate, 1,4-Butanediol dimethacrylate, N,N'-(1,2-Dihydroxyethylene)bisacrylamide, Di(trimethylolpropane) tetraacrylate, Diurethane dimethacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediyl-bis[oxy(2-hydroxy-3,1-propanediyl)]bisacrylate, Hydroxypivalyl hydroxypivalate bis[6-(acryloyloxy) hexanoate], Neopentyl glycol diacrylate, Pentaerythritol diacrylate, Pentaerythritol tetraacrylate, Pentaerythritol triacrylate, Poly(propylene glycol) diacrylate, Poly(propylene glycol) dimethacrylate, 1,3,5-Triacryloylhexahydro-1,3,5-triazine, Tricyclo[5.2.1.0]decanedimethanol diacrylate, Trimethylolpropane benzoate diacrylate, Trimethylolpropane ethoxylate methyl ether diacrylate, Trimethylolpropane ethoxylate triacrylate, Trimethylolpropane triacrylate, Trimethylolpropane trimethacrylate, Tris[2-(acryloyloxy)ethyl] isocyanurate, Tri(propylene glycol) diacrylate.

Optionally, the monomer composition comprises at least one charged co-monomer.

Examples of cationic monomers for particle stability and particle size control are 2-methacryloxy ethyl trimethyl ammonium chloride (MOTAC), acryloxy ethyl trimethyl ammonium chloride (AOTAC), [3-(Methacryloylamino) propyl]trimethylammonium chloride, [2-(Methacryloyloxy) ethyl]trimethylammonium methyl sulfate solution, tetraallyl ammonium chloride, diallyl dimethyl ammonium chloride, (Vinylbenzyl)trimethylammonium chloride. Preferably 2-methacryloxy ethyl trimethyl ammonium chloride (MOTAC) and acryloxy ethyl trimethyl ammonium chloride (AOTAC) are used.

Examples of anionic monomers are sodium, potassium or triethylamine salts of methacrylic acid, Acrylic acid, 2-(Trifluoromethyl)acrylic acid, 3-(2-Furyl)acrylic acid, 3-(2-Thienyl)acrylic acid, 3-(Phenylthio)acrylic acid, Poly(acrylic acid) potassium salt, Poly(acrylic acid) sodium salt, Poly(acrylic acid), Poly(acrylic acid, sodium salt) solution, trans-3-(4-Methoxybenzoyl)acrylic acid, 2-Methoxycinnamic acid, 3-Indoleacrylic acid, 3-Methoxycinnamic acid, 4-Imidazoleacrylic acid, 4-Methoxycinnamic acid, Poly(styrene)-block-poly(acrylic acid), Poly(acrylonitrile-co-butadiene-co-acrylic acid), dicarboxy terminated, Polyacrylonitrile-co-butadiene-co-acrylic acid), dicarboxy terminated, glycidyl methacrylate diester, 2,3-Diphenyl-Acrylic Acid, 2-Me-Acrylic Acid, 3-(1-Naphthyl)Acrylic Acid, 3-(2,3,5,6-Tetramethylbenzoyl)Acrylic Acid, 3-(4-Methoxyphenyl)Acrylic Acid, 3-(4-Pyridyl)Acrylic Acid, 3-p-Tolyl-Acrylic Acid, 5-Norbornene-2-Acrylic Acid, Trans-3-(2,5-Dimethylbenzoyl)Acrylic Acid, Trans-3-(4-Ethoxybenzoyl)Acrylic Acid, Trans-3-(4-Methoxybenzoyl)Acrylic Acid, 2,2'-(1,3-Phenylene)Bis(3-(2-aminophenyl)Acrylic Acid), 2,2'-(1,3-Phenylene)Bis(3-(2-Aminophenyl)Acrylic Acid) hydrochloride, 2,2'-(1,3-Phenylene)Bis(3-(2-Nitrophenyl)Acrylic Acid), 2-[2-(2',4'-Difluoro[1,1'-Biphenyl]-4-Yl)-2-Oxoethyl]Acrylic Acid, 2-(2-(2-Chloroanilino)-2-Oxoethyl)-3-(4-Methoxyphenyl)Acrylic Acid, 2-(2-((2-Hydroxyethyl) Amino)-2-Oxoethyl)-3-(4-Methoxyphenyl)Acrylic Acid, 2-(2-(Cyclohexylamino)-2-Oxoethyl)-3-(4-Methoxyphenyl) Acrylic Acid.

A preferred monomer composition comprises methyl methacrylate and methacrylic acid, in combination with the polymerisable dyes according to Formulas (I)-(XI). Preferably such monomer compositions comprise polymerisable dyes of Formulas (I)-(VI), especially the polymerisable dyes of Formulas (I')-(VI'). Most preferred are the polymerisable dyes listed in Tables 1, 2, 5-7. Especially combinations with the polymerisable dyes listed in Tables 1 and 5-7 are used, preferably with dyes listed in Tables 5-7. Also, MB2 is a preferred polymerisable dye. Another preferred monomer composition comprises methyl methacrylate and methacrylic acid in combination with polymerisable dyes of Formula (XI), preferably with those of Formula (XI'), especially with the polymerisable dyes listed in Tables 4 and 8.

Preferably, an oil soluble initiator is used in the non-aqueous copolymerisation in order to control size, particle morphology and to reduce the residual monomers at the end of the reaction. Preferably an oil-soluble thermal initiator is added in step c) of the present process. Examples are 2,2'-Azobis(4-methoxy-2,4-dimethyl valeronitrile), 2,2'-Azobis(N-butyl-2-methylpropionamide), 2,2'-Azobis(2,4-dimethyl valeronitrile), Dimethyl 2,2'-azobis(2-methylpropionate), 2,2'-Azobis(2-methylbutyronitrile), also known as Vazo 67 (DuPont), 1,1'-Azobis(cyclohexane-1-carbonitrile), 2,2'-Azobis[N-(2-propenyl)-2-methylpropionamide], 1-[(1-cyano-1-methylethyl)azo]formamide, 2,2'-Azobis(N-cyclohexyl-2-methylpropionamide) (all available from Wako); Vazo 52 and Vazo 64 (available from DuPont), Luperox 331.

Preferably 2,2'-Azobis(2,4-dimethyl valeronitrile), Dimethyl 2,2'-azobis(2-methylpropionate), 2,2'-Azobis(2-methylbutyronitrile) or Vazo 67 are used.

Another appropriate method to synthesise uniform sub-micronic particles is by emulsion polymerisation. Emulsion polymerisation is a well known polymerisation process wherein barely water soluble monomers are emulsified in water by an emulsifier and polymerised by water-soluble initiators. Advantageously, the procedure by which an emulsion polymerisation is carried out has a profound effect upon the resulting particle size and polymer properties. Indeed, particles with quite different performance characteristics can be produced from the same reaction formulation by appropriate control of polymerisation process and conditions used. Comprehensive reviews of emulsion polymerisation conditions are given in "Emulsion polymerization"; van Herk, Alex; Gilbert, Bob; Department of Polymer Chemistry, Eindhoven University of Technology, Eindhoven, Neth. Editor(s): Van Herk.

An major advantage of this route is excellent control over monodispersity, particle size with a small diameter range of sub-micron size for image quality. Use of water as a solvent gives obvious safety and environmental advantages over use of organic solvents.

Preferably, a batch emulsion polymerisation process is used wherein all reactants are completely added at the outset of the polymerisation process. In such process only relatively few variables have to be adjusted for a given formulation. Preferred changes which can be made in such cases are to the reaction temperature, reactor design and the type and speed of stirring. Thus, a batch emulsion polymerisation process is used for manufacture versus a semi-continuous batch process because of limited versatility and simple evaluations of reaction formulation.

Preferably water soluble dyes are used in emulsion polymerisation. A preferred way of incorporating water-insoluble dyes into particles is to use the so-called 'mini-emulsion polymerisation', as described in K. Landfester, Macromol. Rapid. Commun., 2001, 22, 896-936.

Preferably, a water soluble initiator is used in the emulsion polymerisation in order to control size, particle morphology and to reduce the residual monomers at the end of the reaction. Examples are azo compounds or peroxide compounds, hydroperoxides or peracid esters. Preferably azo compounds are used, especially azobis(isobutylamidine) hydrochloride (AIBA) and similar compounds.

A Mini-Emulsion Polymerisation (MEP) forms small stable droplets (30-500 nm) by high shear in a system containing a dispersed phase, a continuous phase, a surfactant and an osmotic pressure agent (hydrophobe). The sub-micron sized droplets formed by high shear mixing are considered to be individual sub-micron reactors. It is these droplets which are the primary location for initiation of polymerisation. It is due to an inability of the water-insoluble dyes to be transported through the water medium that allows incorporation of these severely hydrophobic components in the droplets, and hence the forming of particles. Stabilisation against coalescence is achieved by adding surfactant whereas stabilisation against diffusion is achieved by adding a highly monomer soluble and water insoluble agent. The aim is to initiate polymerisation in each of the stabilised droplets. High shear can be achieved using a rotor-stator or high pressure homogenisers to prepare mechanical emulsification or ultrasound.

Preferably the polymerisation according to the invention is a free radical polymerisation. Usually, polymerisation compositions as described above are used. A preferred monomer composition comprises methyl methacrylate and ethylene glycol dimethacrylate as a cross-linker and 2-methacryloxy ethyl trimethyl ammonium chloride (MOTAC) as reactive charged monomer and a polymerisable dye, in combination with the polymerisable dyes according to Formulas (I)-(XI). Preferably such monomer compositions comprise polymerisable dyes of Formulas (I)-(VI), especially the polymerisable dyes of Formulas (I')-(VI'). Most preferred are the polymerisable dyes listed in Tables 1, 2, 5-7. Especially combinations with the polymerisable dyes listed in Tables 1 and 5-7 are used, preferably with dyes listed in Tables 5-7. Also, MB2 is a preferred polymerisable dye. Another preferred monomer composition comprises methyl methacrylate and methacrylic acid in combination with polymerisable dyes of Formula (XI), preferably with those of Formula (XI'), especially with the polymerisable dyes listed in Tables 4 and 8.

Preferably oil soluble initiators are used in mini-emulsion polymerisation, preferably 2,2'-Azobis(2,4-dimethyl valeronitrile), Dimethyl 2,2'-azobis(2-methylpropionate), 2,2'-Azobis(2-methylbutyronitrile) or Vazo 67 are used.

The polymerizable composition of the invention usually comprises 0.1-15, preferably 1-10%, by weight of dye, 50-95%, preferably 70-90%, by weight of monomer, 1-40%, preferably 1-10%, by weight of crosslinking monomer, 1-30%, preferably 1-10%, by weight of ionic monomer and 0.1-10%, preferably 0.1-5%, by weight of initiator, all percentages are based on the total weight of the polymerizable composition (except solvent).

Polymer particles prepared according to the invention are preferably spherical particles with a size (diameter) in the range of 50-1200 nm, preferably 50-1000 nm and preferably with a monodisperse size distribution. Preferred particle sizes are 50-900 nm, especially 150-900 nm. In a variant of the invention preferred particle sizes are 50-600 nm, preferably 50-560 nm, especially 50-500 nm, even more preferred 100-400 nm. Especially preferred can be particles having a particle size of 150-400 nm, especially 150-350 nm. Particle sizes are determined by photon correlation spectroscopy of aqueous particle dispersions by a common apparatus such as a Malvern NanoZS particle analyser or preferably by SEM (Scanning Electron Microscopy) and image analysis.

The size of polymer particles in electrophoretic fluids may be different from sizes measured in aqueous dispersions because of the influence of solvents and/or surfactants. In electrophoretic fluids, the polymer particles of the invention preferably have a particle size of 100-800 nm, especially 100-700 nm, preferably 150-700 nm are preferred. Especially preferred are polymer particles having a particle size of 150-600 nm.

To enhance the surface stabilisation or steric repulsions of the polymeric particles in a non-polar continuous phase, a steric stabiliser is preferably incorporated into the coloured polymer particles. Preferably a non-aqueous dispersion (NAD) stabiliser is adsorbed on to the particle. Suitable NAD stabilisers are block copolymers with a comb shape structure. Especially block copolymers with a molecular weight of approximately 10,000-100,000 can be used. The molecular weight ratio of the backbone to hairs may be approximately 1:1. The particle dispersion medium (non-polar solvent) preferably is a poor solvent for the backbone. The backbone chemistry preferably is similar to the particle. The length of the hairs preferably is of the order of the distance required to sterically stabilise the particles. The particle dispersion medium preferably is a good solvent for the hairs. It is possible to attach chromophores and/or charging groups to the backbone and or the hairs. NAD stabilisers are commercially available or can be prepared to known methods, e.g. as described in 'Dispersion Polymerization in Organic Media', ISBN 0471 054186, edited by K. E. J. Barrett, published by John Wiley and Sons, Copyright 1975, by Imperial Chemical Industries Ltd. Preferred NAD stabilisers are for example poly(hydroxystearic acid), and poly(hydroxystearic acid) graft (poly) methyl methacrylate and methacrylic acid copolymers, Solsperse 3000, Solsperse 11,200, Solsperse 13,300 and Solsperse 13,240 from Lubrizol Ltd., UK. Advantageously stabilisers comprising additionally copolymerised glycidyl methacrylate may be permanently locked in the polymer particle. This is simply done in the same vessel, by raising the temperature and adding diethanolamine. This opens up a glycidyl ring which is then available to polymerise with unreacted carboxylic acid groups from a methacrylic acid monomer.

Cross-linked copolymer nanoparticles can preferably be prepared by copolymerisation of methyl methacrylate (MMA), methacrylic acid, dye monomer, 1-octanethiol and NAD stabiliser using azobisisobutyronitrile (AIBN) or 2,2'-Azobis(2-methylbutyronitrile (Vazo 67) as an initiator. Preferably, polymerisations are conducted using a batch process.

The polymerisable dyes of the invention can also be used for the preparation of coloured polymer particles by colouring polymer particles with the polymerisable dyes and subsequent polymerisation of the dye within the particles as described in the earlier patent application PCT/EP/2010/000551

The dyes can also be pre-polymerised before being used for colouring polymer particles as described in the earlier patent application PCT/EP/2010/000550.

Particles of the invention are primarily designed for use in electrophoretic displays. So, further subjects of the invention are electrophoretic fluids and electrophoretic displays comprising a typical electrophoretic display which preferably consists of the particles dispersed in a low polar or non-polar solvent along with additives to improve electrophoretic properties, such as stability and charge. Examples of such electrophoretic dispersions are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

Typical additives to improve the stability of the electrophoretic fluid (either by steric stabilisation or by use as a charging agent) are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (Aldrich).

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Tweaking these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), and dodecane (Sigma Aldrich)

Usually electrophoretic fluids comprise a charged inorganic particle such as titania, alumina or barium sulphate, coated with a surface layer to promote good dispersibility in dielectric media and a dielectric fluid media. Furthermore, the coloured particles of the present invention may be used in combination with white reflective polymer particles prepared by a process comprising the steps of a) forming a reverse emulsion comprising at least one polymer, at least one white reflective particle, at least one polar solvent, at least one non-polar solvent, and at least one surfactant and b) removing the polar solvent or polar solvents by evaporative methods. "Reverse emulsion" means that a non-polar solvent (preferably dodecane, or comparable aliphatic hydrocarbons)) forms the continuous phase and a polar solvent (preferably water) forms the discontinuous phase. Such process is also called either "evaporative precipitation" or "reverse emulsion solvent removal" (RESR) due to the steps involved in forming a reverse emulsion and then removing the solvent from the internal phase by evaporative methods to form a solid particle.

The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767) and WO 2005/017046). The Electrophoretic fluid is then incorporated into an Electrophoretic display element by a variety of pixel architectures, such as can be found in C. M. Lampert, Displays; 2004, 25(5) published by Elsevier B.V., Amsterdam.

The Electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

The disclosures in the cited references are thus expressly also part of the disclosure content of the present application. The following examples explain the present invention in greater detail without restricting the scope of protection.

EXAMPLES

The characterisation of the formulations was performed using a Malvern NanoZS particle analyser unless otherwise stated. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications. All chemicals are purchased from Sigma-Aldrich at the highest grade possible and are used without further purification unless otherwise stated. Vazo 67 (2,2'-Azobis(2-methylbutyronitrile) is purchased from Du Pont.

Example 1

MC5

Prepared by a 3 step procedure as detailed below:

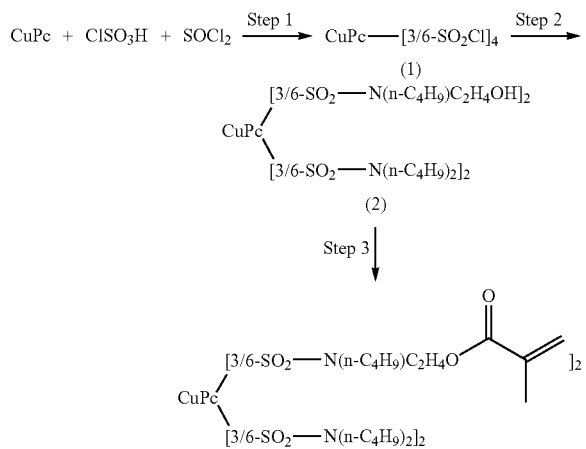

Step 1: Copper phthalocyanine tetra-3/6-sulfonyl chloride (1)

Copper phthalocyanine (5.76 g, 0.01 mol) is added over 20 minutes to chlorosulfonic acid (25 ml, 43.75 g, 0.375 mol) with stirring at room temperature. The reaction mixture is then stirred at 70-75° C. for 1 hour and then the temperature raised gradually during 1.5 hours to 130-135° C. After stirring at 130-135° C. for 6 hours the reaction mixture is cooled to 80° C. and thionyl chloride (10.9 ml, 17.9 g, 0.15 mol) is added dropwise over 1 hour. After stirring for a further 2 hours at 80° C., the reaction mixture is allowed to cool to room temperature and then added dropwise to a stirred mixture of ice and water. The reaction product is collected by filtration, washed acid free (to Congo red) with ice-water and dried in vacuo over $CaCl_2$ to yield copper phthalocyanine tetra-3/6-sulfonyl chloride (1) (10.0 g, ca 100%).

Step 2: Intermediate 2

Copper phthalocyanine tetra-3/6-sulfonyl chloride (1) (4.9 g, 0.005 mol) is slurried in water (250 ml) at room temperature (insoluble suspension) and the pH of the reaction raised from pH 3.5 to 7.5 by the addition of a few drops of 2N $Na_2CO_3$ solution. 2-(Butylamino)-ethanol (1.3 g, 0.11 mol) is added, the reaction mixture is stirred at room temperature for 5 hours. Di-n-butylamine (2.6 g, 0.02 mol) is added and the suspension is stirred at room temperature overnight. Di-n-butylamine is added dropwise until the pH is 10.1 and the reaction is stirred at 40° C. for 3 hours. The product is collected by filtration, washed with cold water and then stirred consecutively in hot 0.1 N caustic soda solution, hot 0.1 N HCl and then cold water, filtering-off after each treatment. Drying overnight yields product (2) as a dark blue solid (5.6 g, ca 85%).

Step 3: MC5

Intermediate 2 above (5.6 g, ca 0.0042 mol) is stirred for 30 minutes in pyridine (56 ml) at room temperature until fully dissolved. Methacrylic anhydride (1.85 g, 0.012 mol) is added dropwise over 5 minutes and the solution is stirred at 60° C. for 2 hours, then at room temperature overnight. Water (5 ml) is added and stirred at room temperature for 30 minutes, then more water is added until the product precipitates. The solid is collected by filtration, washed with cold water and dried to give a blue-black solid (4.2 g, 68%). The material is purified by Soxhlet extraction with methylene chloride and recrystallised from methylene chloride/methanol to yield the product (MC5) as a blue-black solid (4.1 g, 67%). Mp=220-225° C.; $\lambda_{max}$ ($CH_2Cl_2$) 673 nm (118,000), ½ band width=36 nm, shoulder from 639 nm (44,000)-604 nm (37,000).

Example 2

MC6

Prepared by a 3 step procedure as detailed below:

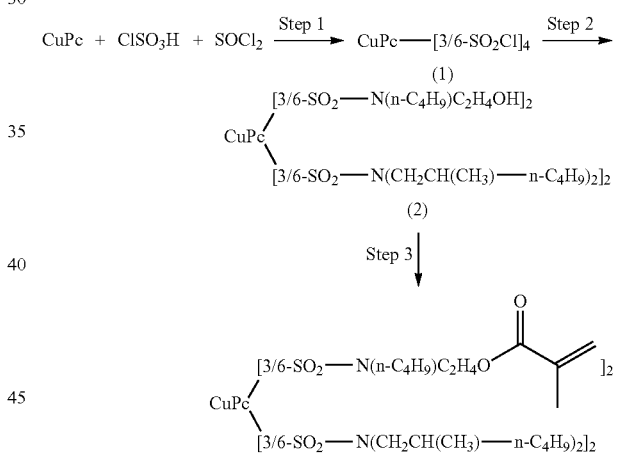

Step 1: Copper phthalocyanine tetra-3/6-sulfonyl chloride (1)

As described in Example 1 for MC5

Step 2: Intermediate 2

Copper phthalocyanine tetra-3/6-sulfonyl chloride (1) (4.9 g, 0.005 mol) is slurried in water (250 ml) at room temperature (insoluble suspension) and the pH raised from 3.5 to 7.5 by the addition of a few drops of 2N $Na_2CO_3$ solution. 2-(Butylamino)-ethanol (1.3 g, 0.011 mol) is added, the pH rising to 10, and the reaction mixture stirred at room temperature for 3 hours. Di-n-2-ethyl-hexylamine (1.29 g, 0.011 mol) is then added dropwise and stirred at room temperature overnight. The product is collected by filtration, washed with cold water and stirred consecutively in hot 0.1 N caustic soda solution, hot 0.1 N HCl and then cold water, filtering-off after each treatment. Drying overnight yields the product (2) as a dark blue solid (5.1 g, ca 66%).

Step 3: MC6

Intermediate 2 above (5.0 g, ca 0.00324 mol) is stirred for 30 minutes in pyridine (50 ml) at room temperature until fully dissolved. Methacrylic anhydride (1.85 g, 0.012 mol) is added and the solution is stirred at 60° C. overnight. Water (5 ml) is added and the reaction stirred at room temperature for 30 minutes before further water is added drop wise until the product precipitated as a blue-black tar. The material is collected by filtration, washed with cold water and dissolved in methylene chloride. The methylene chloride solution is dried (MgSO$_4$), passed through a pad of silica gel, concentrated in vacuo and the product is then precipitated from the concentrated methylene chloride solution by drop wise addition of methanol. The material is dried to give a blue solid (MC6) (1.1 g, 20%) that is readily soluble in acetone, methylene chloride and ether. Mp=ca 201-228° C.; $\lambda_{max}$ (acetone) 668 nm (127,000), ½ band width=35 nm, shoulder from 633 nm (43,000)-601 nm (39,000). More material subsequently separates from the alcoholic mother liquors. $^1$H NMR shows expected signals.

Example 3

MC7

Prepared by an identical 3 step procedure as described for Example 1 for MC5, substituting di-n-hexylamine for di-n-butylamine:

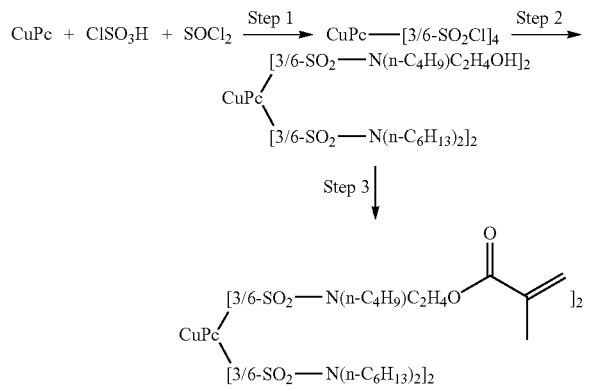

Step 1: Copper phthalocyanine tetra-3/6-sulfonyl chloride (1)

The intermediate copper phthalocyanine tetra-3/6-sulfonyl chloride (1) is prepared as described in MC5 step 1.

Step 2: Intermediate 2

Copper phthalocyanine tetra-3/6-sulfonyl chloride (1) (4.9 g, 0.005 mol) is slurried in water (250 ml) at room temperature (insoluble suspension) and the pH of the reaction raised from pH 3.5 to 7.5 by the addition of a few drops of 2N Na$_2$CO$_3$ solution. 2-(Butylamino)-ethanol (1.3 g, 0.11 mol) is added, the reaction mixture is stirred at room temperature for 5 hours. Di-n-hexylamine (2.6 g, 0.14 mmol) is added and the suspension is stirred at room temperature overnight. Di-n-butylamine is added dropwise until the pH is 10.1 and the reaction is stirred at 40° C. for 3 hours. The product is collected by filtration, washed with cold water and then stirred consecutively in hot 0.1 N caustic soda solution, hot 0.1 N HCl and then cold water, filtering-off after each treatment. Drying overnight yields product (2) as a dark blue solid (6.8 g, ca 95%).

Step 3: MC7

Intermediate 2 above (6.8 g, ca 0.0047 mol) is stirred for 30 minutes in pyridine (60 ml) at room temperature until fully dissolved. Methacryloyl chloride (3.08 g, 0.020 mol) is added dropwise over 5 minutes and the solution is stirred at 60° C. for 2 hours, then at room temperature overnight. Water (5 ml) is added and stirred at room temperature for 30 minutes, then more water is added until the product precipitates. The solid is collected by filtration, washed with cold water and dried to give a blue-black solid. The material is purified by Soxhlet extraction with methylene chloride and recrystallised from methylene chloride/methanol to yield the product (MC7) as a blue-black solid (6.2 g, 83%). $\lambda_{max}$ (CH$_2$Cl$_2$) 674 nm (146,000), ½ band width=37 nm, shoulder from 638 nm (47,000)-604 nm (56,000).

Example 4

MC8

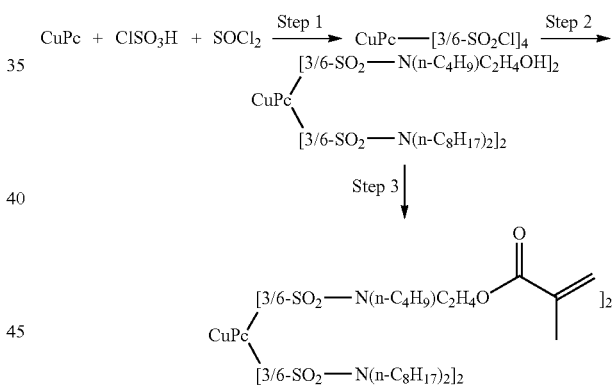

Step 1: Copper phthalocyanine tetra-3/6-sulfonyl chloride (1)

The intermediate copper phthalocyanine tetra-3/6-sulfonyl chloride (1) is prepared as described in MC5 step 1.

Step 2: Intermediate 2

Copper phthalocyanine tetra-3/6-sulfonyl chloride (1) (4.85 g, 0.005 mol) is slurried in water (250 ml) at room temperature (insoluble suspension) and the pH of the reaction is raised from pH 3.5 to 7.5 by the addition of a few drops of 2N Na$_2$CO$_3$ solution. 2-(Butylamino)-ethanol (1.3 g, 0.11 mol) is added, the reaction mixture is stirred at room temperature for 5 hours. Di-n-octylamine (2.66 g, 0.11 mol) is added and the suspension is stirred at room temperature overnight. Di-n-octylamine is added dropwise until the pH is 10.1 and the reaction is stirred at 40° C. for 3 hours. The product is collected by filtration, washed with cold water and then stirred consecutively in hot 0.1 N caustic soda solution, hot 0.1 N HCl and then cold water, filtering-off after each treatment. Drying overnight yields intermediate (2) as a blue solid (6.8 g, ca 88%).

Step 3: MC8

Intermediate 2 above (6.8 g, ca 0.0044 mol) is stirred for 30 minutes in pyridine (60 ml) at room temperature until fully dissolved. Methacryloyl chloride (3.08 g, 0.020 mol) is added dropwise over 5 minutes and the solution is stirred at 60° C. for 2 hours, then at room temperature overnight. Water (5 ml) is added and stirred at room temperature for 30 minutes, then more water is added until the product precipitates. The solid is collected by filtration, washed with cold water and dried to give a dark blue solid. The material is purified by Soxhlet extraction with methylene chloride and recrystallised from methylene chloride/methanol to yield the product (MC8) as a dark blue solid (2.2 g, 30%). $\lambda_{max}$ (CH$_2$Cl$_2$) 674 nm (144,000), ½ band width=33 nm, shoulder from 640 nm (46,000)-604 nm (43,000).

Example 5

2-Methacrylic acid 2-{[4-(3,5-dicyano-4-methylthien-2-ylazo)-phenyl]-[2-(2-methacryloyloxy)-ethyl]-amino}ethyl ester (MM6)

Prepared by a 2 step procedure as detailed below:

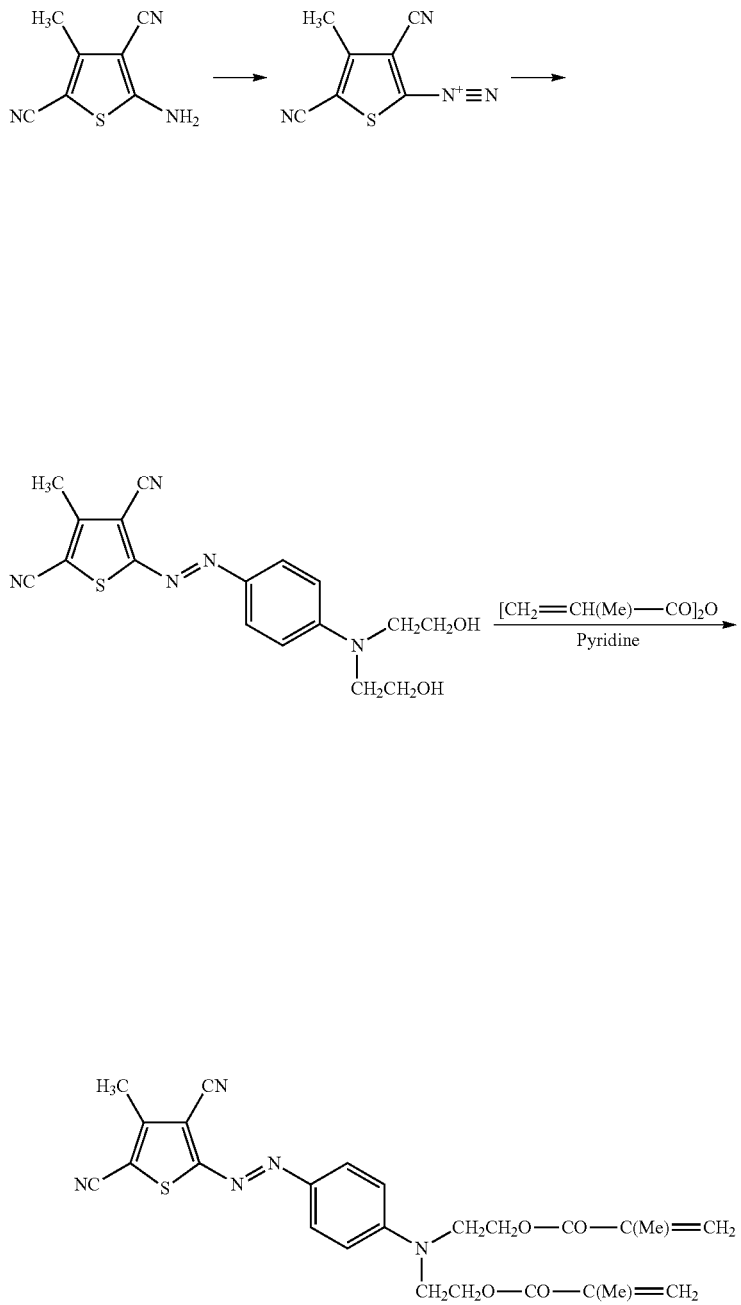

Step 1: Bis(hydroxyethyl) dye

2-Amino-3,5-dicyano-4-methyl thiophene (1.63 g, 0.01 mol) is stirred in a mixture of acetic acid (8 ml) and propionic acid (4 ml) and is cooled to 0-5° C.; sulphuric acid (5 ml) is added followed by nitrosyl sulphuric acid (3.17 g, 0.01 mol) and the cold mixture is stirred for 1 hour. This mixture is added to a stirred solution of N,N-bis(2-hydroxyethyl)-aniline (1.81 g, 0.01 mol) in acetic acid/ice. The pH is raised slowly to 4 with ammonia solution and the resulting solid collected, washed with water and dried. Yield 3.5 g, 98%.

Step 2: Methacryloylation of bis(hydroxyethyl) dye

The above bis(hydroxyethyl) dye (2.5 g, 0.07 mol) is dissolved in pyridine (25 ml) at 50° C. Methacrylic anhydride (3.85 g, 0.025 mol) is added and the mixture stirred at 50° C. for 2 hours followed by 16 hours at room temperature. Water (5 ml) is added, after 1 hour further water (100 ml) is added followed by methylene chloride. The organic layer is collected, dried over magnesium sulphate and diluted with hexane. The resulting solution is passed through silica gel, the coloured fractions are collected and solvent removed to leave a violet solid (MM6), 2.1 g, 61%, mp 150-155° C. $\lambda_{max}$ 543 nm (methanol), $\epsilon_{max}$ 55,000, $w_{1/2}$ 98 nm. $^1$H NMR showed expected signals.

Example 6

2-Methacrylic acid 2-{[3-acetylamino-4-(4-cyano-3-methylisothiazol-5-ylazo)-phenyl]-[2-(2-methacryloyloxy)-ethyl]-amimo}-ethyl ester (MM7)

Prepared by a 2 step procedure as detailed below:

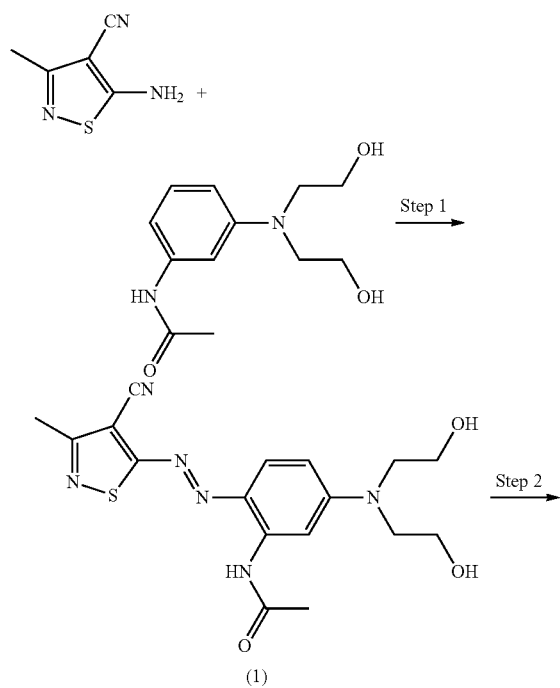

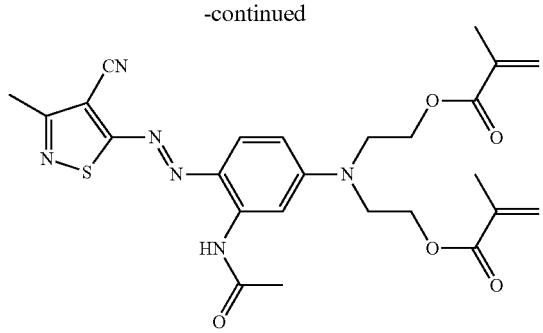

Step 1: N-[5-{bis-(2-hydroxyethyl)-amino}-2-(4-cyano-3-methylisothiazol-5-ylazo)-phenyl]-acetamide (1)

5-Amino-4-cyano-3-methylisothiazole (1.39 g, 0.01 mol) is stirred in 96% sulphuric acid (6 ml) at room temperature for 15 minutes. Propionic acid (4 ml) and acetic acid (8 ml) are added and the thick suspension is cooled to 0-5° C. 40% Nitrosyl sulphuric acid (3.17 g, 0.01 mol) is added dropwise and the thick reaction mixture stirred at 0-5° C. for 1.5 hours. The diazonium salt solution is added in portions to a solution of N-[3-bis-(2-hydroxyethyl)-aminophenyl]-acetamide in a mixture of ice, water and methanol containing a small amount of urea and stirred at 0-5° C. for 2 hours, adding sufficient ammonia liquor to remove mineral acidity. The product is collected by filtration, washed with cold water, dried and recrystallised from methylated spirits to yield N-[5-{bis-(2-hydroxyethyl)-amino}-2-(4-cyano-3-methylisothiazol-5-ylazo)-phenyl]-acetamide (1) as a violet solid (2.4 g, 61%). Mp=188-189° C.; $\lambda_{max}$ (MeOH) 546 nm (57,000), ½ band width=81 nm.

Step 2: 2-methacrylic acid 2-{[3-acetylamino-4-(4-cyano-3-methylisothiazol-5-ylazo)-phenyl]-[2-(2-methacryloyloxy)-ethyl]-amino}-ethyl ester (MM7)

Dye (1) above (2.4 g, 0.0061 mol) is stirred in anhydrous pyridine (48 ml) at 55° C. until fully dissolved and then methacrylic anhydride (2.85 g, 0.0195 mol) is added dropwise. The reaction mixture is stirred overnight at 55° C. then allowed to cool to room temperature. Water (5 ml) is added and the reaction mixture stirred at room temperature to destroy any excess anhydride. Further water is added until the product precipitates. The solid is filtered-off, washed with cold water, then with cold 50% methanol and then dried overnight at 40° C. to give the crude product as a violet solid (3.4 g). This material is purified by flash column chromatography, eluting with a gradient of 80% $CH_2Cl_2$:20% hexane to 99.5% $CH_2Cl_2$:0.5% MeOH and is finally recrystallised from $CH_2Cl_2$/MeOH yielding the desired product (MM7) as a violet solid (1.98 g, 59%). Mp 105° C.; $\lambda_{max}$ (MeOH) 534 nm (58,000), ½ band width=89 nm. $^1$H NMR showed expected signals.

Example 7

2-Methacrylic acid-2-{3-cyano-5-(3,5-dicyano-4-methylthiopen-2-ylazo)-4-methyl-6-[2-(2-methacryloyloxy)-ethylamino]-pyridin-2-ylamino}-ethyl ester (MM8)

Prepared by a 3 step procedure as detailed below:

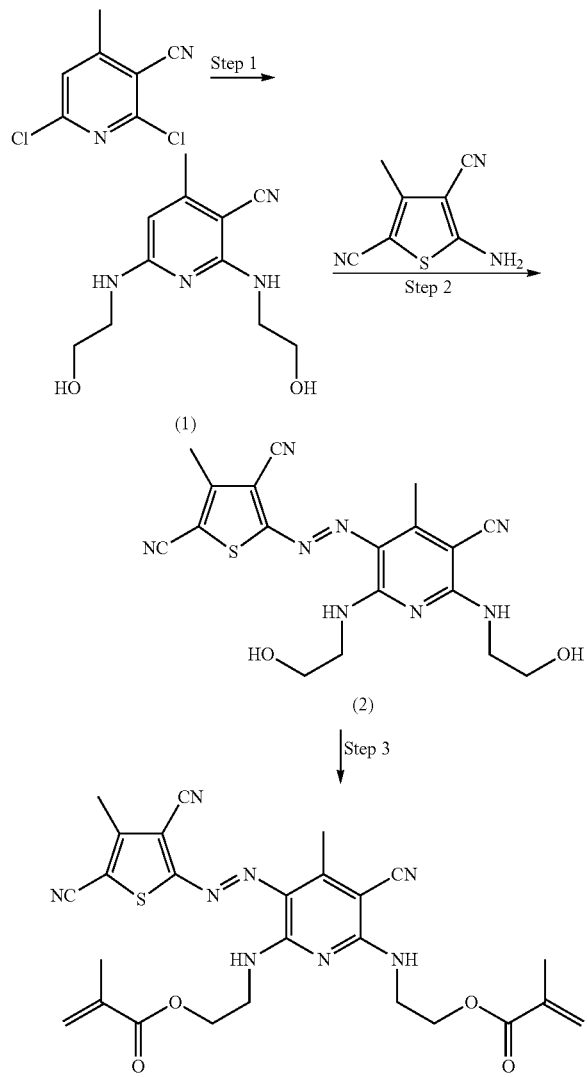

Step 1: 2,6-bis-(2-hydroxyethylamino)-4-methylnicotinonitrile (1)

2,6-Dichloro-4-methylnicotinonitrile (9.35 g, 0.05 mol), potassium carbonate (17.3 g, 0.125 mol) and ethanolamine (7.64 g, 0.125 mol) are stirred in chlorobenzene (100 ml) under reflux for 8 hours. The chlorobenzene layer is decanted off and the residue boiled in additional chlorobenzene (100 ml). After decantation, the residue is boiled in acetone (100 ml), decanted and the combined organic fractions are evaporated to dryness to yield 2,6-bis-(2-hydroxyethylamino)-4-methylnicotinonitrile (1) as a sticky solid (7.1 g, 60%). Mp vague >125° C.

Step 2: 5-[5-cyano-2,6-bis-(2-hydroxyethylamino)-4-methylpyridin-3-ylazo]-3-methylthio-phene-2,4-dicarbonitrile (2)

2-Amino-3,5-dicyano-4-methylthiophene (3.26 g, 0.02 mol) is stirred in 65% $H_2SO_4$ (10 ml) at 0-5°, then 40% nitrosyl sulphuric acid (6.34 g, 0.02 mol) is added dropwise and the mixture stirred at 0-5° C. for a further 1.5 hours. 2,6-Bis-(2-Hydroxyethylamino)-4-methylnicotinonitrile (1) (4.72 g, 0.02 mol) is dissolved in methanol containing a little urea and the solution added to a stirred mixture of ice and water. The diazonium solution is added dropwise to the suspension and the mixture is stirred at 0-5° C. for 30 minutes before neutralising to pH 3-5 with ammonia liquor. After stirring for a further 1 hour, the product is collected by filtration, washed with cold water followed by cold methanol and dried to yield a red-brown solid. The solid is purified further by boiling in cellosolve (300 ml), cooling, filtering-off and washing with methanol. This treatment is repeated to yield 5-[5-cyano-2,6-bis-(2-hydroxyethylamino)-4-methylpyridin-3-ylazo]-3-methylthiophene-2,4-dicarbonitrile (2) as a red-brown solid (7.6 g, 92%). Mp=268-269° C.; $\lambda_{max}$ (MeOH) 526 nm (42,000), ½ band width=88 nm.

Step 3: 2-methacrylic acid-2-{3-cyano-5-(3,5-dicyano-4-methylthiopen-2-ylazo)-4-methyl-6-[2-(2-methacryloyloxy)-ethylamino]-pyridin-2-ylamino}-ethyl ester (MM8)

Dye (2) above (3.7 g, 0.009 mol) is stirred in pyridine (40 ml) at 60° C. and methacrylic anhydride (3.08 g, 0.02 mol) added dropwise. The reaction mixture is stirred at 60° C. for 4 hours. Further methacrylic anhydride (1.54 g, 0.01 mol) is added and the reaction mixture is stirred at 60° C. overnight. Water (5 ml) is added and the reaction mixture stirred at room temperature for 30 minutes before further water is added dropwise until a product precipitates. This solid is filtered-off, washed with cold aqueous methanol and dried to yield a dull red solid (4.7 g, 95%). The solid is purified by dissolving in methylene chloride, passing through a pad of silica gel and recrystallising from methylene chloride/methanol to yield 2-methacrylic acid-2-{3-cyano-5-(3,5-dicyano-4-methylthiopen-2-ylazo)-4-methyl-6-[2-(2-methacryloyloxy)-ethylamino]-pyridin-2-ylamino}-ethyl ester (MM8) as a dull red solid (2.5 g, 41%). Mp=184-187° C.; $\lambda_{max}$ (acetone) 526 nm (49,000), 34 band width=84 nm. A further 0.4 g (6%) was obtained from the mother liquors.

Example 8

2-Methacrylic acid-2-{3-cyano-5-(3,5-dicyano-4-methylthiopen-2-ylazo)-4-methyl-6-[2-(2-methacryloyloxy)-propylamino]pyridin-2-ylamino}-propyl ester (MM9)

Prepared by a 3 step procedure as detailed below:

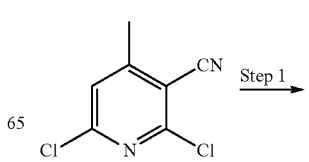

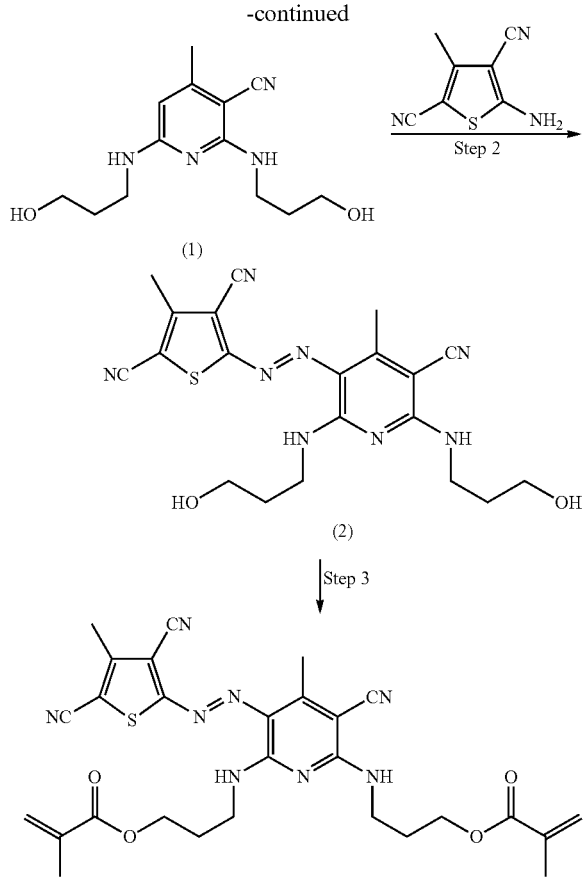

Step 1: 2,6-bis-(2-hydroxypropylamino)-4-methylnicotinonitrile (1)

2,6-Dichloro-4-methylnicotinonitrile (9.35 g, 0.05 mol) and 3-amino-1-propanol (9.39 g, 0.125 mol) are stirred under reflux in chlorobenzene (95 ml) for 6 hours. The hot chlorobenzene supernatant is decanted-off and the tarry residue is extracted by boiling and decantation a further three times with chlorobenzene (3×50 ml). The combined extracts are evaporated to dryness and the pinkish solid obtained (8.5 g, 64%) is recrystallised from methylene chloride/hexane to give 2,6-bis-(2-hydroxypropylamino)-4-methylnicotinonitrile (1) as an almost colourless solid (7.9 g, 59%). Mp=76-78° C. The mother liquor is evaporated to give a residue which consisted of slightly less pure material (5.0 g, 37%).

Step 2: 5-[5-cyano-2,6-bis-(2-hydroxypropylamino)-4-methylpyridin-3-ylazo]-3-methylthio-phene-2,4-dicarbonitrile (2)

2-Amino-3,5-dicyano-4-methylthiophene (1.63 g, 0.01 mol) is stirred in 65% $H_2SO_4$ (10 ml) at 0-5° C., then 40% nitrosyl sulphuric acid (3.17 g, 0.01 mol) is added dropwise over 15 minutes and the reaction mixture stirred at 0-5° C. for a further 1.5 hours. 2,6-bis-(2-Hydroxypropylamino)-4-methylnicotinonitrile (2.64 g, 0.01 mol) is dissolved in methanol (50 ml) containing a little urea and the solution added to a stirred mixture of ice and water. The diazonium salt solution is added dropwise to the suspension and the mixture stirred at 0-5° C. for 30 minutes before neutralising to pH 3-5 with ammonia liquor. After stirring for a further 2 hours, the solid is collected by filtration, washed with cold water then cold methanol and dried to yield 5-[5-cyano-2,6-bis-(2-hydroxypropylamino)-4-methylpyridin-3-ylazo]-3-methylthiophene-2,4-dicarbonitrile (2) as a red-brown solid (3.3 g, 75%). Mp=268-269° C.; $\lambda_{max}$ (acetone) 531 nm (49,000), ½ band width=85 nm.

Step 3: 2-Methacrylic acid-2-{3-cyano-5-(3,5-dicyano-4-methylthiopen-2-ylazo)-4-methyl-6-[2-(2-methacryloyloxy)-propylamino]-pyridin-2-ylamino}-propyl ester (MM9)

Dye (2) above (2.7 g, 0.00616 mol) is stirred in pyridine (27 ml) at 60° C. and methacrylic anhydride (3.08 g, 0.02 mol) is added drop wise. The reaction mixture is stirred at 60° C. overnight then water (5 ml) is added. After stirring at room temperature for 30 minutes, further water is added to precipitate the product. The solid is filtered-off, washed with cold water, then methanol and dried to give a dull red solid (2.9 g, 82%). This material is purified by dissolving in methylene chloride, passing through a pad of silica gel and recrystallising from methylene chloride/iPA to yield 2-methacrylic acid-2-{3-cyano-5-(3,5-dicyano-4-methylthio-phen-2-ylazo)-4-methyl-6-[2-(2-methacryloyloxy)-propylamino]-pyridin-2-ylamino}-propyl ester (MM9) as small olive crystals (2.85 g, 82%). Mp=ca 200-210° C.; $\lambda_{max}$ (acetone) 530 nm (47,000), ½ band width=84 nm. $^1H$ NMR showed expected signals.

Example 9

2-Acrylic acid 2-{[4-(3,5-dicyano-4-methylthien-2-ylazo)-phenyl]-[2-(2-methacryloyloxy)-ethyl]-amino}ethyl ester (MM10)

Prepared by a 3 step procedure as detailed below:

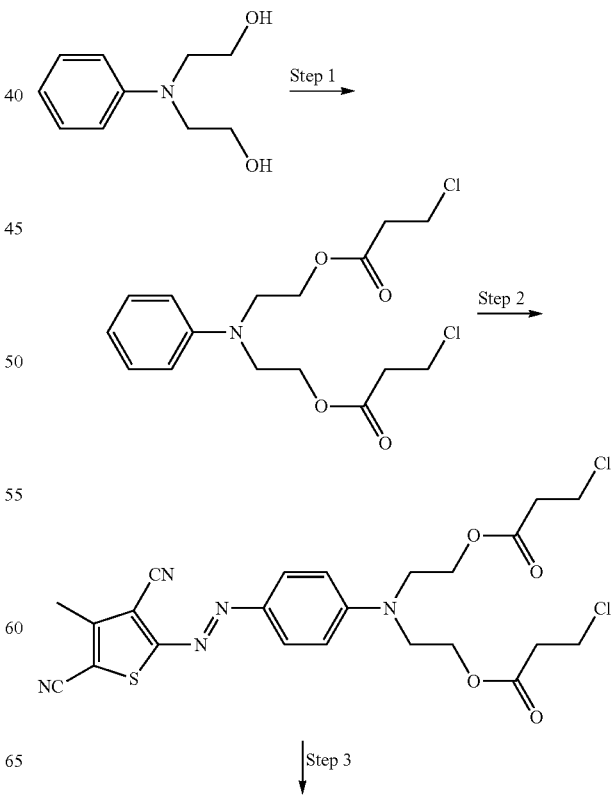

-continued

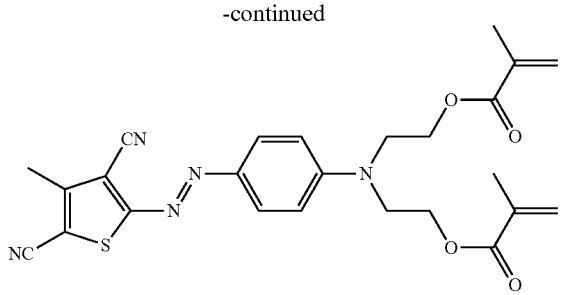

Step 1: Dihydroxyethylaniline-bis-β-Chloropropionate

N,N-bis(2-hydroxyethyl)-aniline (9.05 g, 0.05 mol) is dissolved in a mixture of dichloromethane and pyridine and cooled to 5° C. β-Chloropropionyl chloride (19.0 g, 0.15 mol) is added dropwise and the reaction allowed to stir overnight at ambient temperature. Water (50 ml) is added and the reaction is extracted with dichloromethane. The organic extract is washed with water, then dried ($MgSO_4$) and passed through silica gel and evaporated to dryness.

Step 2: 2-Chloropropionic acid 2-{[4-(3,5-dicyano-4-methylthien-2-ylazo)-phenyl]-[2-(2-methacryloyloxy)-ethyl]-amino}ester 2-Amino-3,5-dicyano-4-methylthiophene (8.15 g, 0.05 mol) is stirred in 65% $H_2SO_4$ (30 ml) at 0-5° C. until fully dissolved then 40% nitrosyl sulphuric acid (19.1 g, 0.06 mol) is added dropwise over 15 minutes and the reaction mixture stirred at 0-5° C. for a further 1.5 hours. The above bis-chloropropionate is dissolved in methanol containing a little urea and the solution added to a stirred mixture of ice and water. The diazonium solution is then added dropwise to the suspension so obtained and the mixture stirred at 0-5° C. for 30 minutes before neutralising to pH 3-5 with sodium hydrogen carbonate. The product is filtered-off, washed with cold water then cold methanol and dried to a red solid. The material is purified by repeated flash column chromatography over silica gel followed by recrystallisation from dichloromethane/ethanol. 2-Chloropropionic acid 2-{[4-(3,5-dicyano-4-methylthien-2-ylazo)-phenyl]-[2-(2-methacryloyloxy)-ethyl]-amino}-ester) was obtained as a red solid (9.6 g, 36%). Mp=116-118° C.; $\lambda_{max}$ (acetone) 539 nm (50,000), ½ band width=107 nm.

Step 3: 2-Acrylic acid 2-{[4-(3,5-dicyano-4-methylthien-2-ylazo)-phenyl]-[2-(2-methacryloyloxy)-ethyl]-amino}ethyl ester (MM10)

2-Chloropropionic acid 2-{[4-(3,5-dicyano-4-methylthien-2-ylazo)-phenyl]-[2-(2-methacryloyl-oxy)-ethyl]-amino}ester (5.36 g, 0.01 mol) is stirred at room temperature in methylene chloride (100 ml) until dissolved. Triethylamine (2.2 g, 0.022 mol) is added dropwise and the reaction mixture is stirred overnight at ambient temperature. Water (50 ml) is added and the reaction stirred for 15 minutes before the organic layer was separated, dried ($MgSO_4$) and evaporated to dryness. The preparation is repeated following the exact procedure with 4 g of bis-chloroproionate and the combined products were recrystallised from methylene chloride/ethanol. 2-Acrylic acid 2-{[4-(3,5-dicyano-4-methylthien-2-ylazo)-phenyl]-[2-(2-methacryloyloxy)-ethyl]-amino}ethyl ester (MM10) is obtained as violet crystals (8.1 g, 100%), mp=107-109° C., $\lambda_{max}$ (EtOAc) 542 nm, $\in_{max}$ 50,000, ½ band width 96 nm.

Example 10

Acrylic acid 2-[{3-acetylamino-4-(4-cyano-3-methylisothiazol-5-ylazo)-phenyl}-{2-acryloyloxyethyl}-amino]-ethyl ester (MM11)

Prepared by a 2 step procedure as detailed below:

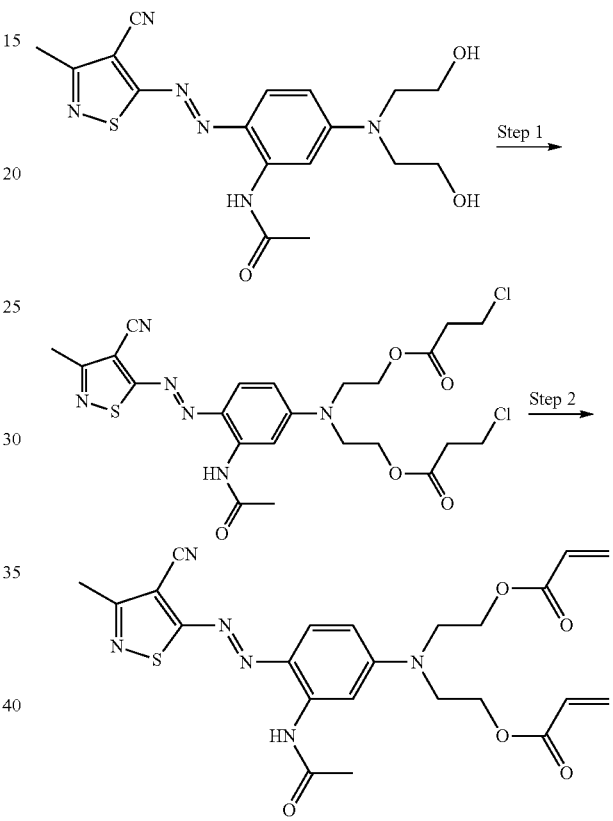

Step 1: 3-Chloropropionic acid 2-[{3-acetylamino-4-(4-cyano-3-methylisothiazol-5-ylazo)-phenyl}-{2-(3-chloropropionyloxy)-ethyl}-amino]-ethyl ester N-[5-{bis-(2-Hydroxyethyl)-amino}-2-(4-cyano3-methylisothiazol-5-ylazo)-phenyl]-acetamide [as described for MM7] (3.2 g, 0.00824 mol) is stirred at room temperature in THF (tetrahydrofuran) (60 ml) containing potassium carbonate (3.5 g, 0.025 mol). 3-Chloropropionyl chloride (3.17 g, 0.025 mol) is added drop wise. The reaction mixture is stirred at 40° C. overnight, cooled to room temperature and water (3 ml) is added dropwise. After stirring at room temperature for 30 minutes, the reaction mixture is filtered and the solids washed with THF until almost colourless. The organic fraction is evaporated to dryness and the ortho isomer is separated-out by flash chromatography over silica gel. The product was then recrystallised from 74OP methylated spirits to yield 3-chloropropionic acid 2-[{3-acetylamino-4-(4-cyano-3-methylisothiazol-5-ylazo)-phenyl}-{2-(3-chloropropionyloxy)-ethyl}-amino]-ethyl ester as a red crystalline solid (4.2 g, 89.5%) mp=113-116° C., $\lambda_{max}$ (EtOAc) 532 nm, $\in_{max}$ 59,000, ½ band width 81 nm.

Step 2: Acrylic acid 2-[{3-acetylamino-4-(4-cyano-3-methylisothiazol-5-ylazo)-phenyl}-{2-acryloyloxyethyl}-amino]-ethyl ester (MM11)

2-[{3-Acetylamino-4-(4-cyano-3-methylisothiazol-5-ylazo)-phenyl}-{2-(3-chloropropionyloxy)-ethyl}-amino]-ethyl ester (4.1 g, 0.0072 mol) is stirred at room temperature in methylene chloride (80 ml) until dissolved. Triethylamine (1.6 g, 0.0158 mol) is added dropwise and the reaction mixture is stirred overnight at 25° C. The solution is washed with water (100 ml), dried (MgSO$_4$) and evaporated to dryness. The preparation is repeated following the exact procedure and the combined products are recrystallised from methylene chloride/74OP methylated spirits. Acrylic acid 2-[{3-acetylamino-4-(4-cyano-3-methylisothiazol-5-ylazo)-phenyl}-{2-acryloyloxyethyl}-amino]-ethyl ester (MM11) is obtained as a violet microcrystalline solid (6.8 g, 95%), mp=92-94° C., $\lambda_{max}$ (EtOAc) 533 nm, $\in_{max}$ 58,000, % band width 81 nm.

Example 11

Acrylic acid 2-[[3-butyrylylamino-4-(4-cyano-3-methylisothiazol-5-ylazo)-phenyl]-(2-acryloyloxyethyl)-amino]-ethyl ester (MM12)

Prepared by a 3 step procedure as detailed below:

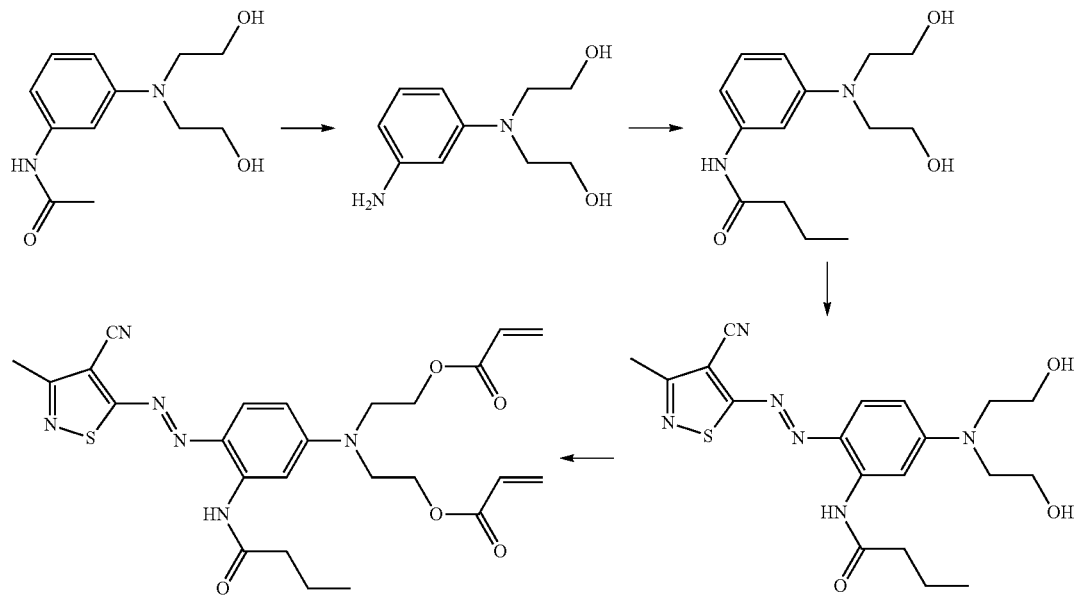

Step 1: N-[3-{bis-(2-Hydroxyethyl)-amino}-phenyl] butyramide

3-N,N-bis-(2-Hydroxyethyl)-amino acetanilide (10 g, 0.042 mol) is stirred under reflux for 4 hours in 50 ml 10% HCl and evaporated to dryness. The crude product is stirred in water (100 ml) at room temperature and precipitated chalk is added in portions until no longer acid. Butyric anhydride (13.3 g, 0.084 mol) is added dropwise over 30 minutes and stirred for a further hour at room temperature (until no longer positive to Ehrlich's). Bicarbonate of soda is added to neutralise the generated butyric acid, stirred for a further hour at room temperature and the product is extracted into dichloromethane (100 ml). The dichloromethane solution is dried and the mixture separated by flash chromatography into the mono butyryl ester (5.5 g) and the required N-[3-{bis-(2-hydroxyethyl)-amino}-phenyl]-butyramide (6.0 g, 53%), initially obtained as an oil but which solidified on standing. Recrystallisation from acetone yields an almost colourless crystals, mp=88-90° C.

Step 2: N-[5-{Bis-(2-hydroxyethyl)-amino}-2-(4-cyano-3-methylisothiazol-5-ylazo)-phenyl]-butyramide 5-Amino-4-cyano-3-methylisothiazole (2.46 g, 0.0177 mol) is added in portions to a mixture of propionic acid (7 ml) and acetic acid (15 ml) and stirred at room temperature for 15 minutes before cooling to 0-5° C. Nitrosyl sulphuric acid (5.65 g, 0.0178 mol) is added dropwise to the stirred suspension. The diazonium salt solution is added dropwise to a stirred suspension of N-[3-{bis-(2-hydroxyethyl)-amino}-phenyl]-butyramide (5.0 g, 0.0188 mol) in water containing a small amount of sulphamic acid stirred at 0-5° C. The reaction mixture is stirred overnight, allowing to warm to room temperature. The product is collected by filtration, washed with cold water and dried (crude yield=4.9 g, 66%). Recrystallisation from methylated spirits yields N-[5-{bis-(2-hydroxyethyl)-amino}-2-(4-cyano-3-methylisothiazol-5-ylazo)-phenyl]-butyramide as violet needles (3.0 g, 40%), mp=175-178° C. $\lambda_{max}$ (EtOAc) 546 nm, $\in_{max}$ 50,000, ½ band width 78 nm.

Step 3: Acrylic acid 2-[[3-butyrylylamino-4-(4-cyano-3-methylisothiazol-5-ylazo)-phenyl]-(2-acryloyloxyethyl)-amino]-ethyl ester (MM12)

N-[5-{bis-(2-Hydroxyethyl)-amino}-2-(4-cyano-3-methylisothiazol-5-ylazo)-phenyl]-butyramide (5.6 g, 0.0134 mol), is stirred in THF (tetrahydrofuran) (100 ml) at 50° C. for 30 minutes. Anhydrous potassium carbonate is added followed by the dropwise addition of 3-chloropropionyl chloride (3.81 g, 0.03 mol). The reaction mixture is stirred overnight at 50° C. Further 3-chloropropionyl chloride (1.5 g, 0.011 mol) is added and stirred for a further 24 hours at 50° C. The reaction mixture is cooled, diluted with water and the crude reaction product collected by filtration, washed with water and dried. Flash chromatography over silica gel yields the desired product acrylic acid 2-[[3-butyrylamino-4-(4-cyano-3-methylisothiazol-5-ylazo)-phenyl]-(2-acryloyloxyethyl)-amino]-ethyl ester (MM12) (3.7 g, 52%), mp=75-78° C. (ex methanol), $\lambda_{max}$ (EtOAc) 532 nm, $\in_{max}$ 64,000, ½ band width 81 nm.

Example 12

2-Methacrylic acid 2-[[3-butyrylylamino-4-(4-cyano-3-methylisothiazol-5-ylazo)-phenyl]-(2-(2-methacryloyloxy]-ethyl)-amino]-ethyl ester (MM13)

Prepared by a 1 step procedure as detailed below:

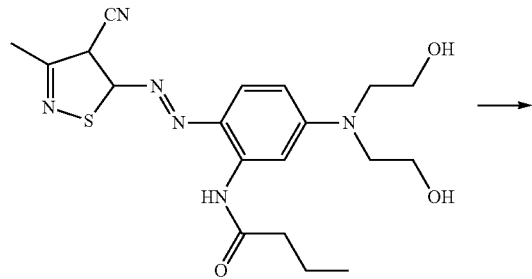

→

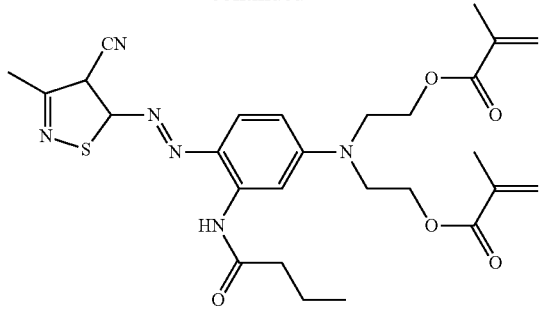

N-[5-{bis-(2-Hydroxyethyl)-amino}-2-(4-cyano-3-methylisothiazol-5-ylazo)-phenyl]-butyramide (5.6 g, 0.0134 mol) is slurried in pyridine (80 ml) at 55° C. for 10 minutes. Methacrylic anhydride (8.0 g, 0.0519 mol) is added dropwise over 30 minutes. The reaction mixture is stirred at 55° C. overnight. After allowing to cool, water (7 ml) is added and stirred for 1 hour to decompose excess anhydride. Further water is added dropwise to the stirred solution until the product precipitates. This solid is collected by filtration, washed with cold water and dried to a powder (5.8 g, 77%). The crude product is dissolved in methylene chloride, screened through silica gel and recrystallised from methylene chloride/methylated spirits yielding 2-methacrylic acid 2-[[3-butyrylylamino-4-(4-cyano-3-methylisothiazol-5-ylazo)-phenyl]-[2-(2-methacryloyloxy]-ethyl)-amino]-ethyl ester (MM13) (4.4 g, 58%), mp=128-130° C., $\lambda_{max}$ (EtOAc) 533 nm, $\in_{max}$ 57,000, ½ band width 81 nm. A further 0.8 g (10%) is obtained from the mother liquors.

Example 13

N,N-bis-(2-Acryloyloxyethyl)-3-iso-butanoylamino-4-(5-cyano-4-methylisothiazol-2-ylazo)-aniline (MM16)

Prepared by a 5 step procedure as detailed below:

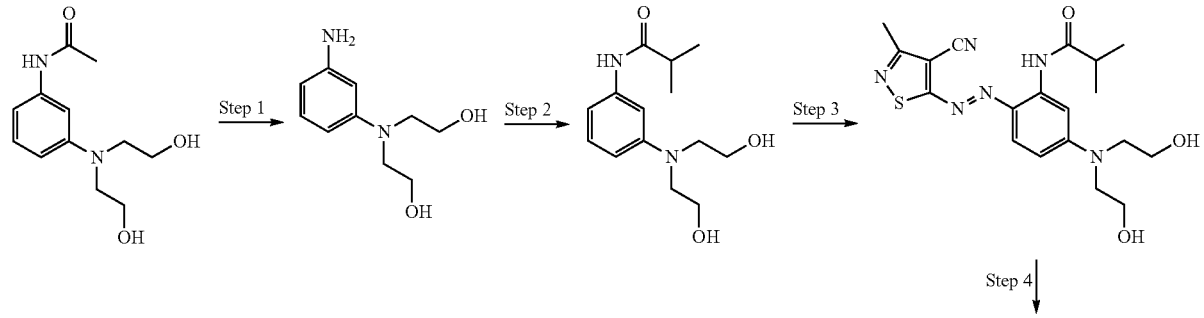

Step 4↓

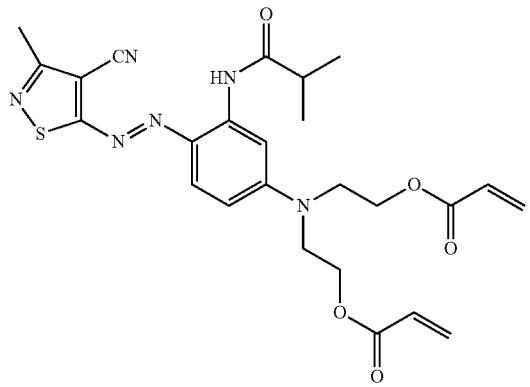

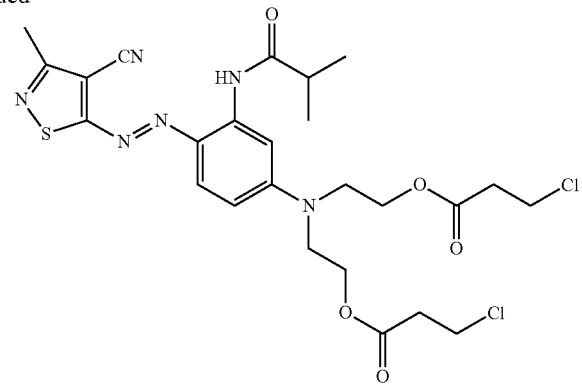

Step 1: N,N-bis-(2-Hydroxyethyl)-m-phenylene diamine

N,N-bis-(2-Hydroxyethyl)-m-aminoacetanilide in hydrochloric acid (10%, 50 ml) is stirred under reflux for 1 hour. The mixture is evaporated to dryness and the residue used directly.

Step 2: N-{3-[bis-(2-Hydroxyethyl)-amino]-phenyl}iso-butyramide

Caustic soda liquor (50 wt %) is added to a stirring mixture of the above amine (ca. 0.04 mol) in water (100 ml), at 15° C., until the pH is 5.0. Isobutyric anhydride (7.9 g, 0.05 mol) is added to the stirred mixture, keeping the temperature constant and maintaining the pH with sodium carbonate. After stirring for 18 hours, further isobutyric anhydride (1.0 g, 0.0063 mol) is added and stirring continued. The product is extracted into methylene chloride and the organic layer is passed through silica gel to yield a solid (7.0 g, 66%), mp=120-122° C.

Step 3: N-[5-{bis-(2-Hydroxyethyl)-amino}-2-(4-cyano-3-methylisothiazol-5-ylazo)phenyl]isobutyramide 5-Amino-4-cyano-3-methylisothiazole (2.09 g, 0.015 mol) is diazotised and coupled under conditions described in Example 6 for MM7. The product is precipitated as a violet solid (5.0 g), which is crystallised from methylated spirit, (4.4 g, 70%), mp=152-154° C., $\lambda_{max}$ (EtOAc) 546 nm, $\in_{max}$ 52,000, ½ band width 79 nm.

Step 4: N-[5-{bis-(2-β-Chloropropionyloxyethyl)-amino}2-(4-cyano-3-methylisothiazol-5-ylazo)phenyl]isobutyramide β-Chloropropionyl chloride (3.81 g, 0.03 mol) is added slowly to a stirred mixture of the above bis-(hydroxyethyl)-amine (4.4 g, 0.0106 mol) and potassium carbonate (5.85 g, 0.042 mol) in THF (tetrahydrofuran) (75 ml) and the mixture is stirred for 18 hours at 50° C. (bath temperature). On cooling, the suspended solid is removed and the solvent evaporated under reduced pressure to leave a solid which is crystallised from a methylated spirit/methylene chloride mixture (2.9 g, 54%), mp=96-96° C., $\lambda_{max}$ (EtOAc) 531 nm, $\in_{max}$ 45,000, ½ band width 82 nm.

Step 5: N-[5-{bis-(2-Acryloyloxyethyl)-amino}2-(4-cyano-3-methylisothiazol-5-ylazo)phenyl]isobutyramide (MM16)

Triethylamine (5 ml, 3.63 g, 0.036 mol) is added to a stirred solution of the above bis-(chloropropionamide (4.5 g, 0.0075 mol) and the mixture is stirred overnight at room temperature. The reaction is filtered and the solvent removed to leave a solid (MM16) which is crystallised from methanol (3.0 g, 76%), mp=92-94° C. $\lambda_{max}$ (EtOAc) 534 nm, $\in_{max}$ 56,000, ½ band width 80 nm.

Example 14

Comparison Example

N-(2-Acryloyloxyethyl)-N-ethyl-4-(4-nitrophenylazo)-aniline (MR1)

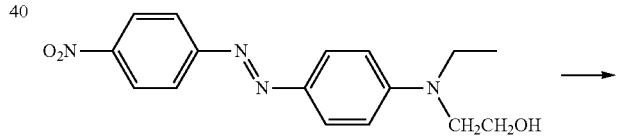

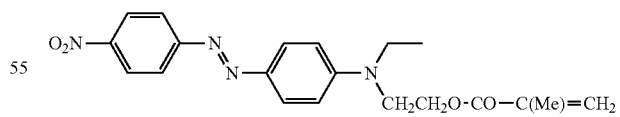

Methacryloyl chloride (8.4 g, 0.083 mol) is added to a stirred solution of commercial CI Disperse Red 1 (95%, 25.0 g, 0.0758 mol) in methylene chloride (200 ml). Triethylamine (22.3 ml, 16.2 g, 0.16 mol) is then added slowly. The mixture is stirred overnight, diluted with methylene chloride and screened through silica gel. The eluate is diluted with 2-propanol and allowed to stand overnight. The crystalline product (MR1) is filtered off and washed with 2-propanol. Yield 25.3 g, 87%. M.p. 88-90° C.

Example 15

N,N-bis-(2-Acryloyloxyethyl)-4-(4-nitrophenylazo)-aniline (MR2)

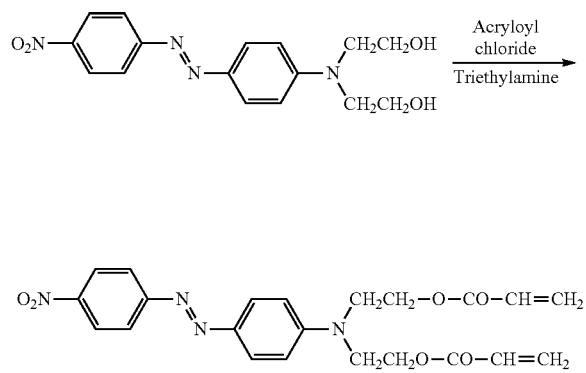

Acryloyl chloride (2.57 ml, 2.87 g, 0.0308 mol) in methylene chloride (10 ml) is added slowly to a stirred solution of commercial CI Disperse Red 19 (95%, 5.1 g, 0.0147 mol) and triethylamine (8.2 ml., 5.95 g, 0.0588 mol) in methylene chloride (75 ml). The mixture is stirred overnight, diluted with methylene chloride and screened through silica gel. The eluate is diluted with 1-propanol and allowed to stand overnight. The crystalline product (MR2) is filtered-off and recrystallised from 50:50 methylene chloride/1-propanol. Yield 3.7 g, 57%. M.p. 91-93° C.

Example 16

N,N-bis-(2-Methacryloyloxyethyl)-4-(4-nitrophenylazo)-aniline (MR3)

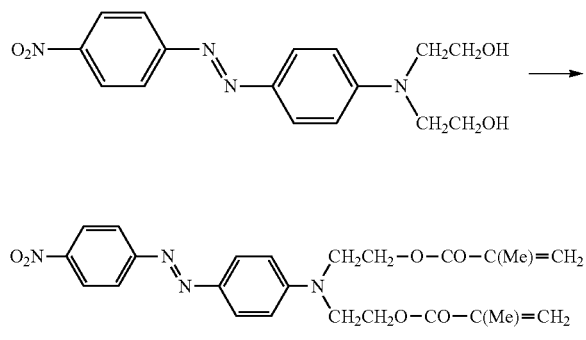

Methacryloyl chloride (3.51 ml, 3.76 g, 0.036 mol) in methylene chloride (10 ml) is added slowly to a stirred solution of commercial CI Disperse Red 19 (95%, 5.0 g, 0.01438 mol) and triethylamine (8.01 ml, 5.8 g, 0.0575 mol) in methylene chloride (75 ml). The mixture is stirred overnight and methanol (50 ml) is added to give a sticky solid. Attempted crystallization from methanol gives a sticky solid which is triturated with further cold methanol. The resulting solid (MR3) is collected and washed with a further small quantity of methanol. Yield 6.0 g, 85%. M.p. 88-90° C.

Example 17

2,2'-(4-((4-Cyano-3-methylisothiazol-5-yl)diazenyl)-3-methylphenylazanediyl)bis(ethane-2,1-diyl) bis(2-methylacrylate) (MR4)

Prepared by a 2 step procedure as detailed below:

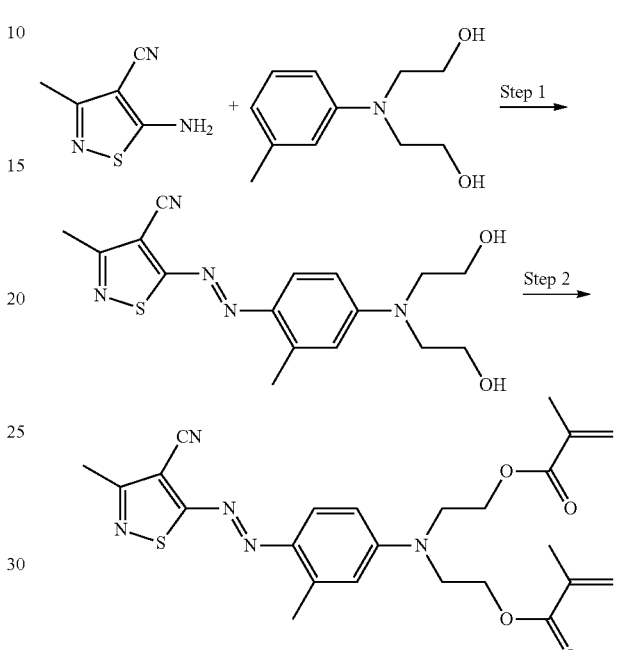

Step 1: 5-((4-(Bis(2-hydroxyethyl)amino)-2-methylphenyl)diazenyl)-3-methylisothiazole-4-carbonitrile 5-Amino-4-cyano-3-methylisothiazole (2.09 g, 0.015 mol) is stirred in sulfuric acid (9 ml) for 15 min. Propionic acid (6 ml) and acetic acid (12 ml) are added and the mixture is cooled to 0-5° C. Nitrosyl sulphuric acid (4.75 g, 0.015 mol) is added dropwise at <5° C. and the mixture is stirred at <5° C. for a further 30 minutes. The diazonium salt mixture is then added to a stirred mixture of 2,2'-(m-tolylazanediyl)diethanol in ice/water/acetone containing 100 mg of sulfamic acid. The product crystallised from the reaction mixture and is recrystallised from aqueous methylated spirits to give intermediate compound 1 as a purple solid (3.5 g, 67%). $\lambda_{max}$ (EtOAc) 542 nm, $\in_{max}$ 48,000, ½ band width 94 nm.

Step 2: 2,2'-(4-((4-Cyano-3-methylisothiazol-5-yl)diazenyl)-3-methylphenylazanediyl)-bis(ethane-2,1-diyl) bis(2-methylacrylate) (MR4)

Methacrylic anhydride (6.7 g, 0.044 mol) is added dropwise at 55° C. to a stirred mixture of 5-((4-(bis(2-hydroxyethyl)amino)-2-methylphenyl)diazenyl)-3-methylisothiazole-4-carbonitrile (8.45 g, 0.01 mol) in dry pyridine (50 ml). The mixture is stirred overnight at 55° C., after which the mixture is allowed to cool to room temperature. Water (5 ml) is added dropwise and the mixture is stirred for 30 minutes at room temperature. Further water is then added dropwise until the product precipitates. The formed solid (MR4) is collected and crystallised from methanol to give the required compound (3.3 g, 66%), mp=123-125° C. $\lambda_{max}$ (EtOAc) 524 nm, $\in_{max}$ 45,000, ½ band width 99 nm.

Example 18

2,2'-(4-((4-Cyano-3-methylisothiazol-5-yl)diazenyl) phenylazanediyl)bis(ethane-2,1-diyl) bis(2-methyl-acrylate) (MR5)

Prepared by a 2 step procedure as detailed below:

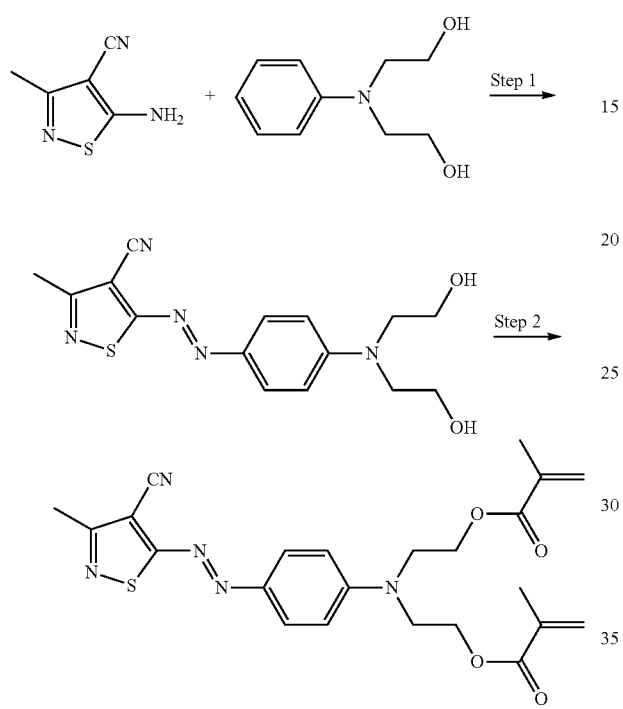

Step 1: 5-((4-(Bis(2-hydroxyethyl)amino)phenyl) diazenyl)-3-methylisothiazole-4-carbonitrile 5-Amino-4-cyano-3-methyl isothiazole (2.78 g, 0.02 mol) is diazotised as for example 19 (MR4) step 1, and the resulting cold diazonium salt suspension is added to a mixture of N-phenyl diethanolamine (3.8 g, 0.021 mol) in acetone/ice/water. The resulting solid is collected and recrystallised from water/methylated spirits (10/90) (3.5 g, 52%). $\lambda_{max}$ (ethyl acetate) 531 nm, $\in_{max}$ 44,500, ½ band width 92 nm.

Step 2: 2,2'-(4-((4-Cyano-3-methylisothiazol-5-yl) diazenyl)phenylazanediyl)bis(ethane-2,1-diyl) bis(2-methylacrylate) (MR5)

5-((4-(bis(2-Hydroxyethyl)amino)phenyl)diazenyl)-3-methylisothiazole-4-carbonitrile (3.5 g, 0.0106 mol) is dissolved in pyridine and treated with methacrylic anhydride as for example 19 (MR4) step 2. The product (MR5) is crystallised from methanol (3.5 g, 71%), mp=102-104° C. $\lambda_{max}$ (EtOAc) 524 nm, $\in_{max}$ 44,000, ½ band width 95 nm.

Example 19

(2,2'-(3-Acetamido-4-((4-butyl-2,6-dicyanophenyl) diazenyl)phenylazanediyl)bis(ethane-2,1-diyl) bis(2-methylacrylate) (MR6)

Prepared by a 4 step procedure as detailed below:

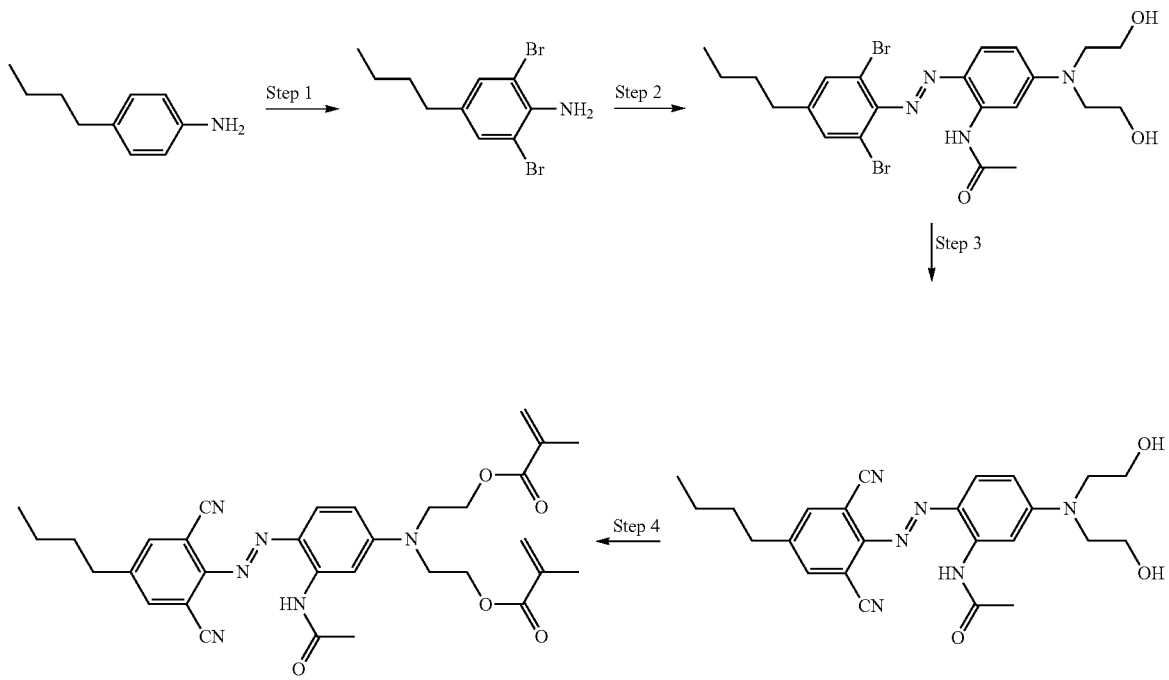

Step 1: 2,6-Dibromo-4-n-butylaniline 4-n-Butylaniline (14.9 g, 0.1 mol) is stirred in water (400 ml) at 10-15° C. 35% hydrochloric acid (9.5 ml) is added dropwise to give a solution, followed by dropwise addition of bromine (21 ml, 65.3 g, 0.406 mol) over 90 minutes at 10-15° C. The mixture is allowed to warm to room temperature and is stirred overnight. The supernatant liquid is removed by decantation to leave a dark solid, which is washed with sodium bicarbonate solution followed by 10% sodium thiosulfate solution. The solid is extracted with ether (300 ml) and washed with 10% sodium thiosulphate solution (100 ml) followed by water (3×100 ml). The organic layer is dried (MgSO$_4$) and concentrated in vacuo to leave a violet crystalline solid, which is dissolved in hexane and passed through silica gel. The fraction that eluted with hexane is evaporated to dryness and the residue is crystallised from a minimum volume of hexane (17.2 g, 56%).

Step 2: N-(5-(Bis(2-hydroxyethyl)amino)-2-((2,6-dibromo-4-butylphenyl)diazenyl)phenyl)-acetamide 2,6-Dibromo-4-n-butyl aniline (6.14 g, 0.02 mol) is stirred in a mixture of acetic acid (20 ml) and propionic acid (10 ml) at 45° C. The resulting solution is cooled to 5° C. and nitrosyl sulphuric acid (6.5 g, 0.02 mol) is added dropwise at 0-5° C. and the mixture is stirred for 1 hour. The resulting cold solution of diazonium salt is added dropwise to a stirred suspension of N-(3-(bis(2-hydroxyethyl)amino)phenyl)acetamide in water at 1-5° C. The stirred mixture is allowed to warm to room temperature and stirred overnight. The resulting solid is collected, washed well with water, and dried. The product is crystallised from ethoxyethanol (11 g., 99%), mp=157-159° C. $\lambda_{max}$ (acetone) 430 nm, $\in_{max}$ 25,000, ½ band width 107 nm.

Step 3: N-(5-(Bis(2-hydroxyethyl)amino)-2-((4-butyl-2,6-dicyanophenyl)diazenyl)phenyl)-acetamide N-(5-(Bis(2-hydroxyethyl)amino)-2-((2,6-dibromo-4-butylphenyl)diazenyl)phenyl)acetamide (11 g, 0.02 mol) and copper (I) cyanide (3.76 g, 0.042 mol) are stirred in dimethyl formamide (50 ml) at 90° C. for 2 hours. The mixture is allowed to cool and water is added dropwise with stirring. The precipitated solid is collected, washed well with water and crystallised from ethoxyethanol.

Step 4: (2,2'-(3-Acetamido-4-((4-butyl-2,6-dicyanophenyl)diazenyl)phenylazanediyl)bis(ethane-2,1-diyl) bis(2-methylacrylate) (MR6)

N-(5-(Bis(2-hydroxyethyl)amino)-2-((4-butyl-2,6-dicyanophenyl)diazenyl)phenyl)-acetamide (4.48 g, 0.01 mol) is dissolved in pyridine and methacrylic anhydride (4.62 g, 0.03 mol) is added dropwise and the mixture stirred for 16 hours at 55° C. Water (5 ml) is added dropwise and the mixture is stirred for 30 minutes at room temperature. Further water is then added dropwise until the product precipitates. The formed solid (MR6) is collected and crystallised from methylene chloride/methylated spirit (3.0 g, 51%), mp=108-110° C. $\lambda_{max}$ (EtOAc) 519 nm, $\in_{max}$ 41,000. ½ band width 99 nm.

Example 20

2-Hydroxy-3-[4-(2-methacryloyloxyethyl)-phenylazo]-1-(3-methacryloyloxypropyl-4-methyl-2-oxo-1,6-dihydropyridine-5-carbononitrile (MY9)

Prepared by a 3 step procedure as detailed below:

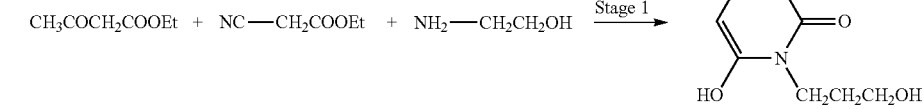

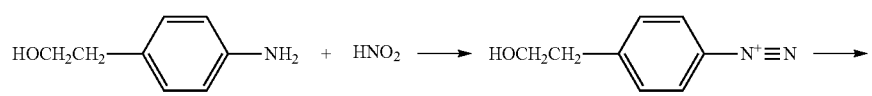

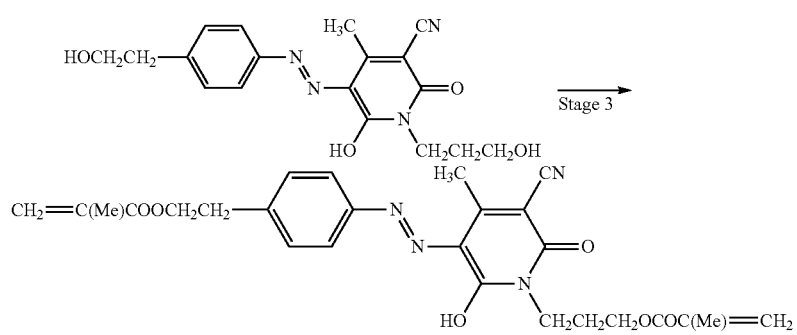

Stage 1: 3-Cyano-6-hydroxy-1-(3-hydroxypropyl)-4-methyl-2-oxo-2[H]-pyridine

3-Aminopropaanol (22.5 g, 0.3 mol) and water (25 ml) are added to a stirred mixture of ethyl cyanoacetate (11.31 g, 0.1 mol) and ethyl acetoacetate (13.01 g, 0.1 mol) and the mixture is stirred at 100° C. overnight. On cooling, the mixture is acidified to Congo Red, with 12 N hydrochloric acid; the resulting solid is collected, washed with water followed by ethyl acetate and dried. Yield 17.0 g, 81%; mp 202-204° C.

Stage 2: 2-Hydroxy-3-[4-(2-hydroxyethyl)-phenylazo]-1-(3-hydroxypropyl-4-methyl-2-oxo-1,6-dihydropyridine-5-carbononitrile Sodium nitrite (0.69 g, 0.01 mol) is added to a stirred, ice cold, solution of 2-(4-aminophenyl)-ethyl alcohol (1.37 g, 0.01 mol) in ice cold dilute hydrochloric acid. After 30 minutes diazotisation is complete; excess nitrous acid is destroyed by adding a small amount of sulphamic acid and 3-cyano-6-hydroxy-1-(3-hydroxypropyl)-4-methyl-2-oxo-2[H]-pyridine (2.08 g, 0.01 mol) is added. Coupling proceeds at pH 2.0-2.5. After coupling is complete a yellow solid is collected, washed with water and dried. Yield 3.6 g, 100%.

Stage 3: 2-Hydroxy-3-[4-(2-methacryloyloxyethyl)-phenylazo]-1-(3-methacryloyloxypropyl-4-methyl-2-oxo-1,6-dihydropyridine-5-carbononitrile (MY9)

Methacrylic anhydride (4.63 g, 0.03 mol) is added to a stirred solution of the 2-hydroxy-3-[4-(2-hydroxyethyl)-phenylazo]-1-(3-hydroxypropyl-4-methyl-2-oxo-1,6-dihydropyridine-5-carbononitrile, in pyridine (36 ml), at 65° C. Further methacrylic anhydride (1.54 g, 0.01 mol) is added and stirring continued, at 65° C., for a further 16 hours. The solution is allowed to cool to room temperature and water is added dropwise. As soon as the mixture becomes cloudy, addition of water is discontinued and the mixture is stirred for 3 hours. Solid is collected, washed with water and dried (Yield 3.8 g, 77%). The product is passed through silica gel; elution with hexane and methylene chloride gives a yellow solid (MY9) which is crystallised from methylene chloride/N-propanol. Yield 2.5 g, 50%. Mp 133-135° C. $\lambda_{max}$ 439 nm (methanol), $\epsilon_{max}$ 50,000, $w_{1/2}$ 76 nm. $^1$H NMR showed expected signals.

Example 21

2-Methacrylic acid 2-{[4-(1-butyl-5-cyano-2-hydroxy-4-methyl-6-oxo-1,6-dihydro-pyridin-3-ylazo)-benzenesulphonyl]-[2-(2-methacryloyloxy)-ethyl]-amino}ethyl ester (MY10)

Prepared by a 4 step procedure as detailed below.

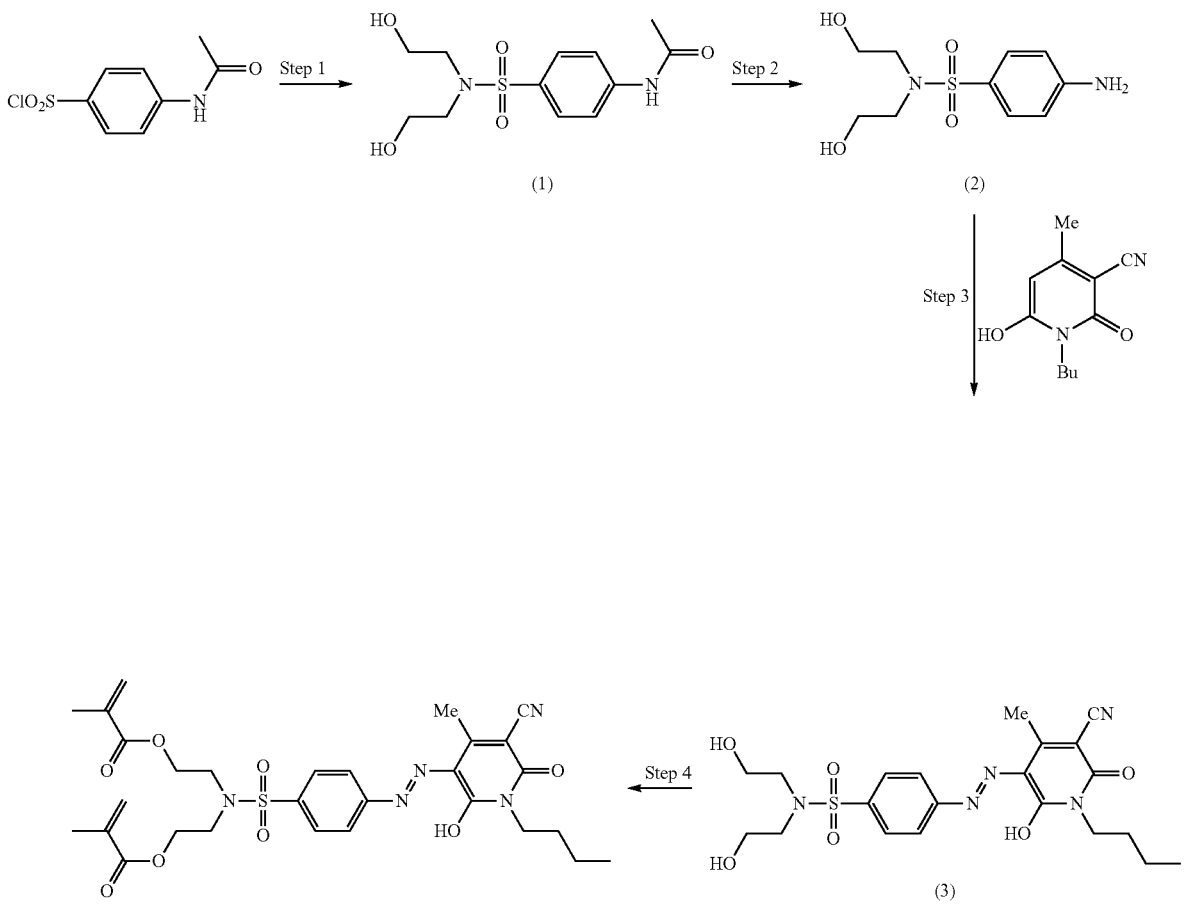

Step 1: N-{4-[bis-(2-hydroxyethyl)-sulphamoyl]-phenyl}-acetamide (1)

4-Acetylaminosulphaniloyl chloride (11.7 g, 0.05 mol) is stirred in acetone. Sodium hydrogen carbonate is added followed by a solution of diethanolamine (7.5 g, 0.071 mol) in acetone. After stirring at room temperature for 3 hours, the reaction mixture is screened and evaporated to dryness yielding N-{4-[bis-(2-hydroxyethyl)-sulphamoyll]-phenyl}-acetamide (1) as a colourless syrup which crystallises on standing (6.6 g, 43%).

Steps 2 & 3: 4-(1-butyl-5-cyano-2-hydroxy-4-methyl-6-oxo-1,6-dihydropyridin-3-ylazo)-N,N-bis-(2-hydroxyethyl)-benzene-sulphonamide (3)

Compound (I) (6.6 g, 0.0215 mol) is stirred under reflux in 5N HCl (50 ml) for 45 minutes, cooled, neutralised with 2N $Na_2CO_3$ and extracted with methylene chloride. The remaining aqueous solution is salted to 15% NaCl and extracted with methyl ethyl ketone. The aqueous solution is acidified to pH 1.0 with HCl, cooled to 0-5° C. and diazotised by the dropwise addition of 2N $NaNO_2$. The diazonium salt solution is added to a stirred solution of 1-butyl-3-cyano-6-hydroxy-4-methylpyrid-2-one (1.65 g, 0.008 mol) at pH 9 in ice-water, the pH falling to 3-4 as it is added. The reaction mixture is stirred at 0-5° C. for 2 hours, then the solid is filtered-off, washed with cold water and dried to yield 4-(1-butyl-5-cyano-2-hydroxy-4-methyl-6-oxo-1,6-dihydropyridin-3-ylazo)-N,N-bis-(2-hydroxyethyl)-benzene-sulphonamide (3) as a yellow solid (3.2 g, 83%).

Step 4: 2-methacrylic acid 2-{[4-(1-butyl-5-cyano-2-hydroxy-4-methyl-6-oxo-1,6-dihydro-pyridin-3-ylazo)-benzenesulphonyl]-[2-(2-methacryloyloxy)-ethyl]-amino}ethyl ester (MY10)

Compound (3) (3.0 g, 0.0063 mol) is stirred in pyridine (30 ml) at 60° and methacrylic anhydride (2.9 g, 0.0188 mol) is added dropwise over 10 minutes. The reaction mixture is stirred overnight at 60° C. before allowing to cool to room temperature. Water (5 ml) is added and the reaction stirred at room temperature for 30 minutes before further water is added dropwise to precipitate the product. The product is collected by filtration, washed with cold water then methanol and dried. The material is further purified by passing through a small pad of silica gel as a solution in methylene chloride/0.5% iPA and then by recrystallisation from methylene chloride/iPA to give 2-methacrylic acid 2-{[4-(1-butyl-5-cyano-2-hydroxy-4-methyl-6-oxo-1,6-dihydro-pyridin-3-ylazo)-benzenesulphonyl]-[2-(2-methacryloyloxy)-ethyl]-amino}ethyl ester (MY10) as a light yellow solid (0.9 g, 23%). Mp=165-167° C.; $\lambda_{max}$ (acetone) 425 nm (47,000), ½ band width=67 nm. $^1$H NMR showed expected signals.

Example 22

2,2'-(4-((5-Cyano-1-(2-ethylhexyl)-2-hydroxy-4-methyl-6-oxo-1,6-dihydropyridin-3-yl)diazenyl)phenylsulfonylazanediyl)bis(ethane-2,1-diyl) bis(2-methylacrylate) (MY11)

Prepared by a 2 step procedure as detailed below:

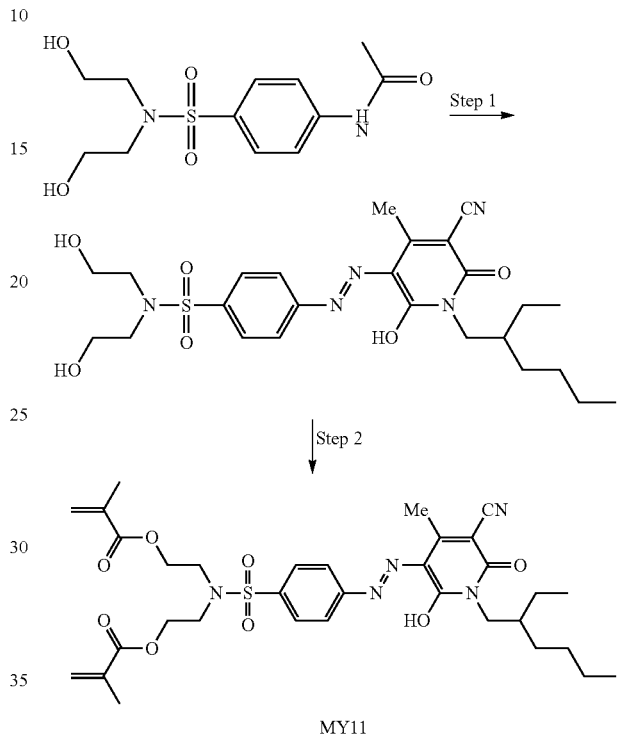

MY11

Step 1: 4-((5-cyano-1-(2-ethylhexyl)-2-hydroxy-4-methyl-6-oxo-1,6-dihydropyridin-3-yl)diazenyl)-N,N-bis(2-hydroxyethyl)benzenesulfonamide A solution of 4-acetylaminobenzenesulphon-bis(2-hydroxyethyl)amide (6.06 g, 0.020 mol) in 2N hydrochloric acid (50 ml) is stirred at 85-95° C. for 1.5 hours. The solution is cooled to <5° C., 2N sodium nitrite (10.5 ml, 0.021 mol) is added and the cold mixture is stirred for 45 min. A small quantity of sulphamic acid is added then the resulting diazonium salt solution is added to 1-(2-ethylhexyl)-3-hydroxy-4-methyl-5-cyanopyrid-6-one (5.50 g, 0.020 mol) and the cold mixture stirred at pH 2-3. After 30 min the mixture is allowed to warm to room temperature, the precipitated solid is collected by filtration and recrystallised from n-propanol to give a yellow solid (7.8 g, 71%). Mp=189-190° C.; $\lambda_{max}$ 426 nm (47,000), % bandwidth=67 nm.

Step 2: 2,2'-(4-((5-Cyano-1-(2-ethylhexyl)-2-hydroxy-4-methyl-6-oxo-1,6-dihydropyridin-3-yl)diazenyl)phenylsulfonylazanediyl)bis(ethane-2,1-diyl) bis(2-methylacrylate) (MY11)

A solution of 4-((5-cyano-1-(2-ethylhexyl)-2-hydroxy-4-methyl-6-oxo-1,6-dihydropyridin-3-yl)diazenyl)-N,N-bis(2-hydroxyethyl)benzenesulfonamide (7.00 g, 0.013 mol) is dissolved in pyridine (35 ml) and methacrylic anhydride (6.94 g, 0.450 mol) is added dropwise. The mixture is stirred at 60° C. overnight, cooled, and water (20 ml) is added dropwise. The precipitated product (MY11) is collected by filtration and recrystallised from ethyl acetate/hexane (30/70) to give a bright yellow solid (7.81 g. 81%). Mp=128-130° C.; $\lambda_{max}$ 426 nm (50,000), ½ bandwidth=66 nm.

Example 23

2,2'-(4-((5-Cyano-1-(2-ethylhexyl)-2-hydroxy-4-methyl-6-oxo-1,6-dihydropyridin-3-yl)diazenyl) phenylsulfonylazanediyl)bis(ethane-2,1-diyl) bis(2-methylacrylate) (MY12)

Prepared by a 3 step procedure as detailed below:

heated to 90° C. for 90 minutes, then cooled to 3° C. in an ice/water bath. A solution of sodium nitrite (1.45 g, 21 mmol) in water (ca 10 ml) is added at <10° C. and stirred for 5 minutes before sulfamic acid (ca 0.1 g) is added to quench excess nitrous acid. The solution is poured into a mixture of ice (200 g) and a solution of 1-butyl-6-hydroxy-4,5-dimethyl-2-oxo-1,2-dihydropyridine-3-carbonitrile [Pyridone CNB] (5.5 g, 21 mmol) in 74OP methylated spirit (ca 100 ml). The bright yellow suspension is stirred for 5 minutes before adding $K_2HPO_4$ (ca. 5 g) to raise the solution to pH 1.2, followed by solid $NaHCO_3$ to pH 5. After 1 hour further stirring, the solid is filtered-off and washed with water on the filter before drying overnight at 40° C. The solid is recrystallised from 1-propanol to yield 4-((1-butyl-5-cyano-2-hydroxy-4-methyl-6-oxo-1,6-dihydropyridin-3-yl)diaz-

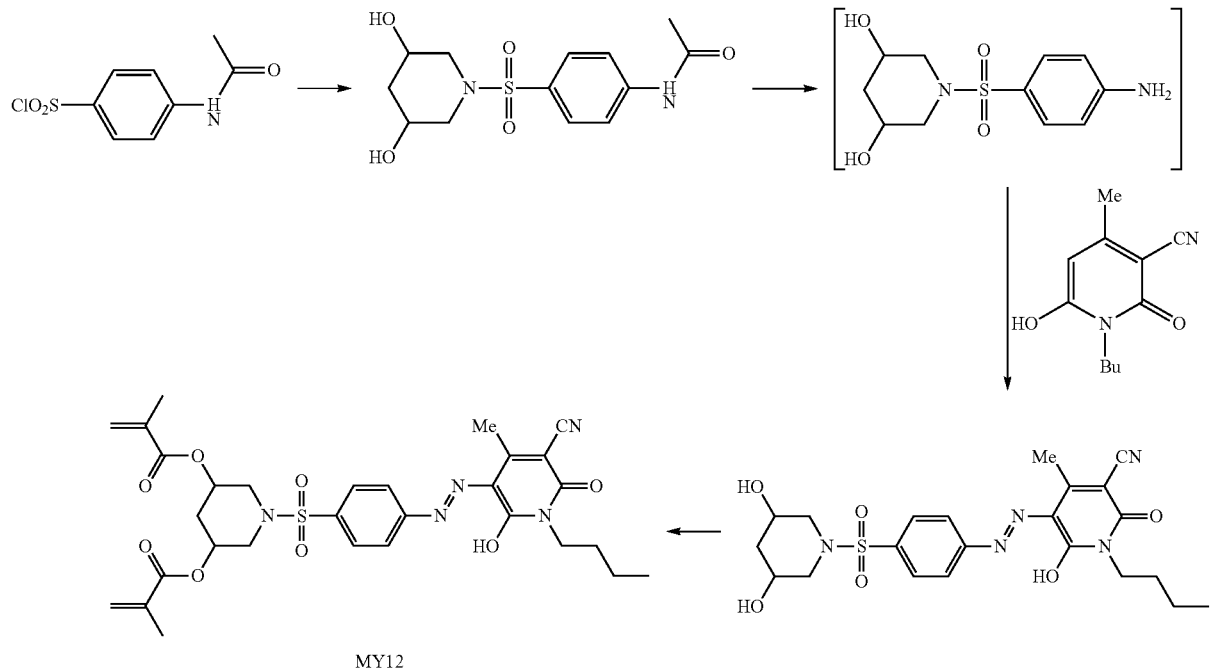

MY12

Step 1: N-(4-(N,N-bis(2-hydroxypropyl)sulfamoyl)phenyl)acetamide

Diisopropanolamine (29.3 g, 0.22 mol) is stirred at 60° C. under nitrogen while N-acetylsulfanilyl chloride (23.4 g, 0.1 mol) is added over 2 minutes allowing the reaction to exotherm to 120° C. The reaction becomes highly viscous and is heated further overnight at 80° C. Water (100 ml) is added and the viscous gum warmed to fully dissolve. The solution is stirred for 48 hours at ambient temperature, which produces a suspended fine white powder. The solid is filtered-off, washed with a small portion of ice cold water and recrystallised from boiling water (80 ml) to produce N-(4-(N,N-bis(2-hydroxyethyl)sulfamoyl)phenyl)acetamide as a white crystalline solid (19.9 g, 60%). Mp=168-170° C.

Step 2: 4-((1-butyl-5-cyano-2-hydroxy-4-methyl-6-oxo-1,6-dihydropyridin-3-yl)diazenyl)-N,N-bis(2-hydroxypropyl)benzenesulfonamide N-(4-(N,N-bis(2-Hydroxypropyl)sulfamoyl)phenyl)acetamide (6.6 g, 20 mmol) is slurried in 2N HCl (100 ml) and enyl)-N,N-bis(2-hydroxypropyl)benzenesulfonamide as a bright yellow powder (7.8 g, 71%). Mp=189-190° C. $\lambda_{max}$ (EtOAc) 426 nm (47,000), ½ band width=67 nm.

Step 3: 2,2'-(4-((1-butyl-5-cyano-2-hydroxy-4-methyl-6-oxo-1,6-dihydropyridin-3-yl)diazenyl) phenyl-sulfonylazanediyl)bis(propane-2,1-diyl)bis(2-methylacrylate) (MY12)

4-((1-Butyl-5-cyano-2-hydroxy-4-methyl-6-oxo-1,6-dihydropyridin-3-yl)diazenyl)-N,N-bis(2-hydroxypropyl)benzenesulfonamide (8.0 g, 15.8 mmol) is slurried in a mixture of pyridine (110 ml) and stirred at 65° C. until all solid has dissolved. Methacrylic anhydride (9.76 g, 63.0 mmol) is added in a single portion (no exotherm) and the reaction is stirred overnight. Due to incomplete reaction, a further portion of methacrylic anhydride (3.0 g, 19.4 mmol) is added and the reaction is stirred overnight. The reaction does not proceed to completion. The reaction is allowed to cool, then water (100 ml) is added to precipitate the product and starting material. The solid is filtered-off and dried at 40° C. before retreating with pyridine (110 ml) and methacrylic anhydride (9.76 g, 63.0 mmol) at 65° C. overnight, after which time, the reaction is complete. Water (100 ml) is added and the resulting precipitate is filtered-off. The material is purified over silica gel, eluting with an increasing gradient of methanol in $CH_2Cl_2$, to give 2,2'-(4-((1-butyl-5-cyano-2-hydroxy-4-methyl-6-oxo-1,6-dihydropyridin-3-yl)diazenyl)phenylsulfonylazanediyl)-bis(propane-2,1-diyl) bis(2-methylacrylate) (MY12) as an orange solid (3.7 g, 36%). Mp=155-157° C.; $\lambda_{max}$ (EtOAc) 425 nm (48,500), ½ band width=67 nm.

Example 24

2,2'-(4-((5-cyano-1-(2-ethylhexyl)-2-hydroxy-4-methyl-6-oxo-1,6-dihydropyridin-3-yl)diazenyl) phenylsulfonylazanediyl)bis(ethane-2,1-diyl) diacrylate (MY13)

Prepared by a 1 step procedure as detailed below:

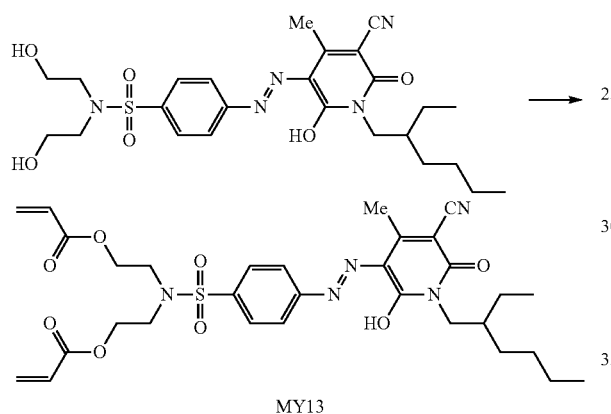

MY13

The synthesis of the starting dyebase is as described for Step 1 of Example 23.

A solution of 4-((5-cyano-1-(2-ethylhexyl)-2-hydroxy-4-methyl-6-oxo-1,6-dihydropyridin-3-yl)diazenyl)-N,N-bis(2-hydroxyethyl)benzenesulfonamide (6.7 g, 0.0125 mol) is stirred in $CH_2Cl_2$ (100 ml) at 30° C. Triethylamine (5.06 g, 0.050 mol) is added, followed by 3-chloropropionyl chloride (6.38 g, 0.050 mol). The reaction is stirred at 30° C. overnight, cooled to room temperature and water (10 ml) is added. After stirring for 2 hours, the organic layer is separated, dried ($MgSO_4$), diluted with hexane (25 ml) and passed through a pad of silica gel. The eluted product fraction is evaporated in vacuo and the solid residue is recrystallised from $CH_2Cl_2$/IMS to give a yellow solid (2.7 g, 34%). Mp=133-135° C. $^1$H NMR shows this material to be ca 75% the bis-acrylate/25% mono-acrylate/mono-3-chloropropionate. The material is retreated with triethylamine (5.06 g, 0.050 mol) in $CH_2Cl_2$ (100 ml) at 30° C. for 2 days and isolated and purified as described previously. Pure 2,2'-(4-((5-cyano-1-(2-ethyl hexyl)-2-hydroxy-4-methyl-6-oxo-1,6-dihydropyridin-3-yl)diazenyl)phenylsulfonylazanediyl)bis(ethane-2,1-diyl) diacrylate (MY13) is isolated as a yellow solid (1.6 g, 20%). Mp=138-140° C. $\lambda_{max}$ 424 nm (48,000), ½ bandwidth=67 nm.

Example 25

2,2'-(3-acetamido-4-((2,6-dicyano-4-nitrophenyl) diazenyl)phenylazanediyl)bis(ethane-2,1-diyl) bis(2-methylacrylate) (MB2)

Prepared by a 3 step procedure as detailed below:

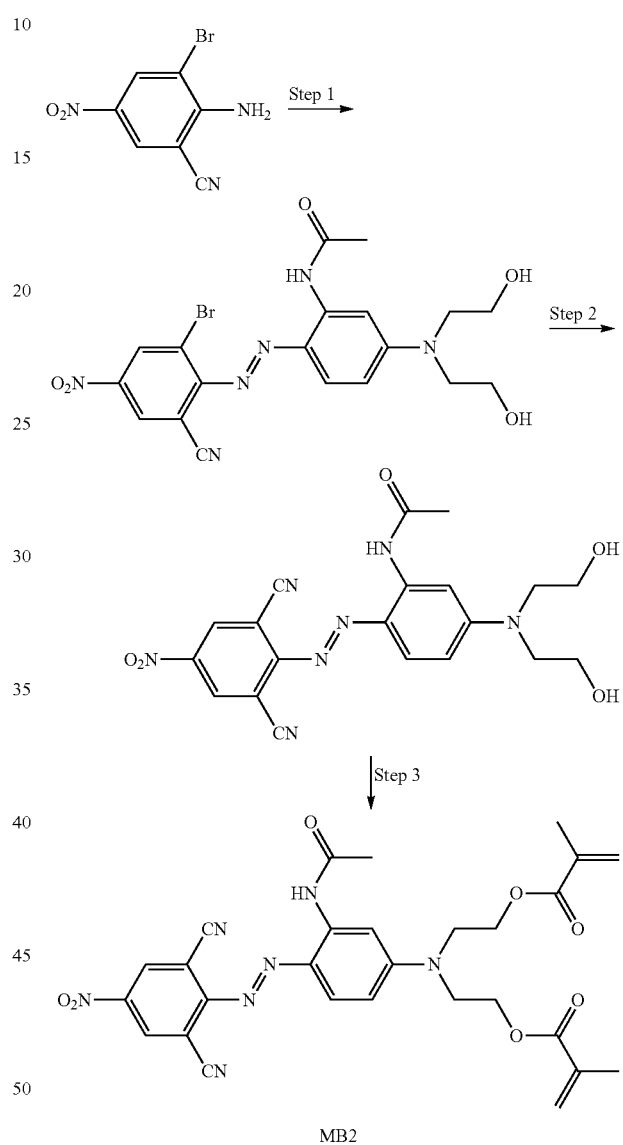

MB2

Step 1: N-(5-(bis(2-hydroxyethyl)amino)-2-((2-bromo-6-cyano-4-nitrophenyl)diazenyl)phenyl)-acetamide 2-Bromo-6-cyano-4-nitroaniline (4.80 g, 0.02 mol) is stirred in sulphuric acid at <5° C. and nitrosyl sulphuric acid (0.02 mol) is added dropwise with stirring. After 1 hour the resulting diazonium salt is added to a stirring mixture of N,N-bis(2-hydroxyethyl)-3-aminoacetanliide (5.00 g, 0.021 mol) in ice/water containing sulphamic acid (~0.5 g). The mixture is stirred at pH 2-3 for 2 hours, allowed to warm to room temperature and the solid is collected by filtration.

Ethoxyethyl ethanol (50 ml) is added and the mixture is heated to boiling. On cooling the crystalline solid is collected, washed with methylated spirits and dried (5.50 g, 56%). $\lambda_{max}$ 593 nm (50,000), ½ bandwidth=112 nm.

Step 2: N-(5-(bis(2-hydroxyethyl)amino)-2-((2,6-dicyano-4-nitrophenyl)diazenyl)phenyl)-acetamide N-(5-(bis(2-hydroxyethyl)amino)-2-((2-bromo-6-cyano-4-nitrophenyl)diazenyl)phenyl)acetamide (4.91 g, 0.010 mol), is dissolved in DMF (dimethylformamide) (30 ml). Copper(I) cyanide (1.35 g, 0.015 mol) is added and the mixture is stirred at 70-80° C. for 3 hours. On cooling, water (~50 ml) is added and the resulting solid (5.8 g), which is contaminated with inorganic salts, is collected, dried and used directly without purification.

Step 3: 2,2'-(3-acetamido-4-((2,6-dicyano-4-nitrophenyl)diazenyl)phenylazanediyl)bis(ethane-2,1-diyl) bis(2-methylacrylate) (MB2)

Methacrylic anhydride (4.62 g, 0.03 mol) is added dropwise to a stirring solution of N-(5-(bis(2-hydroxyethyl) amino)-2-((2,6-dicyano-4-nitrophenyl)diazenyl)phenyl)-acetamide (5.80 g, 0.01 mol) in pyridine (50 ml) at room temperature and the mixture is stirred at 50° C. for 16 hours. On cooling, water (5 ml) is added dropwise and the mixture is stirred for a further hour. The resulting solid is collected, dissolved in a minimum volume of methylene chloride and passed through silica gel. Elution with methylene chloride yields a solid (MB2), which is crystallised from methylene chloride/n-propanol to give a blue-black solid (2.35 g, 40%). Mp 135-137° C. $\lambda_{max}$ 598 nm (59,000), ½ bandwidth=95 nm.

Example 26

Preparation of dyed polymer particles incorporating MM11 at 5 weight % (based on methyl methacrylate) by dispersion polymerisation NAD stabiliser 30% by weight in dodecane was obtained from ICI Ltd. precipitated in cold methanol, dried and dissolved in a 50:50 mixture of ethyl acetate (Aldrich) and butyl acetate (Aldrich). All materials other than dyes are commercially available.

Methyl methacrylate (22.79 g), NAD stabiliser (3.88 g) and methacrylic acid (0.46 ml) are weighed out into a 100 ml 3-necked flask equipped with a condenser, nitrogen flow, and an overhead stirrer. MM11 (1.139 g, 5 weight %) is added and stirred for 1 minute to facilitate dissolution of the dye. Dodecane (22.56 g) followed by 1-octanethiol (0.14 ml) is added to the reaction flask. The mixture is heated with stirring at 300 rpm, once the temperature in the flask is at 75° C., Vazo 67 (0.20 g) is added and the reaction is stirred for 2 hours. Diethanolamine (0.16 ml) is added and the reaction is heated up to 100° C. and stirred overnight.

The resulting solution is filtered through 50 micron cloth to remove small lumps. The particles are cleaned using a centrifuge. Centrifugations are carried out at 10 000 rpm for 20 minutes each, replacing the supernatant with dodecane, this is repeated until the supernatant is colourless. Average particle size was measured by SEM and image analysis: 755 nm.

Table 15 shows similarly prepared polymer particles containing the following dyes (the weight % of dyes based on methyl methacrylate):

TABLE 15

| Experiment No | Dye Name | Dye % | Size/nm |
|---|---|---|---|
| 26/1 | MR1 monomethacrylate | 0.31 | 778 |
| 26/2 | MR2 | 0.31 | 785 |
| 26/3 | MR2 | 2.50 | 857 |
| 26/4 | MR2 | 5.02 | 488 |
| 26/5 | MR3 | 0.31 | 1095 |
| 26/6 | MR3 | 5.00 | 1026 |
| 26/7 | Green (MC5 + MY10, 2:1) | 1.00 | 959 |
| 26/8 | MC5 | 1.00 | 661 |
| 26/9 | MC5 | 2.50 | 473 |
| 26/10 | MC5 | 5.00 | 636 |
| 26/11 | MC6 | 1.00 | 813 |
| 26/12 | MC6 | 2.50 | 642 |
| 26/13 | MC7 | 2.50 | 559 |
| 26/14 | MC7 | 5.00 | 271 |
| 26/15 | MC8 | 2.50 | 580 |
| 26/17 | MC8 | 5.00 | 366 |
| 26/18 | MC9 | 2.50 | 265 |
| 26/19 | MM6 | 1.00 | 899 |
| 26/20 | MM6 | 2.50 | 527 |
| 26/21 | MM7 | 1.00 | 474 |
| 26/22 | MM8 | 1.00 | 851 |
| 26/23 | MM9 | 1.00 | 527 |
| 26/24 | MM9 | 5.00 | 859 |
| 26/25 | MM10 | 1.00 | 540 |
| 26/26 | MM11 | 1.00 | 798 |
| 26/27 | MM11 | 3.50 | 209 |
| 26/28 | MM11 | 5.00 | 755 |
| 26/29 | MM11 | 13.00 | 778 |
| 26/30 | MM12 | 1.00 | 262 |
| 26/31 | MM12 | 2.50 | 594 |
| 26/32 | MM12 | 5.00 | 608 |
| 26/33 | MM12 | 6.00 | 627 |
| 26/34 | MM12 | 7.00 | 590 |
| 26/35 | MM13 | 1.00 | 512 |
| 26/36 | MM13 | 2.50 | 464 |
| 26/37 | MM13 | 5.00 | 627 |
| 26/38 | MM16 | 1.00 | 336 |
| 26/39 | MM16 | 5.00 | 460 |
| 26/40 | MY10 | 1.00 | 336 |
| 26/41 | MY10 | 2.40 | 468 |
| 26/42 | MY10 | 5.00 | 410 |
| 26/43 | MY11 | 5.00 | 722 |
| 26/44 | MY12 | 5.00 | 288 |
| 26/45 | MY13 | 5.00 | 419 |
| 26/46 | MY13 | 7.00 | 591 |
| 26/47 | MR4 | 5.00 | 472 |
| 26/48 | MR5 | 5.00 | 563 |
| 26/49 | MR6 | 5.00 | 490 |
| 26/50 | MB2 | 5.00 | 487 |

Example 27

Washing Experiment

The crude dispersion from the reaction flask after the dyed particle preparation is completed, is centrifuged. The supernatant is removed and percent transmission (% T) measured at $\lambda_{max}$ (450 nm). The same volume of clean dodecane is added and the process repeated.

Table 16 shows that much more dye or dye oligomers are free to be washed out from the particles made with MR1 (disperse red 1 derivative with 1 polymerisable group) than with MR2 (disperse red 1 derivative with 2 polymerisable groups) showing more than 180 times difference in % T after one wash, falling to more than 5 times difference after two washes.

TABLE 16

| Dye | Sample | % T at 450 nm |
|---|---|---|
| MR1 (mono-methacrylate; 0.31 weight %) | 1 | 0.370 |
| | 2 | 17.730 |
| | 3 | 44.230 |
| MR2 (diacrylate; 0.31 weight %) | 1 | 66.720 |
| | 2 | 93.900 |
| | 3 | 94.890 |

Example 28

Electrophoretic Formulation Containing a Dispersion of Cyan Coloured Particles

The electrophoretic ink is prepared by vortex mixing 0.0599 g of particles of Example 26/10 comprising dye MC5, 0.1001 g of AOT (Sigma Aldrich), and 1.8425 g of dodecane (Sigma Aldrich). The dispersion is then roller mixed for 30 minutes.

Size (647.7 nm), Electrophoretic Mobility (−0.03235 μmcm/Vs), ZP (−34.9 mV)

Example 29

Electrophoretic Formulation Containing a Dispersion of Magenta Coloured Particles The electrophoretic ink is prepared by vortex mixing 0.0600 g of particles of Example 26/28 comprising dye MM11, 0.1001 g of AOT (Sigma Aldrich), and 1.8408 g of dodecane (Sigma Aldrich). The dispersion is then roller mixed for 30 minutes.

Size (786.5 nm), Electrophoretic Mobility (−0.04126 μmcm/Vs), ZP (−44.5 mV)

Example 30

Electrophoretic Formulation Containing a Dispersion of Yellow Coloured Particles The electrophoretic ink is prepared by vortex mixing 0.06014 g of particles of Example 26/40 comprising dye MY10, 0.09998 g of AOT (Sigma Aldrich), and 1.83999 g of dodecane (Sigma Aldrich). The dispersion is then roller mixed for 30 minutes.

Size (507.9 nm), Electrophoretic Mobility (−0.06648 μmcm/Vs), ZP (−41.7 mV).

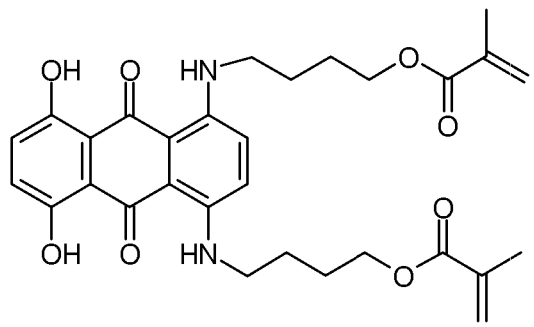

The invention claimed is:

1. Colored polymer particles comprising monomer units of a) at least one polymerisable dye comprising a chromophore, at least two polymerisable groups, wherein said polymerizable groups are selected from methacrylates, acrylates, methacrylamides, acrylamides, acrylonitriles, α-substituted acrylates, styrenes and vinyl ethers, vinyl esters, propenyl ethers, oxetanes and epoxys; optionally fixed by at least one linker group, and optional groups to modify physical properties and optionally charged group(s), b) at least one co-monomer, c) optionally at least one charged co-monomer, and d) optionally at least one crosslinking co-monomer wherein the polymerisable dye is an anthraquinone dye selected from formulae (XII) to (XIV);

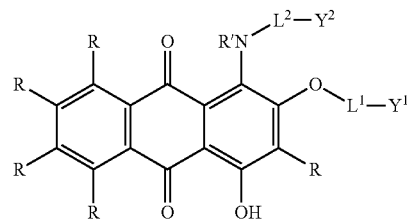

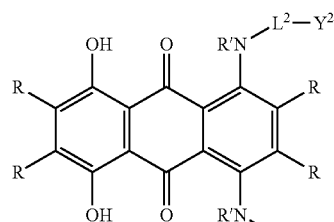

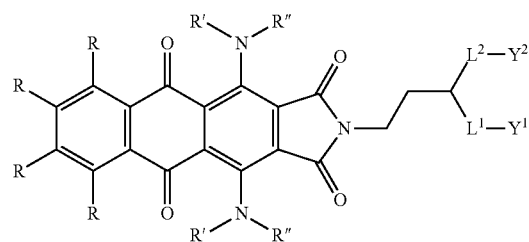

wherein

R selected from the group consisting of H, alkyl, substituted or non-substituted aryl, —F, —Cl, —Br, —I, —OR', —SR', —C(O)R', —C(O)OR', —NHCOR', —NO$_2$, —CN, —SO$_3$H, —NR'R", with R' and R" independently of one another equal to H or alkyl, and L$^1$ and L$^2$ are independently of one another a single bond, optionally substituted cycloalkyl or aromatic ring, linear or branched, optionally substituted, alkylene, where one or more non-adjacent C atoms may be replaced by O, S and/or N, and/or one or more double and/or triple bonds may be present in the chain and/or side chain or a combination thereof, and Y$^1$ and Y$^2$ are independently of one another, polymerisable group.

2. The colored polymer particles according to claim 1, wherein wherein the R is selected from the group consisting of H, C$_1$-C$_6$ alkyl, substituted or non-substituted aryl, —F, —Cl, —Br, —I, —OR', —SR', —COCH$_3$, —CO$_2$CH$_2$CH$_3$, —NHCOCH$_3$, —NO$_2$, —CN, —SO$_3$H, or —NR'R", with R' and R" independently of one another equal to H or alkyl, and L$^1$ and L$^2$ are independently of one another a single bond, optionally substituted phenylene or C$_1$-C$_6$ alkyl and Y$^1$ and Y$^2$ are independently of one another, an acrylate or methacrylate, and Me stands for V, VO, Cd, TiO, Ti, Mn, Cr, Fe, Co, Ni, Cu, Zn, Pd, Cd, Mg, Hg Zr, Al, MoO$_2$, Pt, Ru or Rh.

3. The colored polymer particles according to claim 1, wherein the polymer particles have a diameter of 50-1000 nm.

4. The colored polymer particles according to claim 1, wherein the polymer particles have a diameter of 150-600 nm.

5. An electrophoretic device which comprises the colored polymer particles according to claim 1, comprising monomer units of at least one (i) polymerizable dye comprising at least two polymerisable groups, (ii) at least one co-monomer, (iii) optionally at least one charged co-monomer, and (iv) optionally at least one crosslinking co-monomer.

6. An electrophoretic fluid comprising the colored polymer particles according to claim 1.

7. The electrophoretic display device comprising the colored polymer particles according to claim 1.

8. The electrophoretic display device according to claim 7, wherein the electrophoretic fluid is applied by a technique selected from inkjet printing, slot die spraying, nozzle spraying, and flexographic printing, or any other contact or contactless printing or deposition technique.

9. A process for the preparation of colored polymer particles according to claim 1, comprising
   a) the polymerization of at least one polymerizable dye comprising at least two polymerizable groups, at least one monomer, at least one initiator, and optionally at least one charged co-monomer by dispersion or emulsion polymerization, and optionally
   b) washing and drying the colored polymer particles.

10. Colored polymer particles comprising monomer units of a) at least one polymerisable dye comprising a chromophore, at least two polymerisable groups, wherein said polymerizable groups are selected from methacrylates, acrylates, methacrylamides, acrylamides, acrylonitriles, α-substituted acrylates, styrenes and vinyl ethers, vinyl esters, propenyl ethers, oxetanes and epoxys; optionally fixed by at least one linker group, and optional groups to modify physical properties and optionally charged group(s), b) at least one co-monomer, c) optionally at least one charged co-monomer, and d) optionally at least one crosslinking co-monomer wherein at least one of the following polymerisable dyes are used

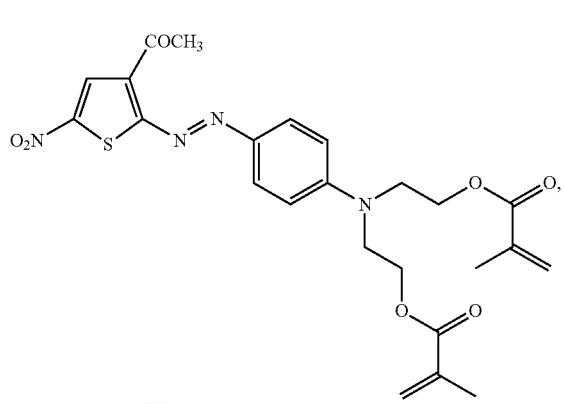

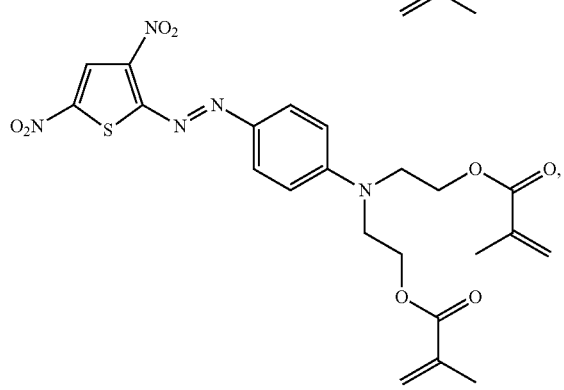

-continued

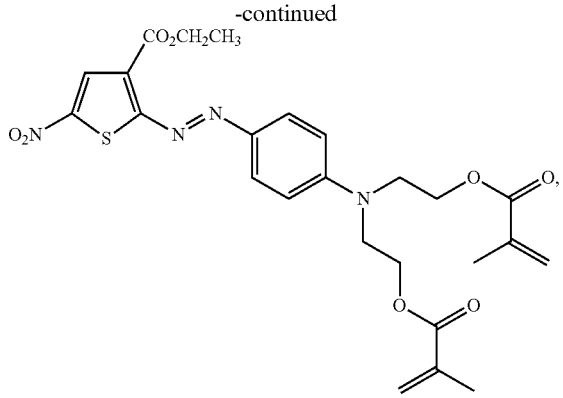

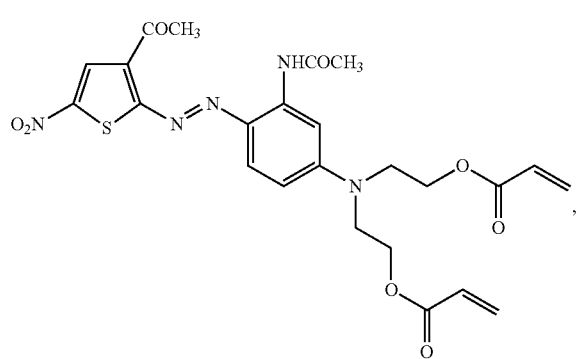

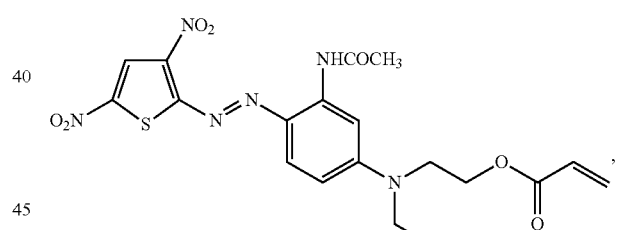

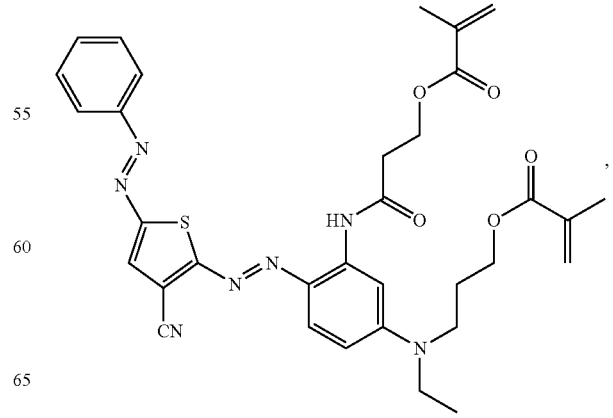

119
-continued
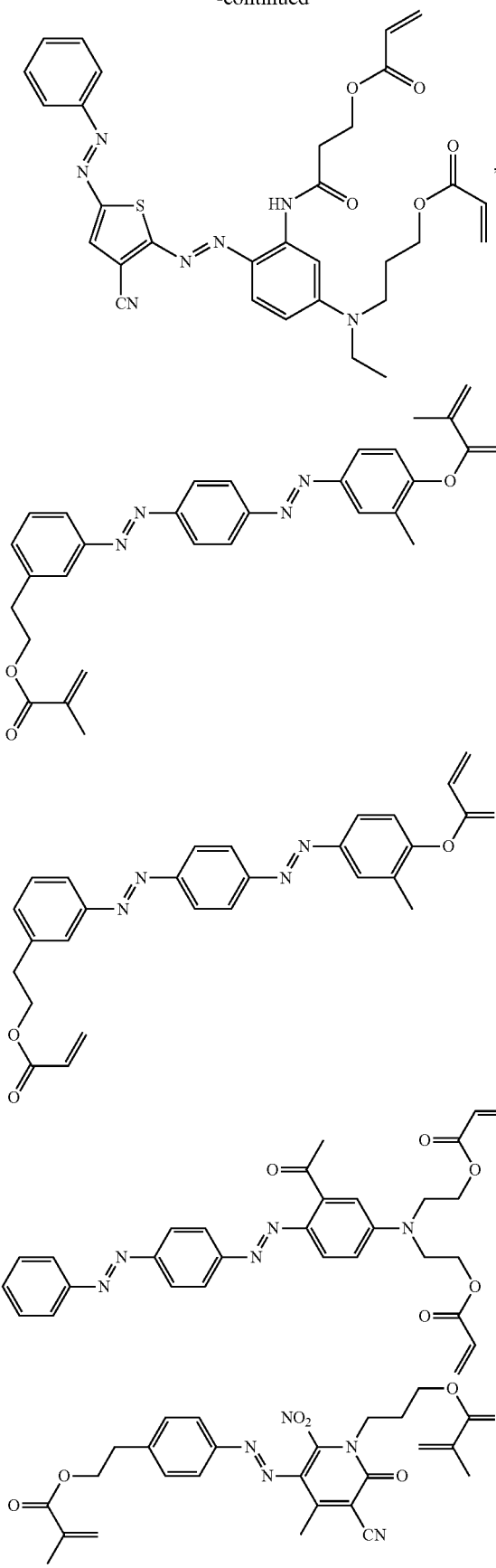
120
-continued
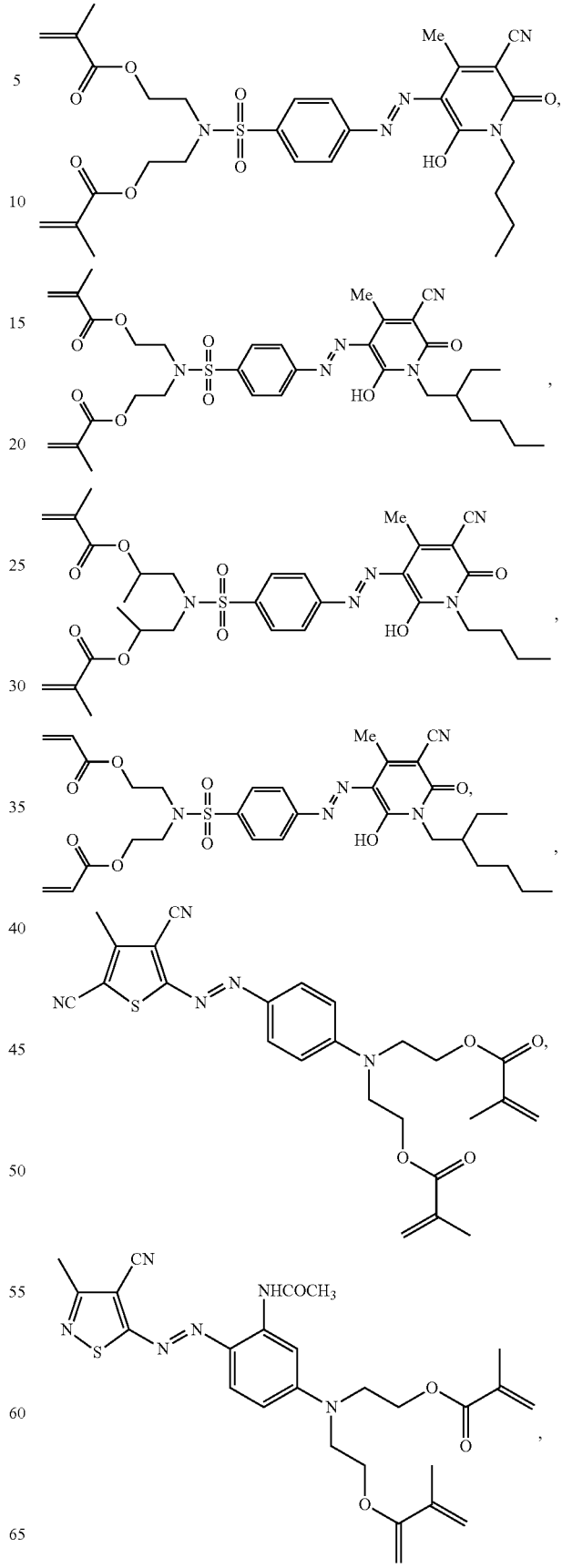

121
-continued
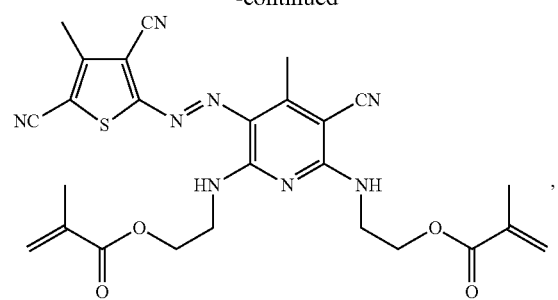
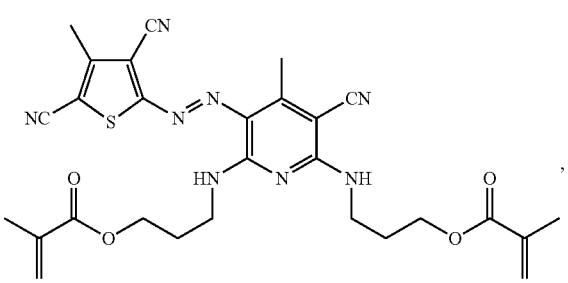
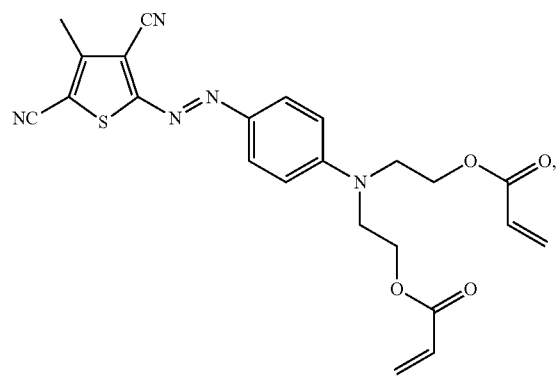
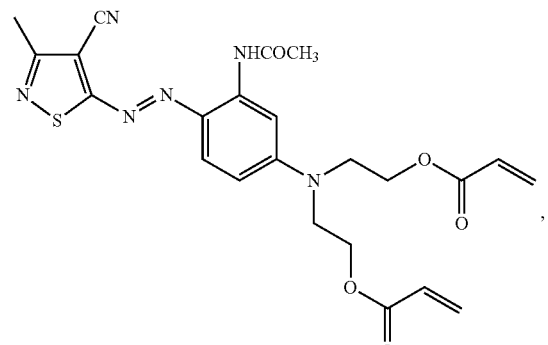,
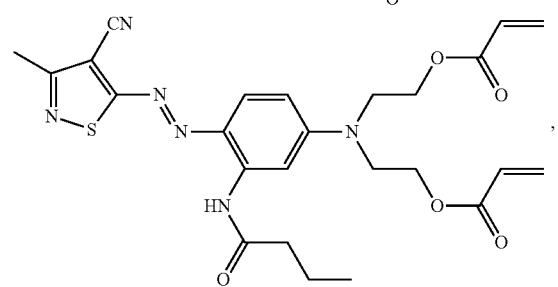
122
-continued
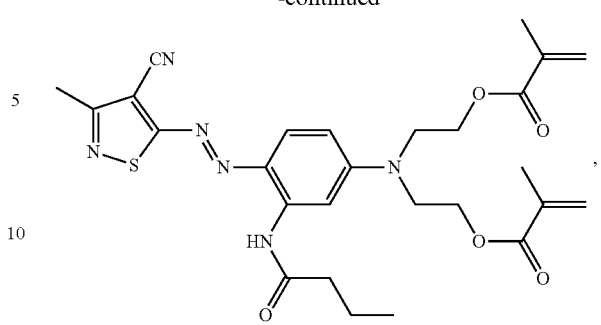,
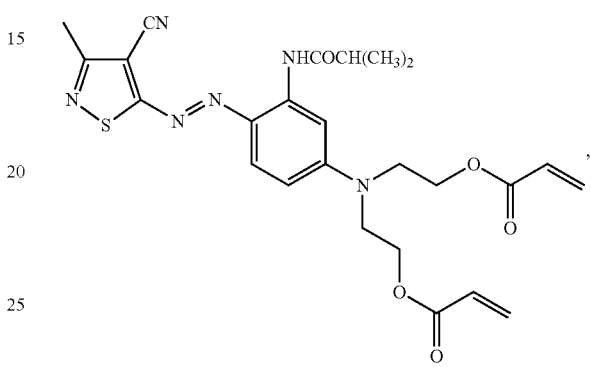,
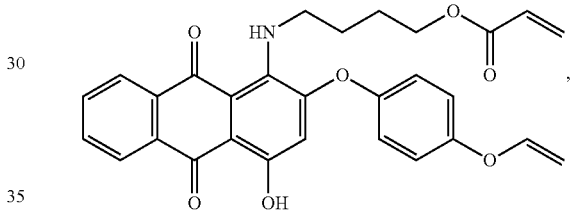,
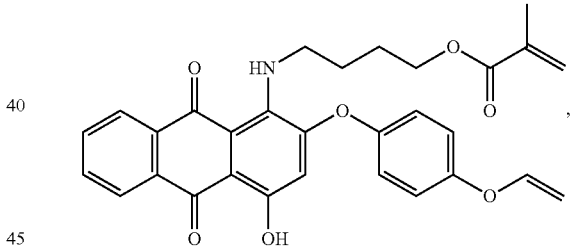,
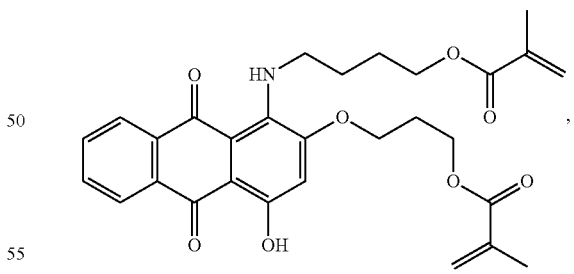,
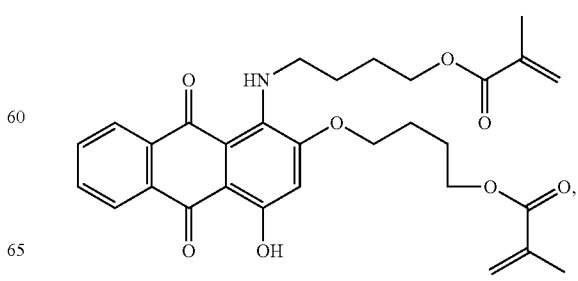, 123
-continued
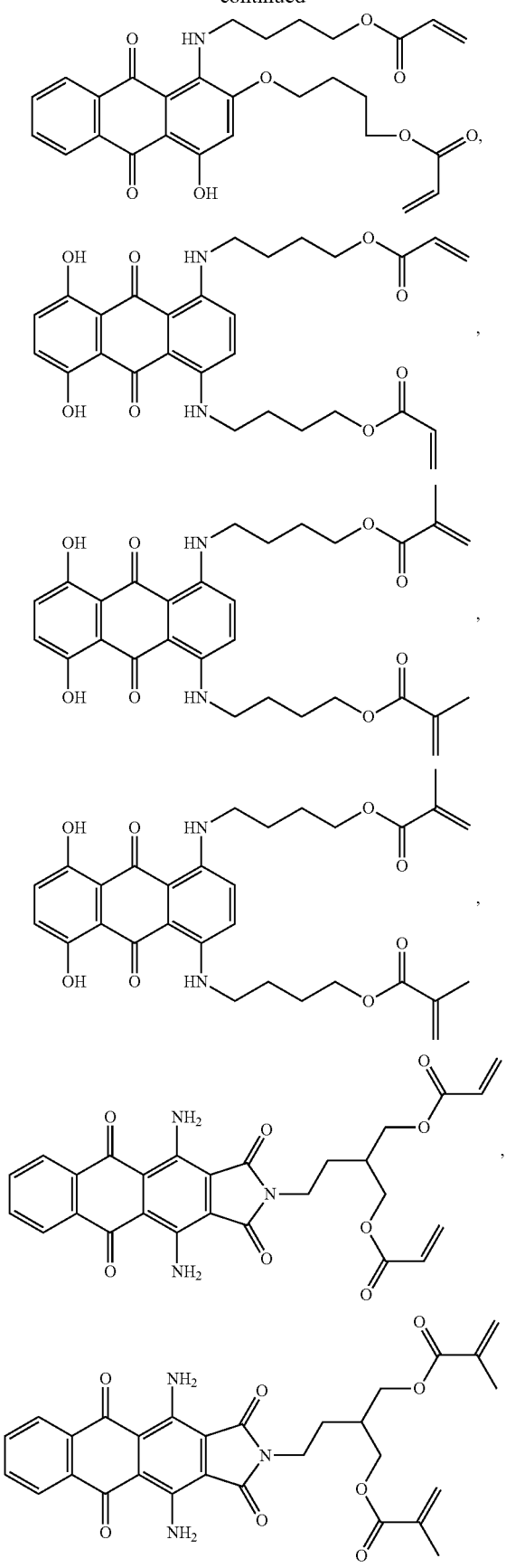
124
-continued
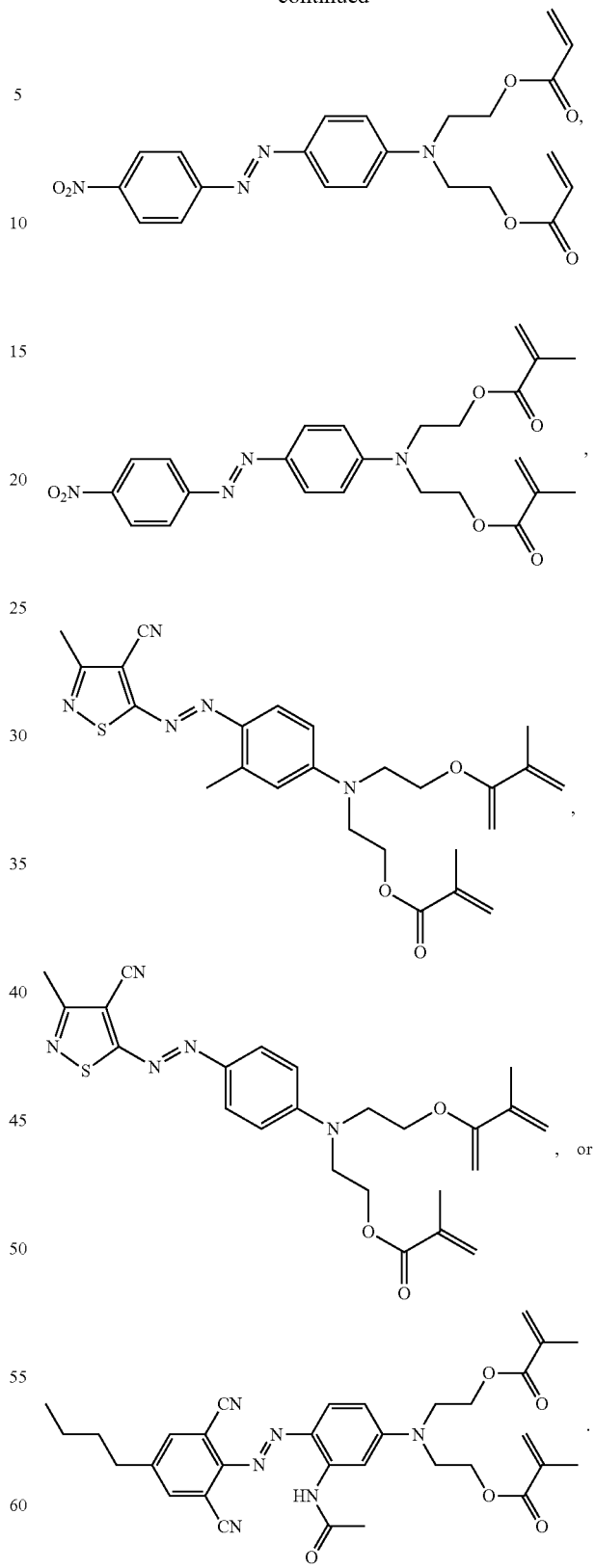
11. The colored polymer particles according to claim 10, wherein at least one of the following polymerisable dyes are used 125
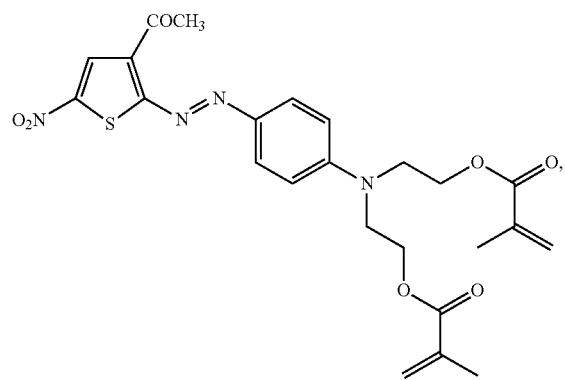
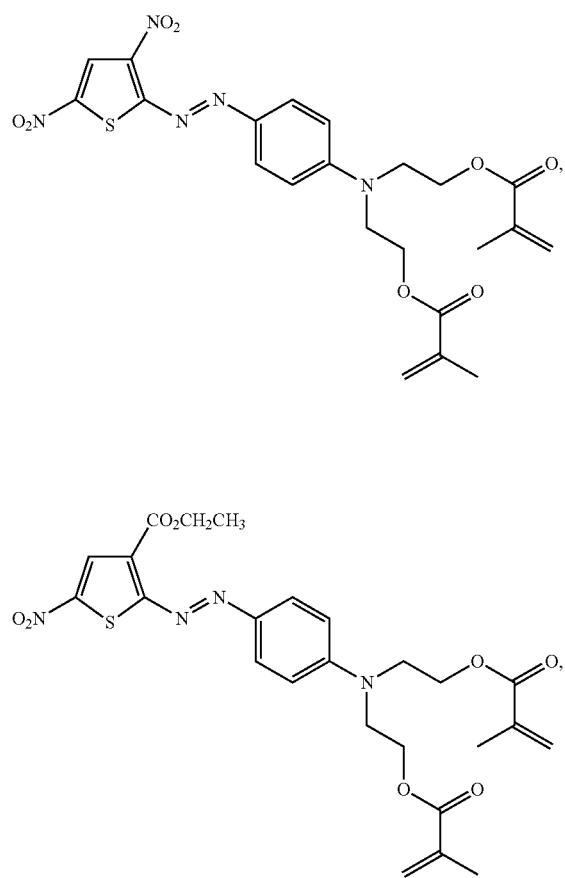
126
-continued
or
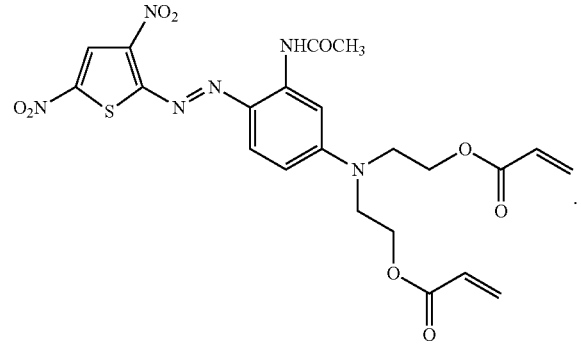
12. The colored polymer particles according to claim 10, wherein at least one of the following polymerisable dyes are used
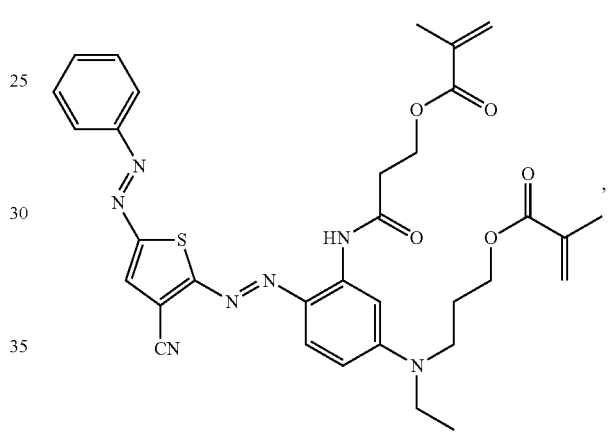
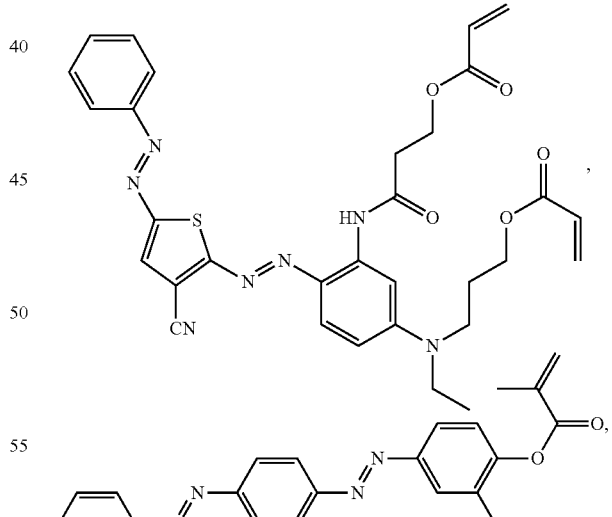
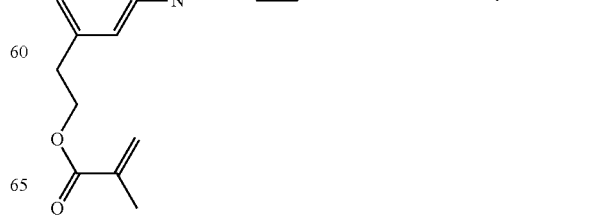

127
-continued
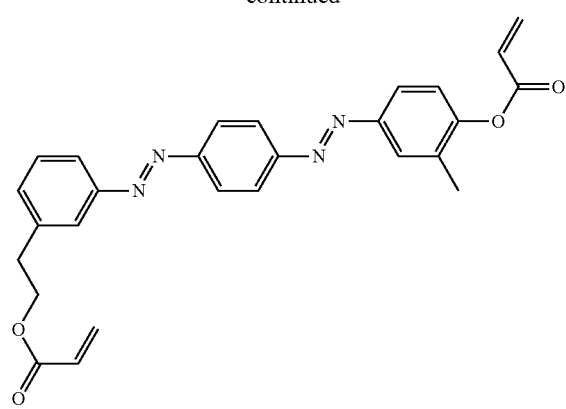
or
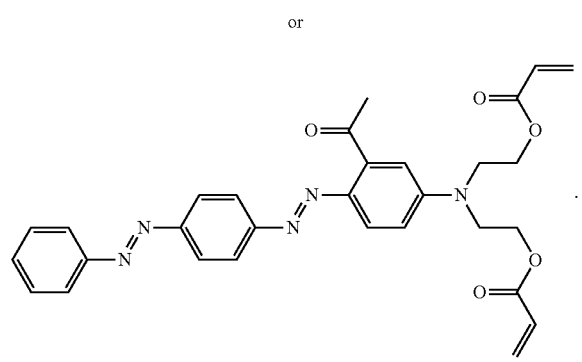
13. The colored polymer particles according to claim 10, wherein at least one of the following polymerisable dyes are used
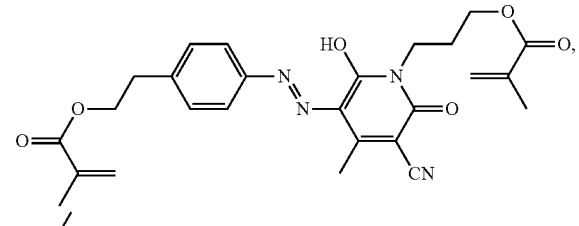
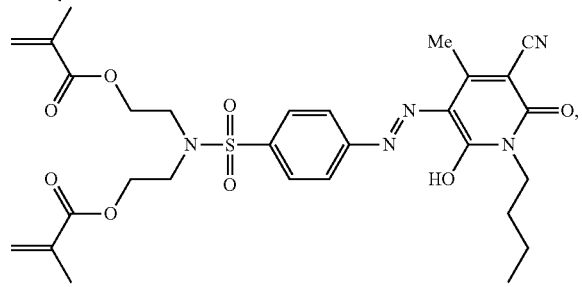
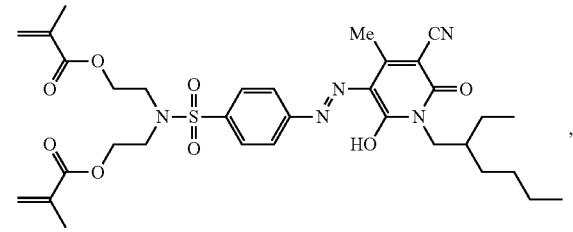
128
-continued
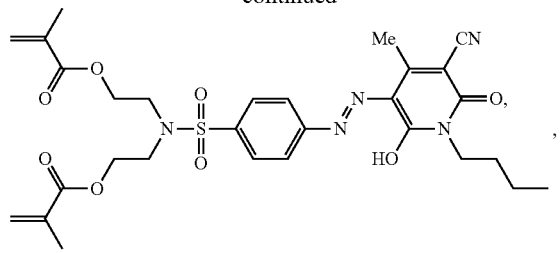
or
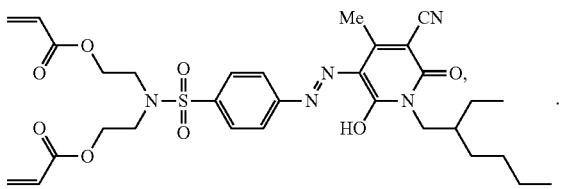
14. The colored polymer particles according to claim 10, wherein at least one of the following polymerisable dyes are used
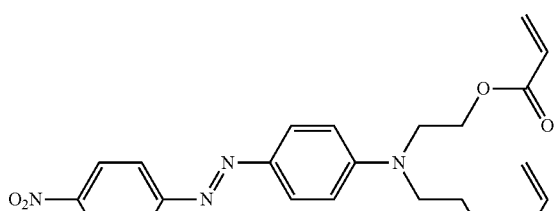
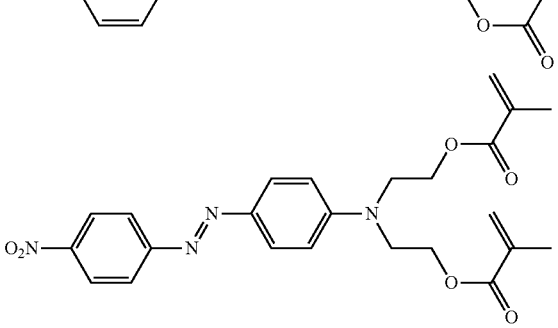
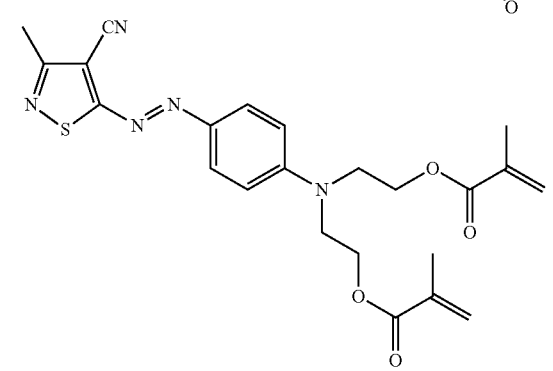
or

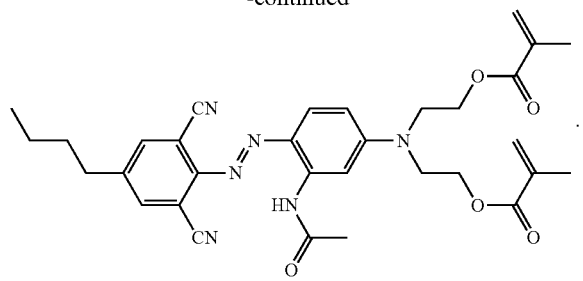
15. The colored polymer particles according to claim 10, wherein at least one of the following polymerisable dyes are used
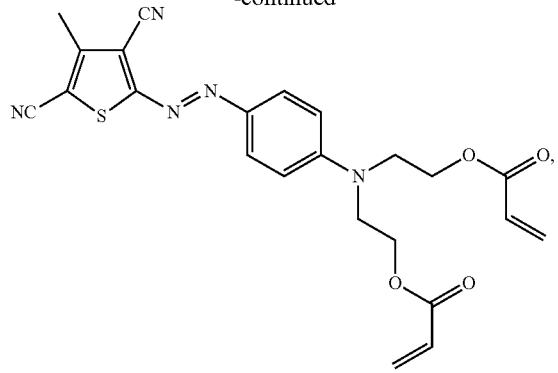
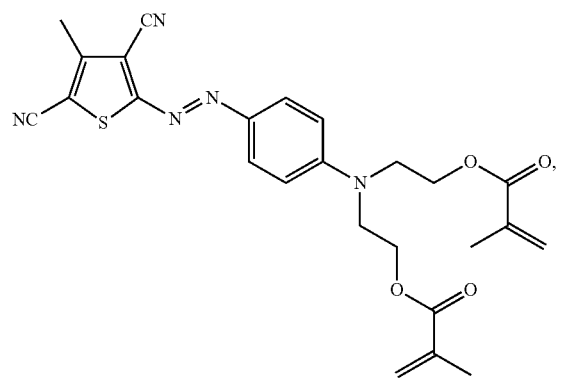
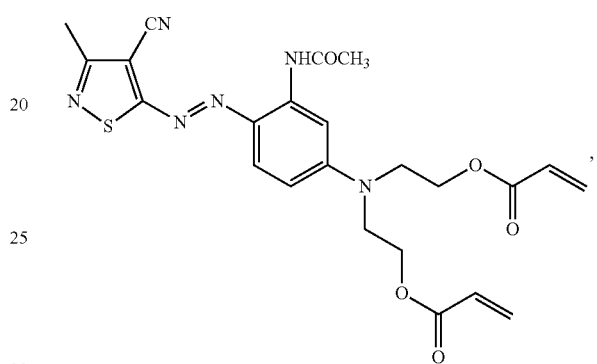
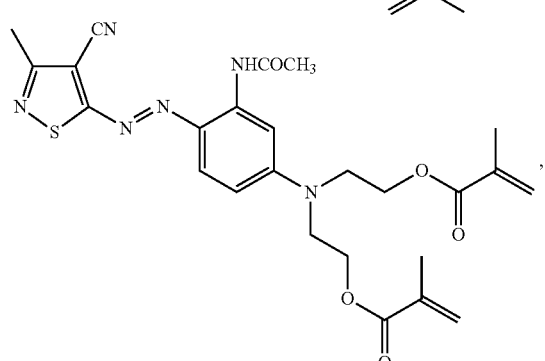
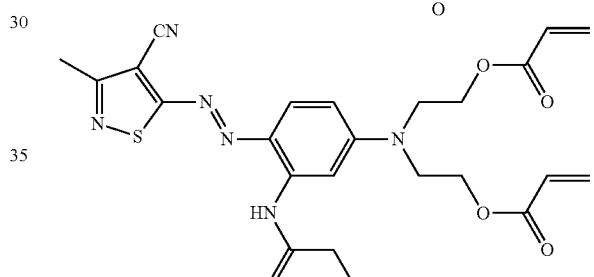
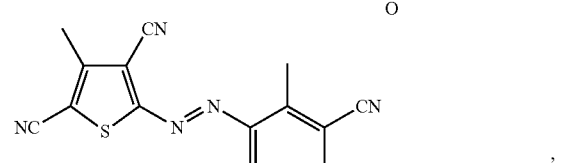
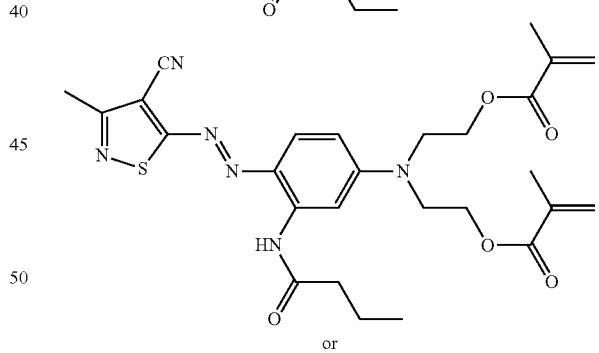
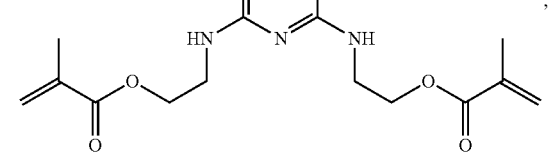
or
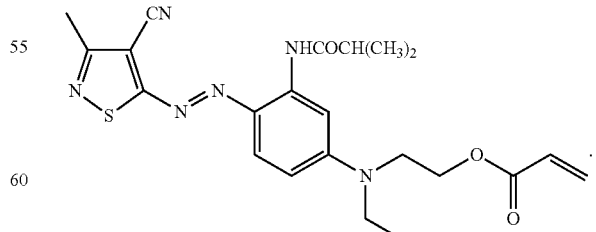
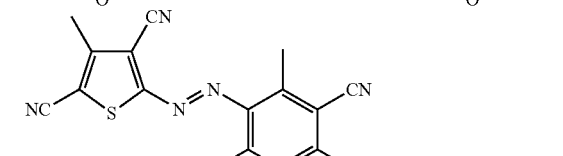
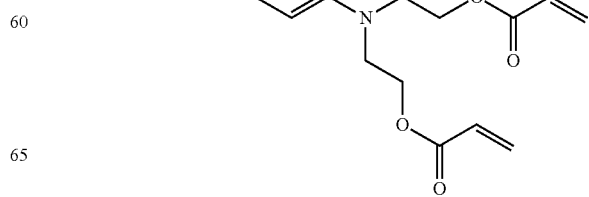

16. The colored polymer particles according to claim 10, wherein the following polymerisable dye is selected from the group consisting of

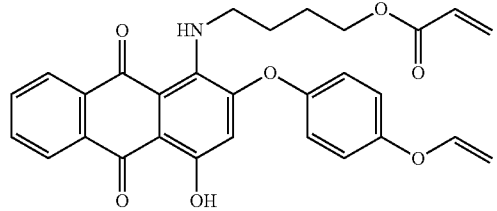,

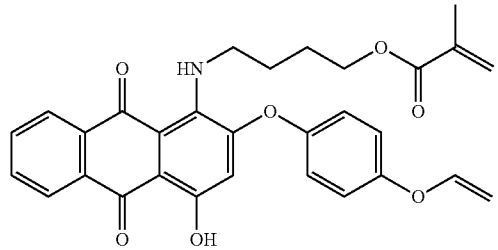,

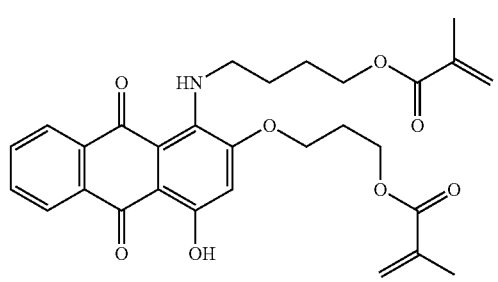,

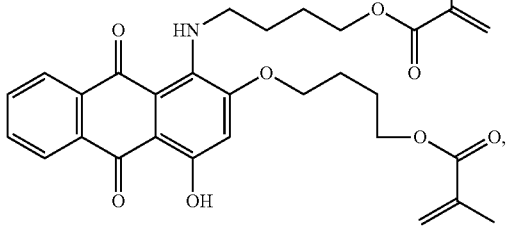,

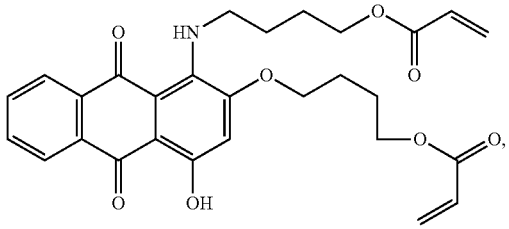,

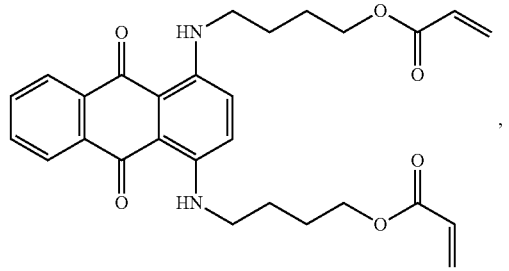,

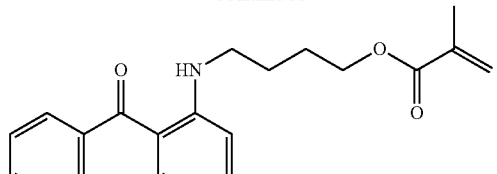,

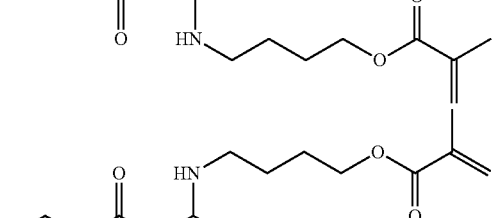,

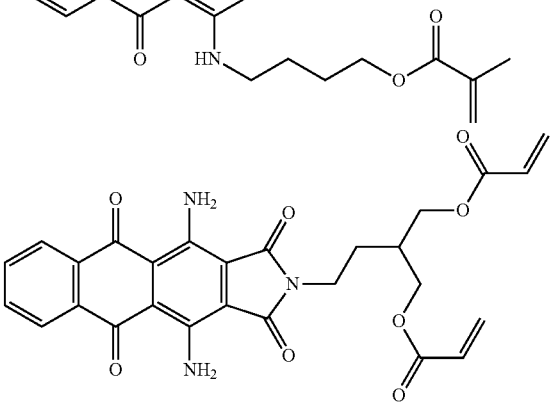

and

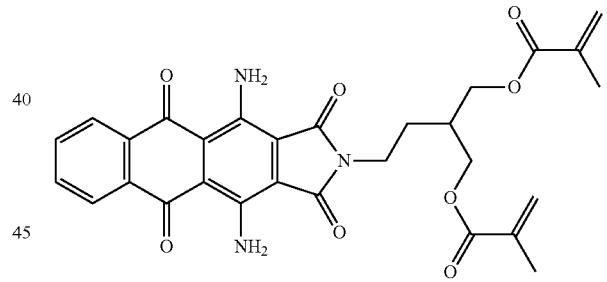.

17. The colored polymer particles according to claim 10, wherein the polymer particles have a diameter of 50-1000 nm.

18. The colored polymer particles according to claim 10, wherein the polymer particles have a diameter of 150-600 nm.

19. An electrophoretic device which comprises the colored polymer particles according to claim 10, comprising monomer units of at least one (i) polymerizable dye comprising at least two polymerisable groups, (ii) at least one co-monomer, (iii) optionally at least one charged co-monomer, and (iv) optionally at least one crosslinking co-monomer.

20. An electrophoretic fluid comprising the colored polymer particles according to claim 10.

21. The electrophoretic display device comprising the colored polymer particles according to claim 10.

22. The electrophoretic display device according to claim 21, wherein the electrophoretic fluid is applied by a technique selected from inkjet printing, slot die spraying, nozzle spraying, and flexographic printing, or any other contact or contactless printing or deposition technique.

23. A process for the preparation of colored polymer particles according to claim 10, comprising
   a) the polymerization of at least one polymerizable dye comprising at least two polymerizable groups, at least one monomer, at least one initiator, and optionally at least one charged co-monomer by dispersion or emulsion polymerization, and optionally
   b) washing and drying the colored polymer particles.

* * * * *

UNITED STATES PATENT AND TRADEMARK OFFICE
CERTIFICATE OF CORRECTION

PATENT NO. : 9,487,611 B2
APPLICATION NO. : 13/813178
DATED : November 8, 2016
INVENTOR(S) : Louise Diane Farrand et al.

Page 1 of 3

It is certified that error appears in the above-identified patent and that said Letters Patent is hereby corrected as shown below:

In the Claims

In Claim 10, Column 119, last formula, please delete the following formula

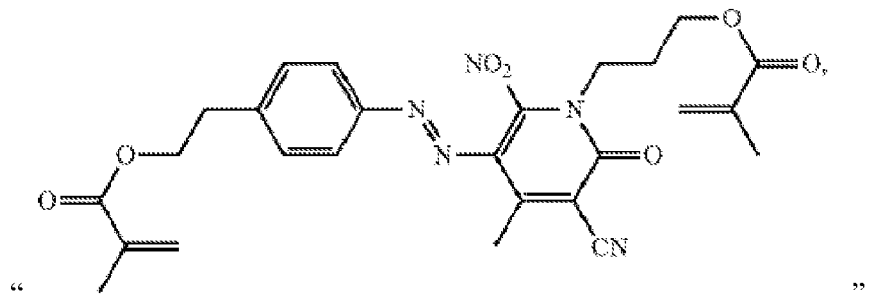

"                                                                                              "

and replace the formula with the following formula

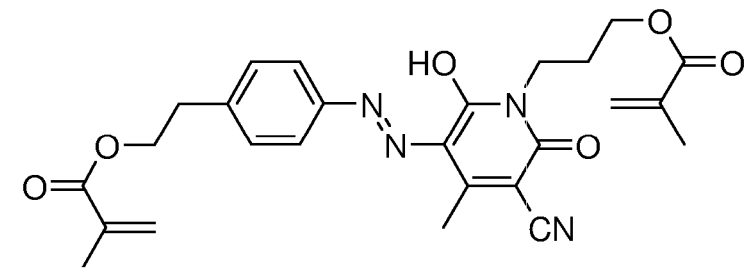

Signed and Sealed this
Fourth Day of April, 2017

Michelle K. Lee
*Director of the United States Patent and Trademark Office*

CERTIFICATE OF CORRECTION (continued)
U.S. Pat. No. 9,487,611 B2

In Claim 10, Column 124, third formula, please delete the following formula

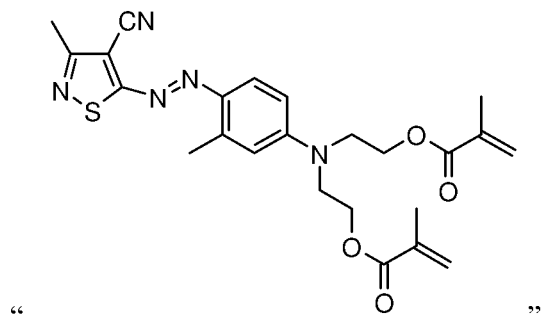

" "

In Claim 13, Column 128, first formula, please delete the following formula

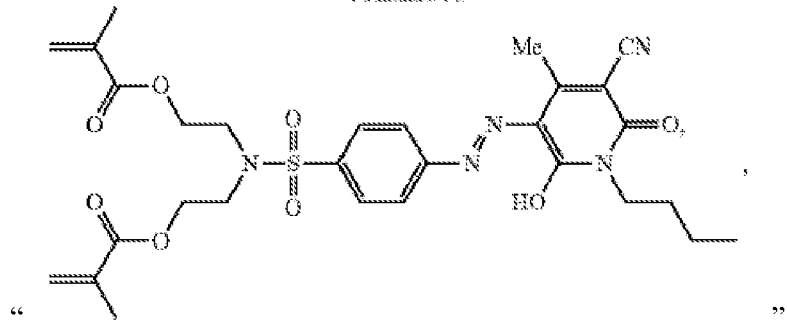

" ,"

and replace the formula with the following formula

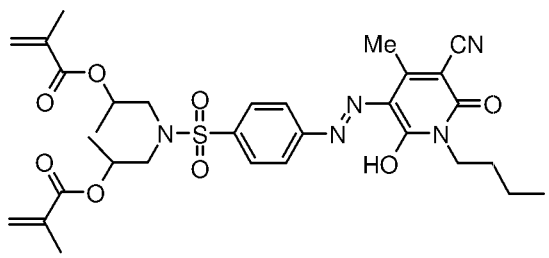

In Claim 16, Column 131, last formula, please delete the following formula

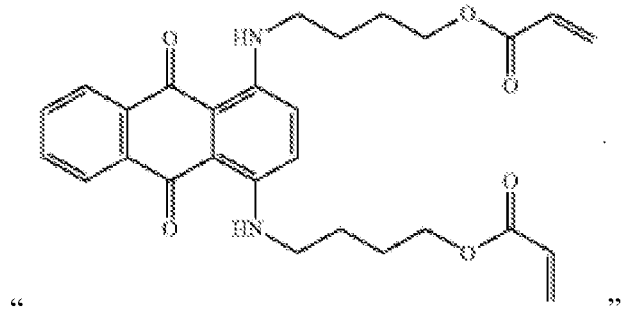

" "

and replace the formula with the following formula

CERTIFICATE OF CORRECTION (continued)
U.S. Pat. No. 9,487,611 B2

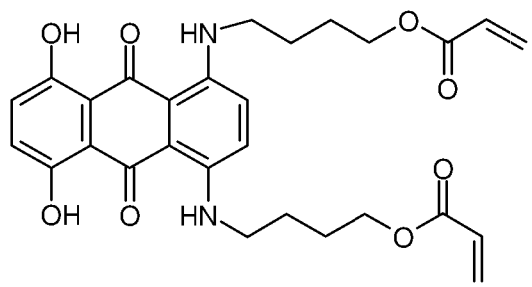

In Claim 16, Column 132, first formula, please delete the following formula

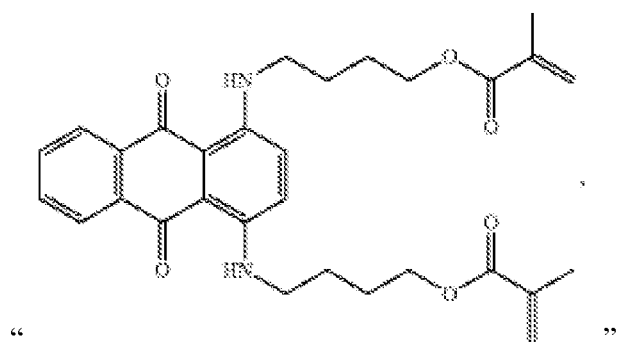

" "

and replace the formula with the following formula